US012715646B2

(12) United States Patent
Zyvitski et al.

(10) Patent No.: US 12,715,646 B2
(45) Date of Patent: Aug. 25, 2026

(54) CONTAINER CARRYING PACKAGE AND METHOD FOR CONSTRUCTING THE SAME

(71) Applicant: Ideal Beverage Carrier Company Inc., Stratford (CA)

(72) Inventors: Steven Zyvitski, Guelph (CA); Ross Snider, Stratford (CA)

(73) Assignee: Ideal Beverage Carrier Company Inc., Stratford (CA)

( * ) Notice: Subject to any disclaimer, the term of this patent is extended or adjusted under 35 U.S.C. 154(b) by 28 days.

(21) Appl. No.: 18/164,155

(22) Filed: Feb. 3, 2023

(65) Prior Publication Data

US 2023/0257159 A1 Aug. 17, 2023

Related U.S. Application Data

(60) Provisional application No. 63/309,164, filed on Feb. 11, 2022.

(51) Int. Cl.

| | |
|---|---|
| ***B65D 5/48*** | (2006.01) |
| ***B31B 50/26*** | (2017.01) |
| ***B31B 100/00*** | (2017.01) |
| ***B65D 5/42*** | (2006.01) |
| ***B65D 5/46*** | (2006.01) |

(52) U.S. Cl.

CPC ........ *B65D 5/48006* (2013.01); *B31B 50/262* (2017.08); *B65D 5/46184* (2013.01); *B31B 2100/002* (2017.08); *B65D 5/4212* (2013.01)

(58) Field of Classification Search

CPC ............ B65D 5/48006; B65D 5/46184; B65D 5/4212; B65D 71/0022; B65D 2571/00487; B65D 2571/0066; B65D 2571/00388; B65D 2571/00382; B65D 2571/00358

USPC .... 229/117.14, 117, 117.13, 120.05, 120.08, 229/120.09, 120.29; 206/175, 180, 162, 206/170, 193, 427, 200, 139, 172

See application file for complete search history.

(56) References Cited

U.S. PATENT DOCUMENTS 4,509,640 A * 4/1985 Joyce ................ B65D 71/0022 229/117.22
4,610,349 A * 9/1986 Schwartz ........... B65D 71/0022 206/175

(Continued)

OTHER PUBLICATIONS

Canadian Intellectual Property Office, Examiner's Report for CA Application No. 3188480, Aug. 20, 2024.

*Primary Examiner* — Christopher R Demeree
(74) *Attorney, Agent, or Firm* — Own Innovation; James W. Hinton; Caitlin O'Flynn

(57) ABSTRACT

Provided is a package for transporting articles and method for constructing the same. The package includes a sheet including a side shell including side walls each including a functionally seamless outer surface within a side wall area. At least one of the side walls includes a side wall tab extending beyond the side wall area and terminating in a side wall tab crease. The sheet further includes partitions one or more of which is rotatably connected to a side wall by at least the side wall crease. The sheet further includes at least one bottom panel. The package is constructed by folding at least one partition portion of the sheet along a crease parallel to a top line of the side shell, folding and securing at least one bottom panel and folding and securing two ends of the side shell while maintaining the package in the same orientation.

15 Claims, 23 Drawing Sheets

(56) References Cited

U.S. PATENT DOCUMENTS

| | | | | | |
|---|---|---|---|---|---|
| 5,538,131 | A | 7/1996 | Harrelson | | |
| 5,579,990 | A * | 12/1996 | Durand | B65D 5/48008 229/120.05 |
| 5,645,162 | A | 7/1997 | Harrelson | |
| 6,189,687 | B1 * | 2/2001 | Bakx | B65D 71/0022 206/175 |
| 7,699,164 | B2 * | 4/2010 | Cuomo | B65D 71/0022 206/175 |
| 8,297,437 | B2 * | 10/2012 | Smalley | B65D 71/0022 206/188 |
| 9,061,809 | B2 * | 6/2015 | Wilkins | B65D 5/46072 |
| 9,415,914 | B2 * | 8/2016 | Holley, Jr. | B65D 71/0022 |
| 10,543,969 | B2 * | 1/2020 | Gonzalez | B65D 71/0022 |
| D878,931 | S * | 3/2020 | Boersma | D9/433 |
| 11,981,489 | B2 * | 5/2024 | Gungner | B65D 5/48002 |

* cited by examiner

CONTAINER CARRYING PACKAGE AND METHOD FOR CONSTRUCTING THE SAME

TECHNICAL FIELD

The embodiments disclosed herein relate to packaging, and, in particular to systems and methods for article carrying packaging.

INTRODUCTION

A person will handle so many containers over the course of the day that it has become common to transport and sell containers, filled or otherwise, in packaging that allows a person to carry and access one or more containers with ease.

Current packaging solutions however suffer from manufacturing and panel space issues. Current packages also generally require the stock material to be rotated or flipped during manufacturing. This has high manufacturing costs and limits the manufacturing to those with the facilities capable of executing these steps.

Furthermore, current packages rely on portions of the side panels of the containers to be folded into the package to serve as dividers for creating compartments in the packaging. This eliminates part of the side panel reducing side panel surface area. Forming the dividers from the side panels also disrupts the continuity of the panel surface presenting challenges for laying down artwork on the packaging. It also creates brakes in the artwork that may hinder advertising efforts.

Current packaging also often suffers from seams occurring in the middle of one or more side panels, rather than a corner. Having a seam in the middle of a side panel puts a point of potential rupture in a more precarious point of the packaging and further disrupts artwork both with the seam and potential alignment considerations.

Accordingly, there is a need for improved systems and methods container carrying packaging and manufacturing the same.

SUMMARY

Provided is a package for containing and transporting articles. The package includes a sheet for forming structural elements of the package. The sheet includes a side shell for forming the walls of the package. The side shell includes a plurality of side walls. Each side wall includes a side wall outer surface wherein the side wall outer surface is functionally seamless within a side wall area. One or more of the side walls further includes a side wall tab. The side wall tab includes material beyond the side wall area. The side wall tab terminates on a first side in a side wall tab crease. The sheet further includes a plurality of partitions for forming a plurality of compartments by dividing an inside space of the package. The partitions are formed from material other than from the side wall area. One or more of the plurality of partitions is rotatably connected to a side wall by at least the side wall crease. The sheet further includes at least one bottom panel for forming a bottom of the package system.

The package may further include at least one securing medium for securing the package in an open configuration.

The package side shell may terminate at a first end in a side shell edge and at a second end in a side shell connecting tab crease, the side shell further comprises at least one side wall connecting tab, the at least one side wall connecting tab may be rotatably connected to the side shell by the side wall connecting tab crease, the side wall connecting tab may be secured to an interior surface of the side wall by at least one securing medium, and the side wall connecting tab crease and the side wall edge may be substantially collocated.

The package sheet may further include at least one partition connecting tab wherein the partition connecting tab is rotatably connected to a partition by a partition connecting tab crease and wherein the partition connecting tab is secured to an interior surface of a side wall by at least one securing medium.

The package plurality of partitions may include a first partition and second partition, the first partition rotatably connected on a first side to the side wall tab by at least the side wall crease and on a second side to the second partition by a partition crease.

The package may further include one or more handles.

The package one or more bottom panels may further include one or more auto-bottom panels for forming an auto-bottom.

The package sheet may be cardboard.

The package sheet may include an outside surface and wherein that outside surface comprises artwork.

The package plurality of securing mediums may be one or more of glue, tape, and string.

Provided is a method for constructing a package from a sheet wherein the sheet includes a side shell, a plurality of partitions and at least one bottom panel. The method includes folding at least one partition portion of the sheet including at least a second partition of the plurality of partitions along a second partition handle tab crease wherein the second partition handle tab crease is parallel to a top line of the side shell and wherein the folding brings at least a portion of a second partition interior surface in contact with a side shell interior surface and wherein the at least one partition portion of the sheet is not of a side wall area. The method further includes folding at least one of the at least one bottom panel along at least one bottom panel crease wherein the at least one bottom panel crease connects the at least one bottom panel to the side shell. The method further includes folding a fourth wall portion of the sheet including a fourth side panel of the side wall toward a first side panel of the side wall. The method further includes folding a first wall portion of the sheet including first side panel of the side wall toward the fourth side panel. The method further includes securing the at least one bottom panel to form a bottom. The method further includes securing the fourth side panel to the first side panel. While folding and securing the panels into a flat configuration, the sheet is maintained in substantially the same orientation. Also, opening the package forms a container with an inside space divided into a plurality of compartments.

The method may further include opening the package from the flat configuration to an open configuration.

The method may further include securing the fourth side panel to the first side panel by a side shell connecting tab of the side shell, wherein the side shell connecting tab is rotatably connected to a primary side wall by a side shell connecting tab crease and wherein the primary side wall is one of the first side wall and the fourth side wall and a primary side portion is one of the first wall portion and fourth wall portion that includes the primary side wall. The securing the fourth side panel to the first side panel by a side shell connecting tab of the side shell further includes applying a side shell securing medium to the side wall connecting tab after folding the primary side portion and before folding a secondary side portion wherein the secondary side portion is one of the first wall portion and fourth wall portion that includes a secondary side wall and wherein the secondary side wall is one of the first side wall and the fourth side wall and wherein the secondary side wall is not connected to the side shell connecting tab and wherein the folding of the secondary side wall secures the first side wall to the fourth side wall by the side shell securing medium.

The method may further include applying at least one partition securing medium to at least one partition connecting tab such that one or more of folding of the first side wall portion and the fourth side wall portion secures the at least one partition connecting tab to the interior surface of the side shell.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The various embodiments described herein generally relate to apparatus and methods for article packaging.

Figure 1:
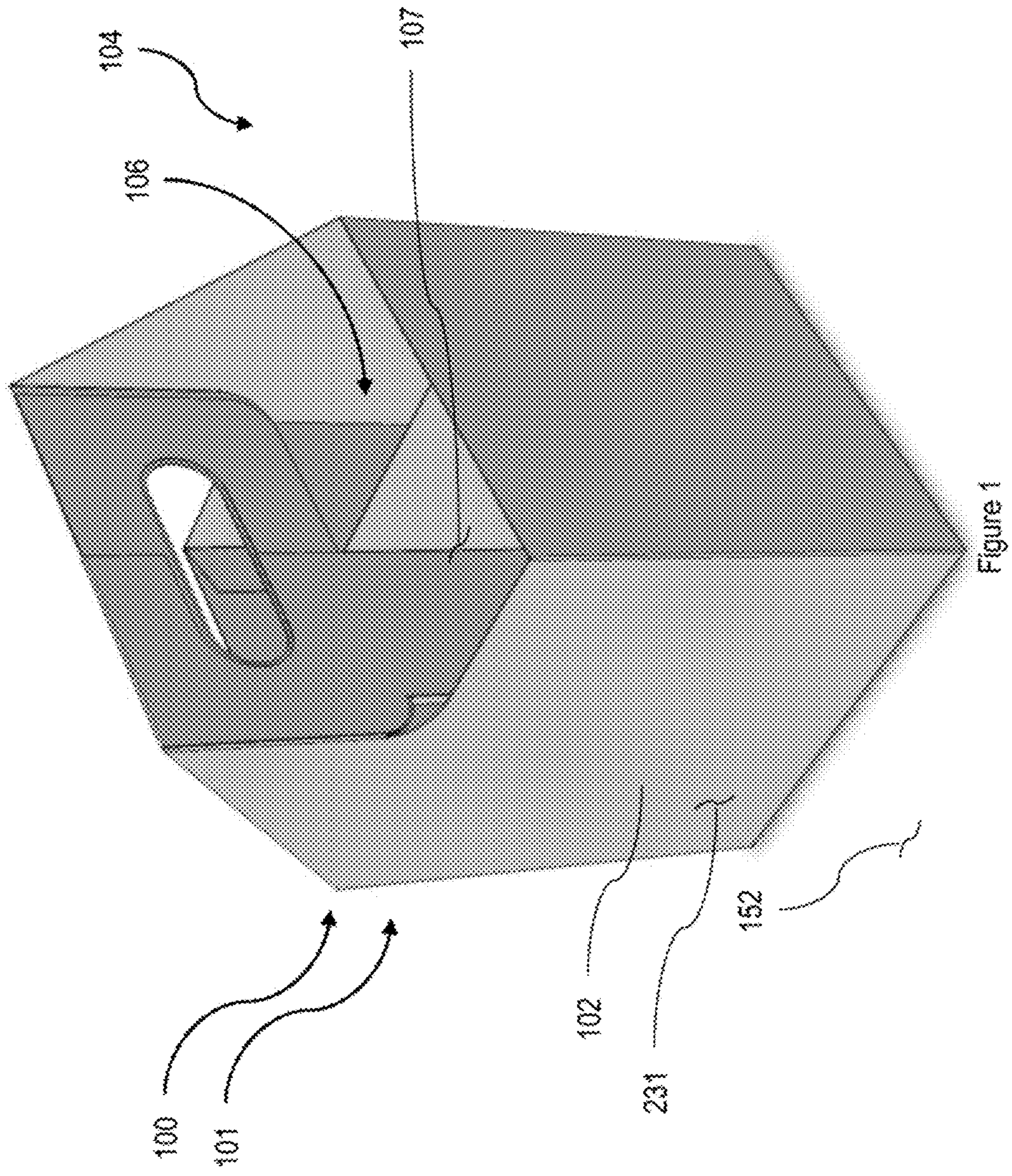
FIG. 1 is a perspective view schematic diagram of a package in an open configuration, according to an embodiment.

Referring now to FIG. 1, shown therein is perspective view schematic diagram of a package 100 for containing articles in an open configuration according to an embodiment. The package 100 is composed of a foldable material that is substantially rigid. The package 100 is composed of a foldable material such that when folded it maintains a structural connection along the fold. The package 100 is composed of material, such as carboard or sheet metal, that, when folded and secured, retains its shape under its own weight. In a preferred embodiment, the package is composed of a material capable of supporting articles when folded and secured.

The package 100 structure is constructed from a sheet 101. The sheet 101 may be the sheet 800 of FIG. 8, described below. The package 100 is constructed from the sheet 101 by folding and securing the sheet 101 into a flat configuration such as the flat configuration 1500 of FIG. 15. The package may be opened from flat configuration 1500 of FIG. 15, as described below, into the configuration of package 100.

Figure 15:
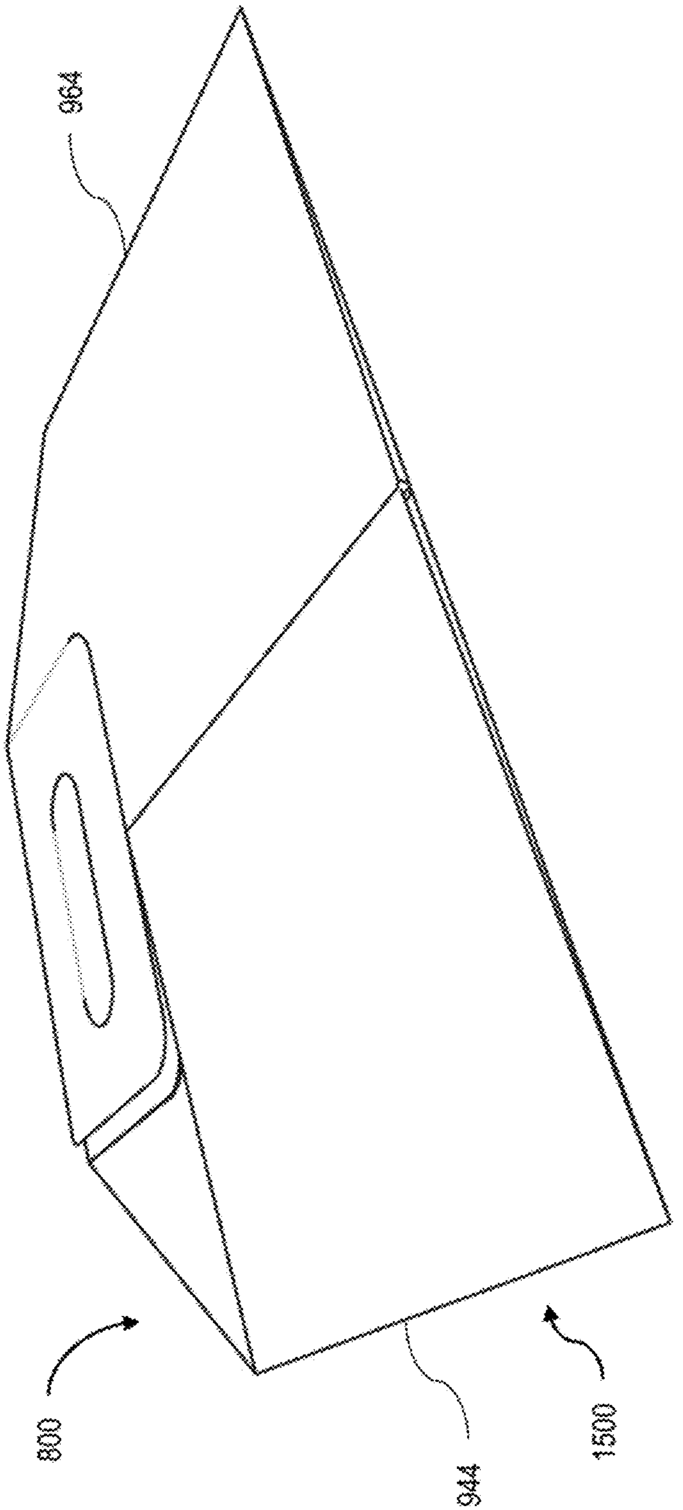
FIG. 15 is a perspective view schematic diagram of the sheet of FIG. 8 configured per the method of FIG. 9.

The folding and securing may be accomplished by passing the sheet 101 through a series of kicks, flippers, vertical fold mechanisms and glue heads to construct the package in the flat configuration 1500 of FIG. 15. The flat configuration 1500 of FIG. 15 is for transport and storage until it is used in the open configuration 100. In an embodiment, the sheet 101 travels through the construction operations enumerated above and further describe below without the sheet 101 being rotated. This allows the package 100 to be constructed on machinery that does not have rotation capability. It also reduces constructing time as well as construction failure and defect risk by simplifying the construction of the package system.

The sheet 101 is secured by a securing medium such as glue, tape, or string, described below.

The package 100 is located in an outside environment 104. The outside environment 104 includes the space and objects outside of the package 100. The outside environment 104 may include a resting surface 152 such as a shelf or table for resting the package on.

The package 100 includes an inside space 106. The inside space 106 is the space substantially surrounded by the package 100 not occupied by other parts of the package 100.

The inside space 106 includes a top 107. The top 107 may be open to the outside environment 104 such that the inside space 106 may receive articles. The top 107 is substantially planar. In a preferred embodiment, the top 107 is parallel to the resting surface 152 when the package is placed on the resting surface.

The package includes an outer shell 102. The outer shell 102 separates the outside environment 104 from the inside space 106.

This outer shell 102 includes a side shell exterior surface 231, described below. The side shell exterior surface 231 is functionally seamless except where the side wall turns to form a substantial corner, such as the side corners 234, 244, 254, and 264 of FIGS. 4 and 5, described below. Being functionally seamless means that a surface is uninterrupted by functional discontinuities such as functional creases, cutouts, indentations, divots, scores, protrusions of the surface, protrusions connected to the surface, or edges. In conventional systems, these discontinuities may be included to facilitate manufacture of a package. In conventional systems, these discontinuities may be included to provide functionality to the package such as collapsibility for storing the package. Functional discontinuities do not include discontinuities included for primarily aesthetic purposes such as embossing, relief artwork, or raised artwork (i.e. a wax mark).

The seamless nature of the side wall main area 224 is advantageous to the laying down of artwork on the side wall exterior surface 231. The method of application of the artwork to the side shell exterior surface 231 may advantageously assume an absence of discontinuities that would otherwise interfere with or complicate the laydown process. It also provides that the artwork will not be interrupted by discontinuities from the underlying side shell exterior surface 231 once the artwork is laid down. Such discontinuities may diminish or distract from the artwork. Therefore, their absence may enhance the appeal, legibility, and ultimately effectiveness of the artwork.

Figure 2:
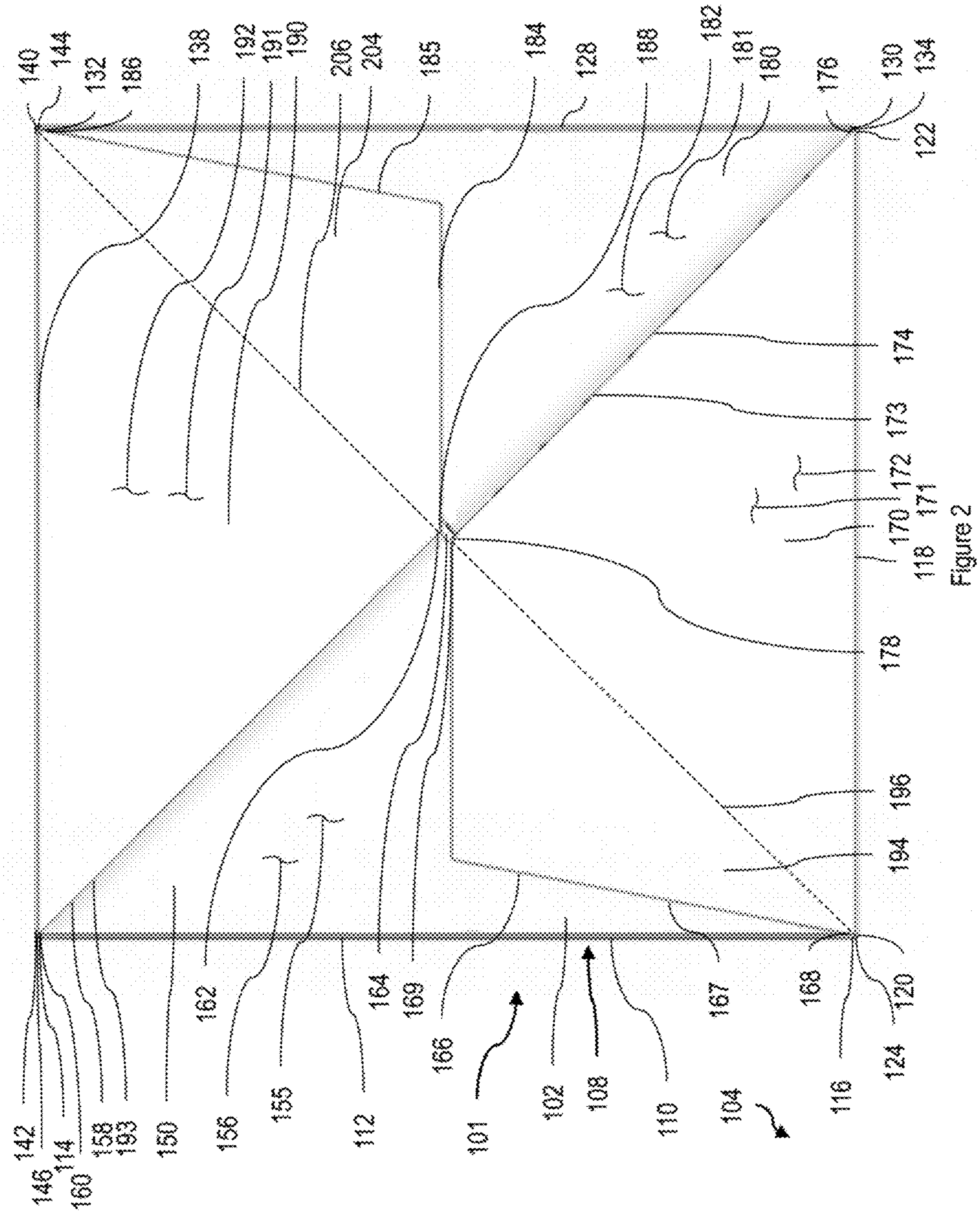
FIG. 2 is a bottom view schematic diagram of the package of FIG. 1.

Referring now to FIG. 2, shown therein is a bottom view schematic diagram of the package 100 of FIG. 1. The outer shell 102 includes a bottom 108 for supporting articles placed in the package 100. The bottom 108 provides a horizontal floor structure for the package 100. The bottom 108 is a substantially planer structure. The bottom 108 may be rectangular.

The bottom 108 includes a bottom edge 110. The bottom edge 110 surrounds the bottom 108.

The bottom edge 110 includes a bottom edge first leg 112. The bottom edge first leg 112 is continuous section of the bottom edge 110. The bottom edge first leg 112 terminates at one end in a bottom edge first leg first end 114 at the other end in a bottom edge first leg second end 116.

The bottom edge 110 includes a bottom edge second leg 118. The bottom edge second leg 118 is continuous section of the bottom edge 110. The bottom edge second leg 118 terminates at one end in a bottom edge second leg first end 120 at the other end in a bottom edge second leg second end 122.

The bottom edge includes a second bottom corner 124. At the second bottom corner 124, the bottom edge first leg 112 and the bottom edge second leg 118 are configured at a substantial angle to each other. Furthermore, the bottom edge first leg second end 116 and the bottom edge second leg first end 120 are located substantially at the second bottom corner 124.

The bottom edge 110 includes a bottom edge third leg 128. The bottom edge third leg 128 is continuous section of the bottom edge 110. The bottom edge third leg 128 terminates at one end in a bottom edge third leg first end 130 at the other end in a bottom edge third leg second end 132.

The bottom edge includes a third bottom corner 134. At the third bottom corner 134, the bottom edge second leg 118 and the bottom edge third leg 126 are configured at a substantial angle to each other. Furthermore, the bottom edge second leg second end 122 and the bottom edge third leg first end 130 are located substantially at the third bottom corner 134.

The bottom edge 110 includes a bottom edge fourth leg 138. The bottom edge fourth leg 138 is continuous section of the bottom edge 110. The bottom edge second leg 138 terminates at one end in a bottom edge fourth leg first end 140 at the other end in a bottom edge fourth leg second end 142.

The bottom edge includes a fourth bottom corner 144. At the fourth bottom corner 144, the bottom edge third leg 128 and the bottom edge fourth leg 138 are configured at a substantial angle to each other. Furthermore, the bottom edge third leg second end 132 and the bottom edge fourth leg first end 140 are located substantially at the fourth bottom corner 144.

The bottom edge further includes a first bottom corner 146. At the first bottom corner 146, the bottom edge fourth leg 138 and the bottom edge first leg 112 are configured at a substantial angle to each other. Furthermore, the bottom edge fourth leg second end 142 and the bottom edge first leg first end 114 are located substantially at the fourth bottom corner 146.

The bottom edge first leg second end 116 and the bottom edge second leg first end 120 may not be connected at the second bottom corner 124. The configuration of the bottom edge first leg 112 relative to the bottom edge second leg 118 and therefore the continuity of the bottom edge 110 is achieved by the connection of the bottom edge first leg 112 and bottom edge second leg's 118 to other parts of the outer shell 102. The bottom edge second leg 118, bottom edge third leg 128, and bottom edge fourth leg 138 are similarly configured.

The bottom 108 includes a bottom first panel 150 for resting the package 100 on a resting surface 152 of FIG. 1 when the package 100 is placed on the resting surface 152 of FIG. 1. The bottom first panel 150 terminates at the bottom edge first leg 112. The bottom edge first leg 112 rotatably connects the bottom first panel 150 to a first side wall 240 of FIG. 4, described below.

The bottom first panel 150 is further terminates at a bottom first diagonal 158. The bottom first diagonal 158 is an edge of the sheet 101. The bottom first diagonal 158 may be a section of the bottom first panel segment 858 of the sheet 800 of FIG. 8 described below.

The bottom first diagonal 158 terminates at a first end in a bottom first diagonal outer end 160. The bottom first diagonal outer end 160 is substantially located at the first bottom corner 146. The bottom first diagonal outer end 160 is connected to the bottom edge first leg first end 114.

The bottom first diagonal 158 terminates at a second end in a bottom first diagonal inner end 162. The bottom first diagonal inner end 162 is located at a bottom center 164.

The bottom first panel 150 further includes a bottom first panel out surface 155 that faces the resting surface 152 of FIG. 1 when the package 100 is placed on the resting surface 152 of FIG. 1.

The bottom first panel out surface 155 includes a bottom first panel exterior surface 156. The bottom first panel exterior surface 156 the portion of the bottom first panel out surface 155 that is exposed to the exterior environment 104. The bottom first panel exterior surface 156 is the portion of the bottom first panel out surface 155 that contacts the resting surface 152 of FIG. 1 when the container 100 is placed on the resting surface 152 of FIG. 1.

The bottom first panel exterior surface 156 terminates at the bottom edge first leg 112. The bottom first panel exterior surface 156 further terminates at the bottom first diagonal 158. The bottom first panel exterior surface 156 is further terminates at a bottom second projection 166. The bottom second projection 166 is a projection of the bottom second edge 167, described below, onto bottom first panel out surface 155.

The bottom further includes a bottom second panel 170 for resting the package 100 on the resting surface 152 of FIG. 1 when the package 100 is placed on it.

The bottom second panel 170 terminates at the bottom edge second leg 118. The bottom edge second leg 118 rotatably connects the bottom second panel 170 to a second side wall 250 of FIG. 4, described below. The bottom edge second leg 118 rotatably connects the bottom second panel 170 to a first side wall 240 of FIG. 4, described below.

The bottom second panel 170 further terminates at a bottom second edge 167. The bottom second edge 167 may be an edge of the sheet 101. The bottom second edge 167 may be the bottom second panel segment 867 of FIG. 8 described below. The bottom second panel second edge 167 may include bends and may or may not be straight.

The bottom second edge 167 terminates at a first end in a bottom second edge outer end 168. The second edge outer end 168 is substantially located at the second bottom corner 124. The second edge outer end 168 is connected to the bottom edge second leg first end 120.

The bottom second edge 167 terminates at a second end in a bottom second edge inner end 169. The bottom second edge inner end 169 is located at a bottom center 164.

The bottom second panel 170 includes a bottom second panel out surface 171 that faces the resting surface 152 of FIG. 1 when the package 100 is placed on the resting surface 152 of FIG. 1.

The bottom second panel out surface 171 includes a bottom second panel exterior surface 172. The bottom second panel exterior surface 172 is the portion of the bottom second panel out surface 171 that is exposed to the exterior environment 104. The bottom second panel exterior surface 172 is the portion of the bottom second panel out surface 171 the contacts the resting surface 152 of FIG. 1 when the container 100 is paced on the resting surface 152 of FIG. 1.

The bottom second panel exterior surface 172 terminates at the bottom edge second leg 118. The bottom second panel exterior surface 172 further terminates at the bottom second edge 167.

The bottom second panel exterior surface 172 further terminates at a bottom third projection 173. The bottom third projection 173 is a projection of the bottom third diagonal 174, described below, onto the bottom second panel out surface 171.

The bottom first panel out surface 155 further includes a first bottom panel hidden out surface (not shown). The first bottom panel hidden out surface is the portion of the bottom first panel out surface 155 that does not make contact with the resting surface 152 of FIG. 1 when the container 100 is place on the resting surface 152 of FIG. 1. The bottom first panel 150 partially overlaps the bottom second panel 170. This partial overlapping configures the bottom second panel 170 under a portion of the bottom first panel 150. This layering prevents first bottom panel hidden out surface from making contact with the resting surface 152 of FIG. 1.

This configuration also provides interlocking structure to the bottom 108. The interlocking structure contributes to the support of the bottom 108.

The bottom further includes a bottom third panel 180 for resting the package 100 on the resting surface 152 of FIG. 1 when the package 100 is placed on it.

The bottom third panel 180 terminates at the bottom edge third leg 128. The bottom edge third leg 128 rotatably connects the bottom third panel 180 to a third side wall 260 of FIG. 5, described below.

The third bottom panel 180 further terminates at the bottom third diagonal 174. The bottom third diagonal is an edge of the sheet 101. The bottom third diagonal may be the first auto-bottom segment 874 of FIG. 8, described below.

The bottom third diagonal 174 terminates at a first end in a bottom third diagonal outer end 176. The bottom third diagonal outer end 176 is substantially located at the third bottom corner 134. The bottom third diagonal outer end 176 is connected to the bottom edge third leg first end 130.

The bottom third diagonal 174 terminates at a second end in a bottom first diagonal inner end 178. The bottom first diagonal inner end 178 is substantially located at a bottom center 164.

The bottom third panel 180 includes a bottom third panel out surface 181 that faces the resting surface 152 of FIG. 1 when the package 100 is placed on the resting surface 152 of FIG. 1.

The bottom third panel out surface 181 includes a bottom third panel exterior surface 182. The bottom third panel exterior surface 182 is the portion of the bottom third panel out surface 181 that is exposed to the exterior environment 104. The bottom third panel exterior surface 182 is the portion of the bottom third panel out surface 181 that contacts the resting surface 152 of FIG. 1 when the container 100 is placed on the resting surface 152 of FIG. 1.

The bottom third panel exterior surface 182 terminates at the bottom edge third leg 128. The bottom third panel exterior surface 182 further terminates at the bottom third diagonal 174. The bottom third panel exterior surface 182 further terminates at a bottom fourth projection 184. The bottom fourth projection 184 is a projection of the bottom fourth edge 185, described below, onto the bottom third panel out surface 181.

The third bottom panel out surface 181 further includes a third bottom panel hidden surface (not shown). The third bottom panel hidden surface is the portion of the third bottom panel out surface 181 that does not make contact with the resting surface 152 of FIG. 1 when the container 100 is place on the resting surface 152 of FIG. 1. The bottom third panel 180 partially overlaps the bottom fourth panel 190. This partial overlapping configures the bottom fourth panel 190 under a portion of the bottom third panel 180. This layering prevents third bottom panel hidden out surface from making contact with the resting surface 152 of FIG. 1.

This configuration also provides interlocking structure to the bottom 108. The interlocking structure contributes to the support of the bottom 108.

The bottom further includes a bottom fourth panel 190 for resting the package 100 on the resting surface 152 of FIG. 1 when the package 100 is placed on it.

The bottom fourth panel 190 terminates at the bottom edge fourth leg 138. The bottom fourth panel 190 terminates at the bottom edge fourth leg 138. The bottom edge fourth leg 138 rotatably connects the bottom fourth panel 190 to a fourth side wall 270 of FIG. 5, described below.

The bottom fourth panel 190 further terminates at the bottom fourth edge 185. The bottom fourth edge 185 may be an edge of the sheet 101. The bottom fourth edge 185 may be bottom fourth panel segment 885 of FIG. 8, described below. The bottom second panel second edge 167 may include bends and may or may not be straight.

The bottom fourth edge 185 terminates at a first end in a bottom fourth edge outer end 186. The bottom fourth edge outer end 186 is substantially located at the fourth bottom corner 144. The bottom fourth edge outer end 186 is connected to the bottom edge third leg first end 140.

The bottom fourth edge 185 terminates at a second end in a bottom first edge inner end 188. The bottom fourth edge inner end 178 is located at a bottom center 164.

The bottom fourth panel 190 includes a bottom fourth panel out surface 191. That faces the resting surface 152 of FIG. 1 when the package 100 is placed on the resting surface 152 of FIG. 1.

The bottom fourth panel out surface 191 includes a bottom fourth panel exterior surface 192. The bottom fourth panel exterior surface 192 is the portion of the bottom fourth panel out surface 191 that is exposed to the exterior environment 104. The bottom fourth panel exterior surface 192 is the portion of the bottom fourth panel out surface 191 that contacts the resting surface 152 of FIG. 1 when the container 100 is placed on the resting surface 152 of FIG. 1.

The bottom fourth panel exterior surface 192 terminates at the bottom edge fourth leg 138. The bottom fourth panel exterior surface 192 is further terminates at the bottom fourth edge 185.

The bottom fourth panel exterior surface 192 terminates at a bottom fourth projection 193. The bottom fourth projection 173 is a projection of the bottom first diagonal 158 onto the bottom fourth panel out surface 191.

The third bottom panel out surface 181 further includes a third bottom panel hidden out surface (not shown). The third bottom panel hidden out surface is the portion of the third bottom panel out surface 181 that does not make contact with the resting surface 152 of FIG. 1 when the container 100 is place on the resting surface 152 of FIG. 1. The bottom third panel 180 partially overlaps the bottom fourth panel 190. This partial overlapping configures the bottom fourth panel 190 under a portion of the bottom third panel 180. This layering prevents third bottom panel hidden out surface from making contact with the resting surface 152 of FIG. 1.

This configuration also provides interlocking structure to the bottom 108. The interlocking structure contributes to the support of the bottom 108.

The fourth bottom panel out surface 191 further includes a fourth bottom panel hidden out surface (not shown). The fourth bottom panel hidden out surface is the portion of the fourth bottom panel out surface 191 that does not make contact with the resting surface 152 of FIG. 1 when the container 100 is place on the resting surface 152 of FIG. 1. The bottom fourth panel 190 partially overlaps the bottom first panel 150. This partial overlapping configures the bottom first panel 150 under a portion of the bottom fourth panel 190. This layering prevents third bottom panel hidden out surface from making contact with the resting surface 152 of FIG. 1.

This configuration also provides interlocking structure to the bottom 108. The interlocking structure contributes to the support of the bottom 108.

In a preferred embodiment, the second bottom panel 170 further includes a first auto-bottom panel 194. This first auto-bottom panel 194 pulls the first bottom panel 150 flat onto the second bottom panel 170 when the package 100 is transitioned as described below from an assembled flat configuration 800 of FIG. 8 to the open configuration depicted in FIG. 1. This configuration provides further stability to the bottom 108.

The size, shape, and location of the first auto-bottom panel 194 is configured such that the first auto-bottom panel 194 intercedes between some or part of the first bottom panel exterior surface 156 the resting surface 152 of FIG. 1 when the package 100 is place on the resting surface 152 of FIG. 1.

The first auto-bottom panel terminates at the bottom second edge 167.

The second bottom panel 170 further includes a bottom second crease 196. The bottom second crease 196 rotatably connects the first auto-bottom panel 194 to the rest of the second bottom panel 170. The bottom second crease 196 may terminate at a first end in the bottom second edge inner end 169. The bottom second crease 196 may terminate at a second end in the bottom second edge outer end 168.

The first auto-bottom panel 194 further includes a first auto-bottom panel in surface 198 (not shown). The first auto-bottom in surface 198 is the surface of the first auto-bottom panel 194 that faces the inside space 106 of FIG. 1. The first auto-bottom panel in surface 198 is affixed to the first bottom panel out surface 155.

The first auto-bottom panel in surface 198 is affixed to the first bottom panel out surface 155 by an auto-bottom first securing medium 200 (not shown), such as glue, tape or string. In a preferred embodiment, the auto-bottom first securing medium 200 is glue. In this embodiment, the auto-bottom first securing medium 200 is applied to some or all of the first auto-bottom panel in surface 198 and the first bottom panel out surface 155. Securing the first auto-bottom panel in surface 198 to the first bottom panel 150 configures the first auto-bottom panel 194 to pull the first bottom panel 150 flat onto the second bottom panel 170 when the sheet 101 is transitioned from an assembled flat configuration 1500 of FIG. 15 to the open configuration of the package 100.

In a preferred embodiment, the fourth bottom panel 190 further includes a second auto-bottom panel 204. This second auto-bottom panel 204 pulls the third bottom panel 180 flat onto the fourth bottom panel 190 when the sheet 101 is transitioned from a flat configuration 1500 of FIG. 15 to the open configuration of the package 100. This configuration provides further stability to the bottom 108.

The size, shape, and location of the second auto-bottom panel 204 is configured such that the second auto-bottom panel 204 intercedes between some or part of the third bottom panel exterior surface 181 the resting surface 152 of FIG. 1 when the package 100 is place on the resting surface 152 of FIG. 1.

The second auto-bottom panel terminates at the bottom fourth edge 185.

The fourth bottom panel 190 further includes a bottom fourth crease 206. The bottom fourth crease 206 rotatably connects the second auto-bottom panel 204 to the rest of the fourth bottom panel 190. The bottom fourth crease 206 may terminate at a first end in the bottom fourth edge inner end 188. The bottom fourth crease 206 may terminate at a second end in the bottom fourth edge outer end 186.

The second auto-bottom panel 204 further includes a second auto-bottom panel in surface 208 (not shown). The second auto-bottom panel in surface 208 is the surface of the second auto-bottom panel 204 that faces the inside space 106 of FIG. 1.

The second auto-bottom panel in surface 208 is affixed to the third bottom panel out surface 181. The second auto-bottom panel in surface 208 is affixed to the third bottom panel out surface 181 by an auto-bottom second securing medium 210 (not shown), such as glue, tape or string. In a preferred embodiment, the auto-bottom second securing medium 210 is glue. In this embodiment, the auto-bottom second securing medium 210 is applied to some or all of the second auto-bottom panel in surface 208 and the third bottom panel out surface 181. Securing the second auto-bottom panel in surface 208 to the third bottom panel 180 configures the second auto-bottom panel 204 to pull the third bottom panel 180 flat onto the fourth bottom panel 190 when sheet 101 is transitioned from a flat configuration 1500 of FIG. 15 to the open configuration of the package 100.

Figure 3:
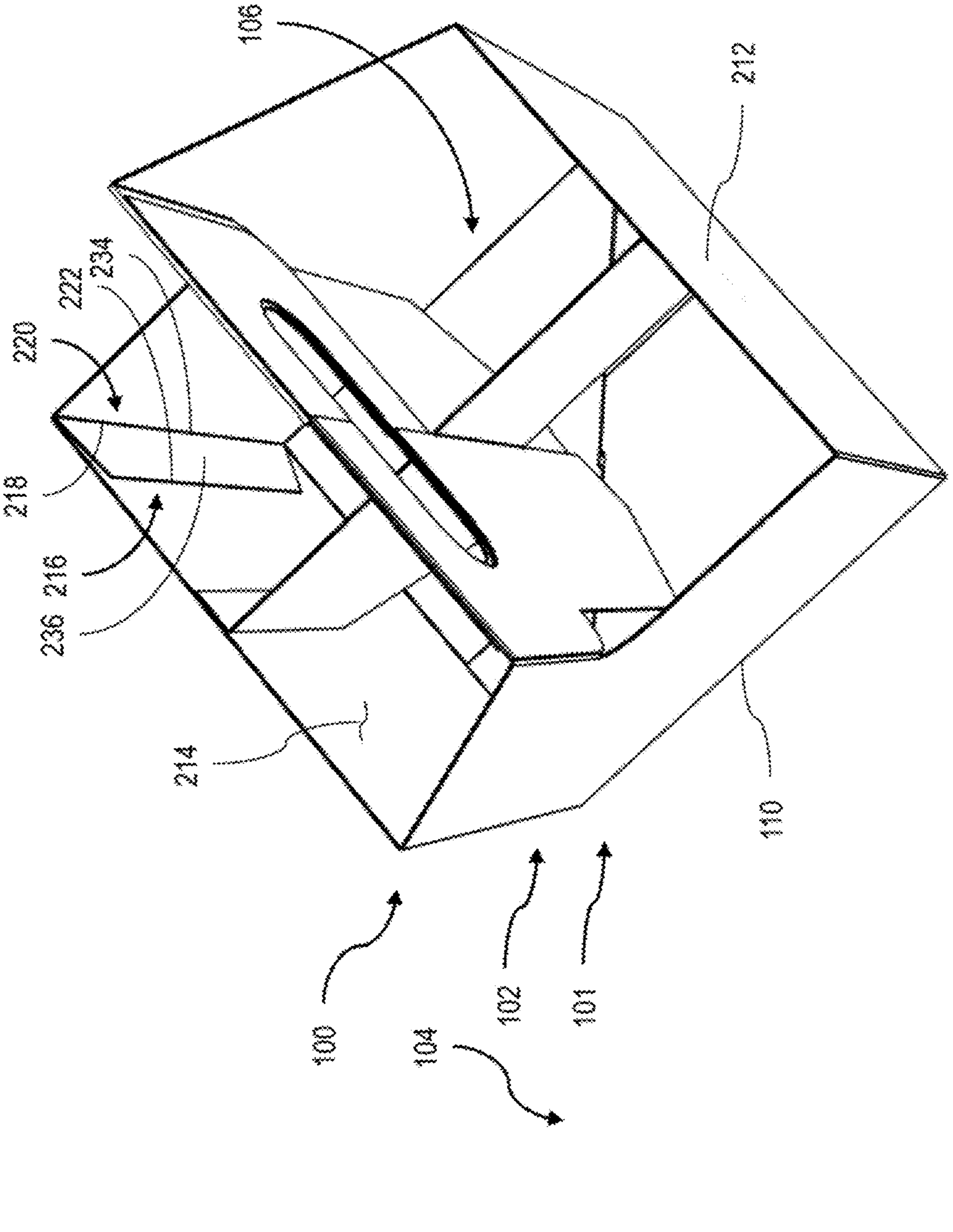
FIG. 3 is a further perspective view schematic diagram of a package of FIG. 1 in an open configuration.

Referring now to FIG. 3 shown therein is a further perspective view schematic diagram of a package 100 of FIG. 1 in an open configuration.

The outer shell 102 further includes a side shell 212. The side shell 212 provides a substantially vertical outer wall for the package 100. The side shell 212 is terminates on the bottom at the bottom edge 110. The bottom edge 110 connects the side shell 212 to the bottom 108 of FIG. 2.

The side shell 212 includes a side shell interior surface 214. The side wall interior surface 214 is the surface of the side shell 212 that is exposed to the inside space 106.

The side shell 212 terminates at a side shell first end 216 in a side shell first edge 218. The side shell first edge 218, is an edge of the sheet 101. The side shell first edge 218 may be the bottom second crease 818 of FIG. 8, described below. The side shell first edge 218 terminates at the first bottom corner 146 of FIG. 2. The side shell first edge 218 further terminates at the top 107 of FIG. 1. The side shell first edge 218 is located substantially at the first corner 234, described below.

The side shell 212 terminates at a side shell second end 220 in a side shell second edge 222. The side shell second edge 222, is an edge of the sheet 101. The side shell second edge 222 may be the 922 of FIG. 8. The side shell second edge 222 runs along the side wall interior surface 214.

Figure 4:
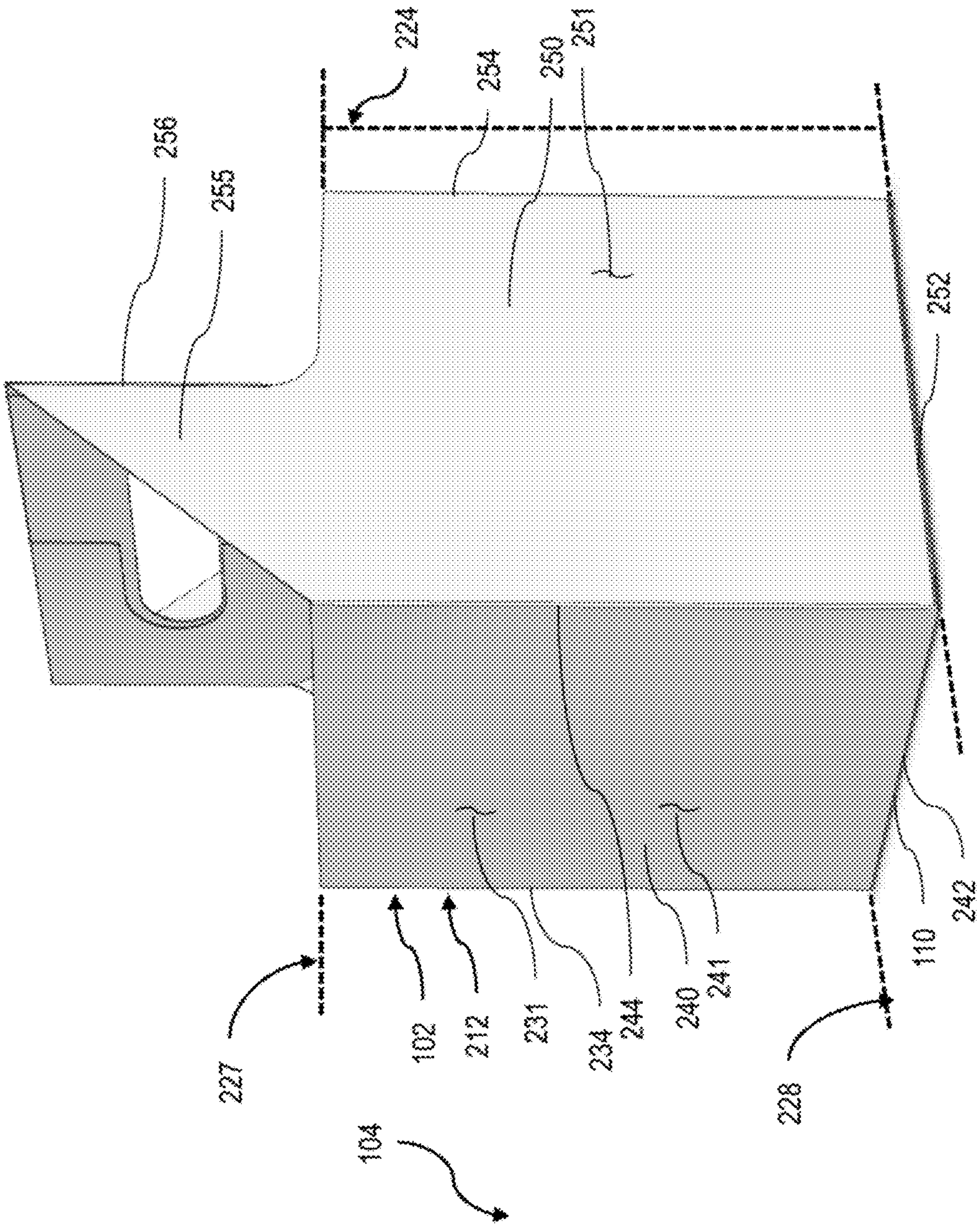
FIG. 4 is a second corner side view schematic diagram of the package of FIG. 1.

Referring now to FIG. 4 shown therein is a second corner side view schematic diagram of the package 100 of FIG. 1.

The side shell 212 includes a side shell main area 224. The side shell main area 224 is a portion of the side shell 212 bounded by a top plane 227. The top plane 227 is an imaginary plane in-line with the top 107 of FIG. 1. The side shell main area 224 is further bounded by a bottom plane 228. The bottom plane 228 is an imaginary plane in-line with the bottom 108 of FIG. 1.

The side shell main area 224 further includes a side shell exterior surface 231. The side shell exterior surface 231 is the surface of the side shell main area 224 exposed to the exterior environment 104.

The side shell exterior surface 231 is functionally seamless except where the side wall turns to form a substantial corner, such as the side corners 234, 244, 254, and 264 of FIG. 5, described below. Being seamless means that a surface is uninterrupted by functional discontinuities such as functional creases, cutouts, indentations, divots, scores, protrusions (of the surface or connected to it), or edges. In conventional systems, these discontinuities may be included to facilitate manufacture of the package 100. In conventional systems, these discontinuities may also be included to provide functionality to the package such as collapsibility for storing the package 100. Functional discontinuities do not include discontinuities included for primarily aesthetic reasons such as embossing, relief artwork, or raised artwork (i.e. a wax mark).

The seamless nature of the side wall main area is advantageous to the laying down of artwork on the side wall exterior surface 231. The method of application of the artwork to the side shell exterior surface 231 may presume an absence of discontinuities that may interfere with or complicate the laydown process. It also provides that the artwork will not be interrupted by discontinuities from the underlying side shell exterior surface 231 once the artwork is laid down.

Referring back to FIG. 3, the side shell further includes a side shell connecting tab 236. The shell connecting tab secures the side shell first end 236 to the side shell second end 220. The side shell connecting tab 236 is secured to the side shell first end 216 by a side shell securing medium 238 (not shown), such a glue, tape, or string. In a preferred embodiment, the side shell securing medium 238 is glue.

The side shell connecting tab 236 includes a side shell connecting tab exterior surface 241 (not shown). The side shell connecting tab exterior surface 241 is surface of the side shell connecting tab that faces the exterior environment 104. In a preferred embodiment, one or more of the side shell connecting tab exterior surface 241 and the side shell interior surface 214, in whole or in part, receives the side shell securing medium 238 to secure the side shell connecting tab 236 to the side shell interior surface 214.

The side shell connecting tab 236 terminates at the side shell second edge 222. The side shell connecting tab 236 further terminates at a first corner 234, described below.

The side shell further includes a first corner 234. In a preferred embodiment, the first corner 234 rotatably connects the side shell connecting tab 226 to a fourth side wall 270, described below. In a further embodiment, the first corner 234 rotatably connects the side shell connecting tab 236 to a first side wall 240, described below.

The first corner 234 is formed by folding the side shell connecting tab 236 such that it is configured at a substantial angle to the fourth side wall 270 or the first side wall 240 of FIG. 4, described below. The first corner 234, may be first side crease 934 of FIG. 8, described below.

The first corner 234 terminates at a first end at a bottom corner, such as the first bottom corner 146 of FIG. 2. The first corner 234 may terminate at a second end at the top 107 of FIG. 1.

Referring back to FIG. 4, the side shell 212 further includes a first side wall 240. The first side wall 240 forms a side of the side shell 212. The first side wall 240 may be the first side panel 940 of FIG. 8.

The first side wall 240 further includes a first side wall exterior surface 241. The first side wall exterior surface 241 is the surface of the first side wall that is exposed to the outside environment 104. The portion of the first side wall exterior surface 241 within the side shell exterior surface 231 is functionally seamless.

The first side wall 240 terminates at a first side wall bottom edge 242. The first side wall bottom edge 242 may be the bottom edge first leg 112 of FIG. 2. The first side wall bottom edge 242 rotatably connects the first side wall 240 to a bottom panel, such as the bottom first panel 150 of FIG. 2. The first side wall bottom edge 242 is formed by folding the first side wall 240 such that it is configured at a substantial angle to the bottom panel. The first side wall bottom edge 242 may be the first bottom crease 812 of FIG. 8.

The first side wall 240 further terminates at the first corner 234. In a preferred embodiment, the first side wall 240 terminates at the first corner 234 in the side shell first edge 218 of FIG. 3. In a further embodiment, the first side wall 240 is rotatably connected to the side shell connecting tab 236 of FIG. 3 by the first corner 234.

The first side wall 240 further terminates at a second corner 244, described below. The first side wall 240 is rotatably connected to the second side wall 250, described below, by the second corner 244.

The side shell 212 further includes a second corner 244. The second corner 244 rotatably connects the first side wall 240 to a second side wall 250, described below.

The second corner 244 is formed by folding the first side wall 240 such that it is configured at a substantial angle to the second side wall 250. The second corner 244 may be the second side crease 944 of FIG. 8.

The second corner 244 terminates in a bottom corner, such as the second bottom corner 124 of FIG. 2. The second corner 244 may terminate at a second end at the top 107 of FIG. 1.

The side shell 212 further includes a second side wall 250. The second side wall 250 forms a side of the side shell 212. The second side wall 250 may be the second side panel 950 of FIG. 8.

The second side wall 250 further includes a second side wall exterior surface 251. The second side wall exterior surface 251 is the surface of the second side wall 250 that is exposed to the outside environment 104. The portion of the second side wall exterior surface 251 within the side shell exterior surface 231 is functionally seamless.

The second side wall 250 terminates at a second side wall bottom edge 252. The second side wall bottom edge 252 may be the bottom edge second leg 118 of FIG. 2. The second side wall bottom edge 252 rotatably connects the second side wall 250 to a bottom panel, such as the bottom second panel 170 of FIG. 2. The second side wall bottom edge 252 is formed by folding the second side wall 250 such that it is configured at a substantial angle to the bottom panel. The second side wall bottom edge 252 may be the bottom second crease 818 of FIG. 8.

The second side wall 250 further terminates at the second corner 244. The second side wall 250 is rotatably connected to the first side wall 240 by the second corner 244.

The second side wall 250 further terminates at the third corner 254, described below. The second side wall 250 is rotatably connected to the third side wall 260 of FIG. 5, described below, by the third corner 254.

The second side wall 250 may include a handle first tab 255. The handle first tab 255 extends the second side wall 250 vertically above the top plane 227.

The handle first tab 255 terminates on one side in a handle first corner 256. The handle first corner 256 connects the handle first tab 255 to the handle first panel 312 of FIG. 6, described below. The handle first corner 256 is formed by folding the handle first tab 255 such that it is configured at a substantial angle to the handle first panel 312 of FIG. 6. The handle first corner 256 may be the handle first crease 953 of FIG. 8.

The side shell 212 further includes a third corner 254. The third corner 254 rotatably connects the second side wall 250 to a third side wall 260, described below.

The third corner 254 is formed by folding the second side wall 250 such that it is configured at a substantial angle to the third side wall 260. The third corner 254 may be the third side crease 954 of FIG. 8. The third corner 254 terminates in a bottom corner, such as the third bottom corner 134 of FIG. 2. The third corner 254 may terminate in a top end at the top 107 of FIG. 1.

Figure 5:
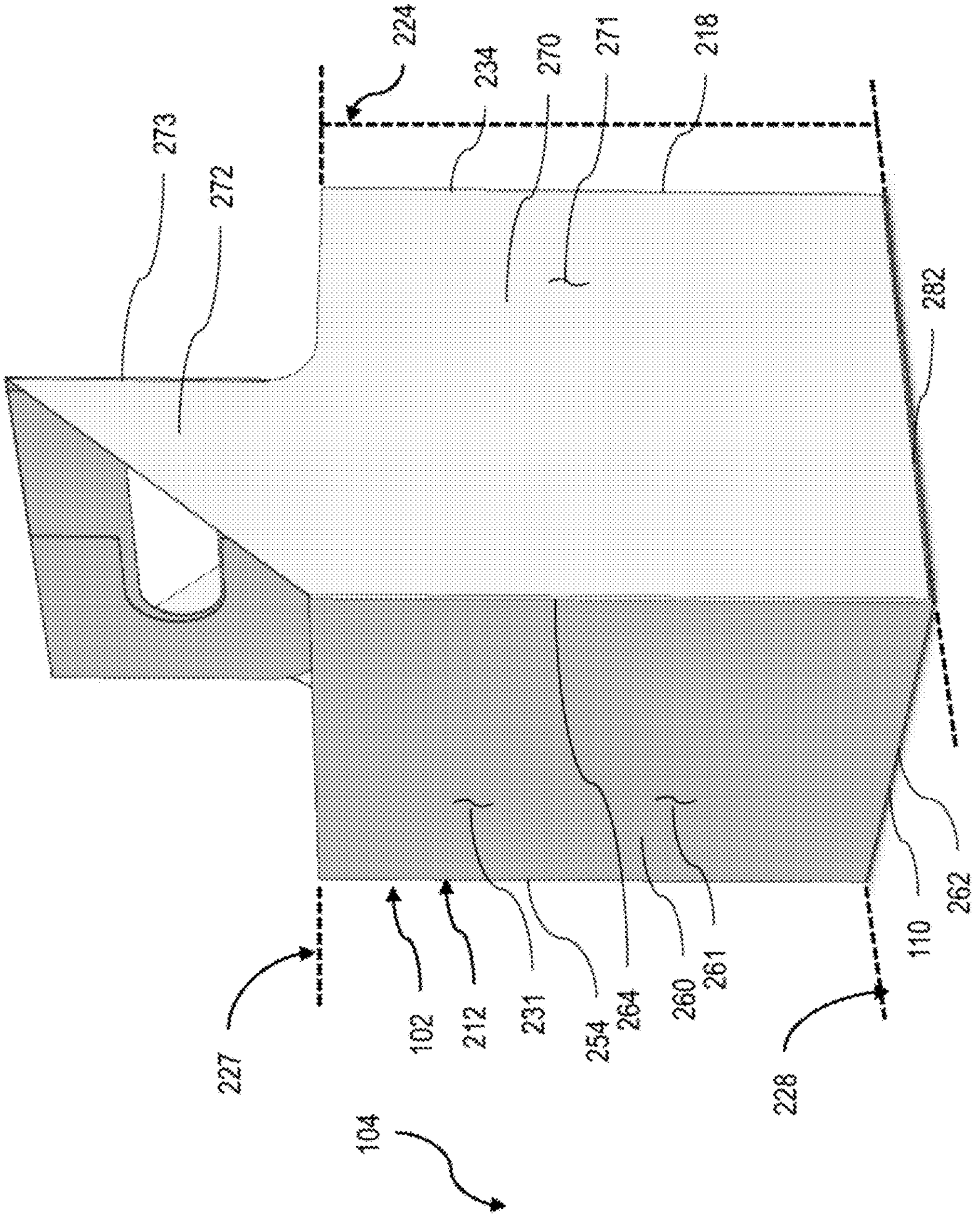
FIG. 5 is a fourth corner side view schematic diagram of the package of FIG. 1.

Referring now to FIG. 5 shown therein is a fourth corner side view schematic diagram of the package 100 of FIG. 1.

The side shell 212 further includes a third side wall 260. The third side wall 260 forms a side of the side shell 212. The third side wall 260 may be the third side wall panel 960 of FIG. 8.

The third side wall 260 further includes a third side wall exterior surface 261. The third side wall exterior surface 261 is the surface of the third side wall 260 that is exposed to the outside environment 104. The portion of the third side wall exterior surface 261 within the side shell exterior surface 231 is functionally seamless.

The third side wall 260 terminates at a third side wall bottom edge 262. The third side wall bottom edge 262 may be the bottom edge third leg 128 of FIG. 2. The third side wall bottom edge 262 connects the third side wall 260 to a bottom panel, such as the bottom third panel 180 of FIG. 2. The third side wall bottom edge 262 is formed by folding a crease such that the third side wall 260 is configured at a substantial angle to the bottom panel. The third side wall bottom edge 262 may be the third bottom crease 828 of FIG. 8.

The third side wall 260 further terminates at the third corner 254. The third side wall 260 is rotatably connected to the second side wall 250 by the third corner 254.

The third side wall 260 further terminates at the fourth corner 264, described below. The third side wall 260 is rotatably connected to the fourth side wall 270, described below, by the third corner 264.

The side shell 212 further includes a fourth corner 264. The fourth corner 264 rotatably connects the third side wall 260 to a fourth side wall 270, described below.

The fourth corner 264 is formed by folding the third side wall 260 such that it is configured at a substantial angle to the fourth side wall 270. The fourth corner 264 may be the fourth side crease 964 of FIG. 8, The fourth corner 264 terminates in a bottom corner, such as the fourth bottom corner 144 of FIG. 2. The fourth corner 264 may terminate at a second end at the top 107 of FIG. 1.

The side shell 212 further includes a fourth side wall 270. The fourth side wall 270 forms a side of the side shell 212.

The fourth side wall 270 further includes a fourth side wall exterior surface 271. The fourth side wall exterior surface 271 is the surface of the fourth side wall 270 that is exposed to the outside environment 104. The portion of the fourth side wall exterior surface 271 within the side shell exterior surface 231 is functionally seamless.

The fourth side wall 270 terminates at a fourth side wall bottom edge 282. The fourth side wall bottom edge 282 may be the bottom edge fourth leg 138 of FIG. 2. The fourth side wall bottom edge 282 connects the fourth side wall 270 to a bottom panel, such as the bottom fourth panel 190 of FIG. 2. The fourth side wall bottom edge 282 is formed by folding the fourth side wall 270 such that it is configured at a substantial angle to the bottom panel. The fourth side wall bottom edge 282 may be the bottom fourth crease 838 of FIG. 8.

The Fourth side wall 270 further terminates at the fourth corner 264. The fourth side wall 270 is rotatably connected to the third side wall 260 by the fourth corner 264.

The fourth side wall 270 further terminates at the first corner 234. In a preferred embodiment, the fourth side wall 270 is rotatably connected to the side shell connecting tab 236 of FIG. 3 by the first corner 234. In a further embodiment, the fourth side wall 270 terminates at the first corner 234 in the side shell first edge 218.

The fourth side wall 270 may include a second handle tab 275. The second handle tab 275 extends the fourth side wall 270 vertically above the top plane 227.

The second handle tab 275 terminates on one side in a second handle corner 276. The second handle corner 276 connects the second handle tab 275 to the handle second panel 316 of FIG. 6, described below. The second handle corner 276 is formed by folding the second handle tab 275 such that it is configured at a substantial angle to the handle first panel 312 of FIG. 6. The second handle corner 276 may be the handle second crease 976 of FIG. 8.

Figure 6:
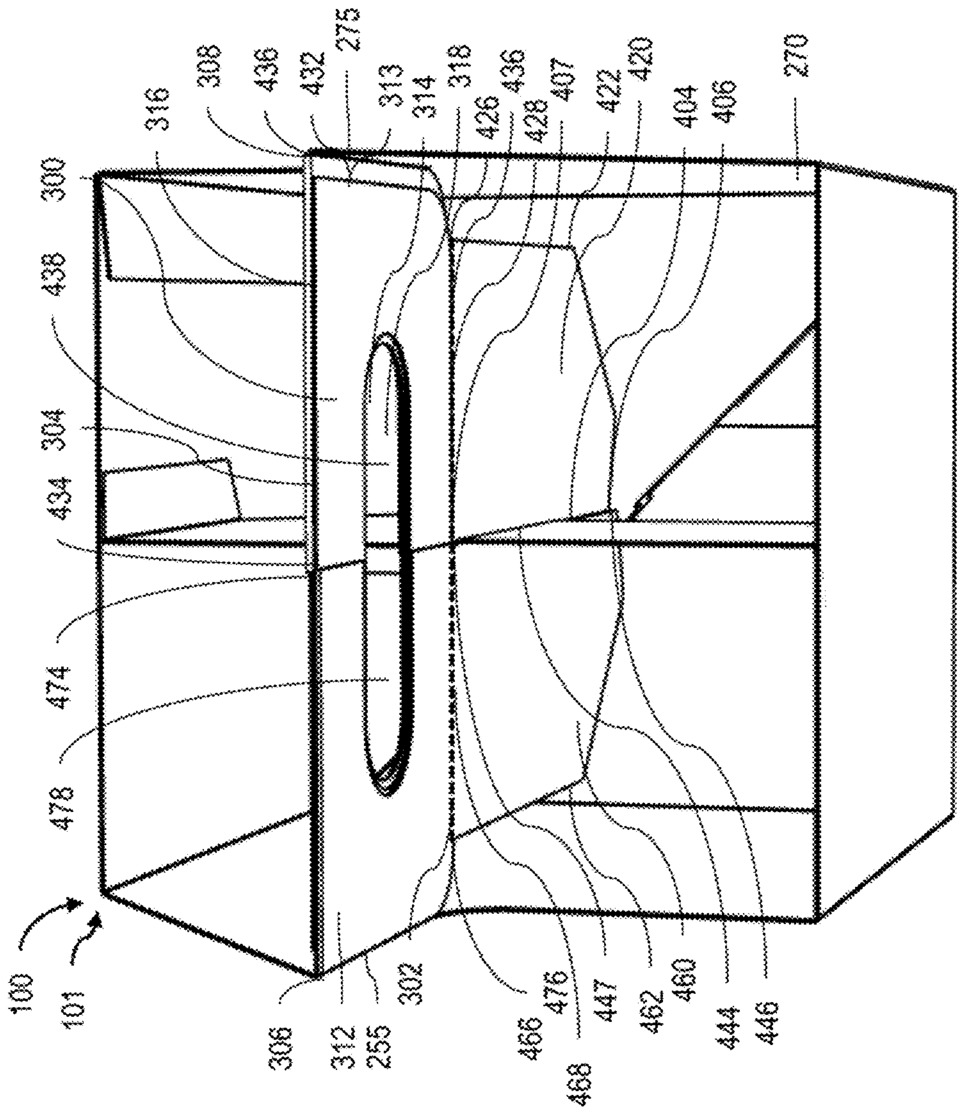
FIG. 6 is a further perspective view schematic diagram of the package of FIG. 1 looking down from above the first side wall.

Referring now to FIG. 6 shown therein is further perspective view schematic diagram of the package of FIG. 1 looking down from above the first side wall.

In a preferred embodiment, the package 100 includes a handle 300. The handle 300 provides a structure to be grasped when a person is carrying the package. The handle 300 may also facilitate storage or display. The handle 300 may further provide a structure for hanging the package.

The handle 300 is a substantially planer structure. The handle 300 may be layered. The layering may provide the handle 300 with a thickness. The layers of the handle 300 may be secured together by a handle securing medium 301 (not shown), such as glue, tape, or string. In a preferred embodiment the handle securing medium 301 is glue. The handle securing medium 301 may be applied to some or all of the interior surfaces of the layers of the handle 300 to secure the layers together.

The handle 300 terminates at a handle bottom edge 302. The handle bottom edge 302 is located substantially at the intersection of the handle 300 and the top 107 of FIG. 1.

The handle 300 terminates at a first side in the handle first corner 256. The handle 300 terminates at a second side in the second handle corner 276.

The handle 300 terminates in a top side in a handle top edge 304. The handle top edge 304 terminates at a first end in a handle first top corner 306. The handle first top corner 306 is the intersection to the handle top edge 304 and the handle first corner 256. The handle top edge terminates at a second end in a handle second top corner 308. The handle second top corner 308 is the intersection to the handle top edge 304 and the handle second corner 276.

The handle includes a handle first panel 312. In a preferred embodiment, the handle first panel 312 is the outermost layer of the handle 300 facing the first side wall 240.

The handle first panel 312 terminates in on a first side in the handle first corner 256. The handle first corner 256 connects the handle first panel 312 to the handle first tab 255, as described above.

The handle first panel 312 terminates in a top side in a handle top edge 304. The handle first panel 312 terminates at the handle bottom edge 302.

The handle first panel 312 further terminates on a second side in a handle first edge 313. The handle first edge 313 is an edge of the sheet 101. The handle first edge 313 may be the handle first edge 1013 of FIG. 8, described below. In a preferred embodiment, the handle first edge 313 is located at the inside of the handle second corner 276.

The handle first panel 312 may include a handle first cutout 314. The handle first cutout 314 is a portion of the handle first panel 312 that is configured such that a slot is formed in the handle first panel 312. The handle first cutout 314 is configured such that a hand or object may be placed through the handle first cutout 314.

In an embodiment, the handle first cutout 314 may be formed by removing entirely material of the handle first panel 312. In a further embodiment, the handle first cutout 314 is formed by cutting a portion of the circumference of the slot and folding the handle first panel 312 material.

The handle includes a handle second panel 316. In a preferred embodiment, the handle second panel 316 is the outermost layer of the handle 300 facing the third side wall 260.

The handle second panel 316 terminates in on a first side in the handle second corner 276. The handle second corner 276 connects the handle second panel 316 to the second handle tab 275, as described above.

The handle second panel 316 terminates in a top side in a handle top edge 304. The handle second panel 316 terminates at the handle bottom edge 302.

The handle second panel 316 further terminates on a second side in a handle second edge 317 (not shown). The handle second edge 317 is an edge the sheet 101. The handle second edge 317 may be the handle second panel segment 1017 of FIG. 8. In a preferred embodiment, the handle second edge 317 is located at the inside of the handle first corner 256.

The handle second panel 316 may include a handle second cutout 318. The handle second cutout 318 is a portion of the handle second panel 316 that is configured such that a slot is formed in the handle second panel 316. The handle second cutout 318 is configured such that a hand or object may be placed through the handle second cutout 318.

In an embodiment, the handle second cutout 318 may be formed by entirely removing material of the handle second panel 316. In a further embodiment, the handle second cutout 318 is formed by cutting a portion of the circumference of the slot and folding the handle second panel 316 material.

Figure 7:
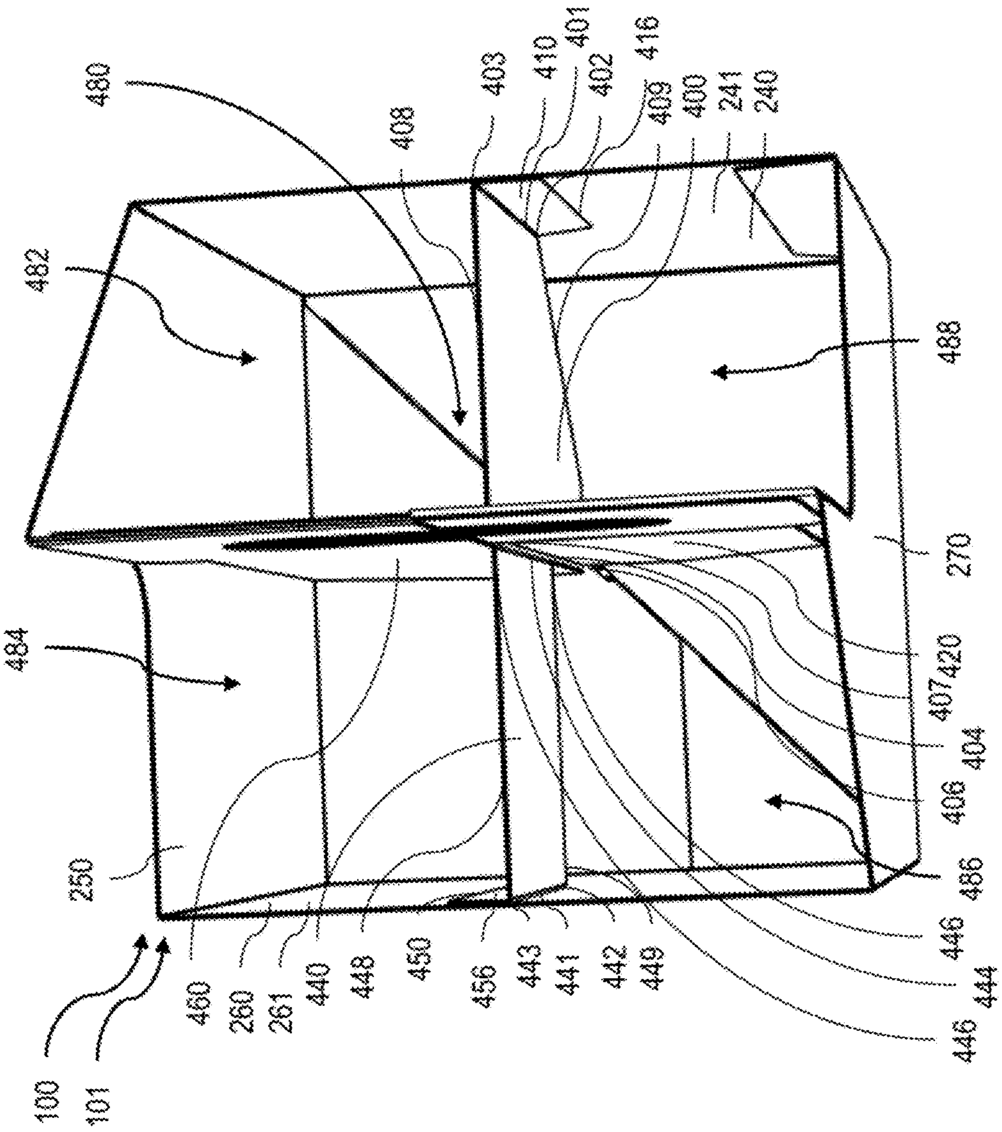
FIG. 7 is a further perspective view schematic diagram of the package of FIG. 1 looking down from above the fourth side wall.

Referring now to FIG. 7 shown therein is further perspective view schematic diagram of the package 100 of FIG. 1 looking down from above the fourth side wall 270.

The package 100 further includes a first partition 400. The first partition 400 divides the inside space 106. The first partition 400 provides a structure that intercedes between articles placed in the package 100. The first partition 400 may also reinforce the structure of the package 100.

The first partition 400 is formed by a panel of the sheet 101. The first partition may be the first partition 1100 of FIG. 8, described below. The first partition 400 is configured to be substantially vertical. The first partition 400 is further configured to be substantially perpendicular to the first side wall 240. The first partition 400 is configured to be substantially perpendicular to the bottom 108.

The first partition 400 terminates at a first side in a first partition tab corner 402. In a preferred embodiment, the first partition tab corner 401 rotatably connects the first partition 400 to the first partition connecting tab 410, described below. The first partition tab corner 401 is formed by folding the first partition connecting tab 410 such that the first partition 400 is configured at a substantial angle to first partition connecting tab 410, described below. The first partition tab corner 401 may be the first partition tab crease 1101 of FIG. 8. The first partition tab corner 401 is configured to run vertically along the side shell interior surface 214 of FIG. 3.

The first partition tab corner 401 terminates at a bottom end in a first partition tab corner bottom 402. The first partition tab corner bottom 402 may be located anywhere between the top 107 and the bottom 108.

The first partition tab corner 401 terminates at a top end in a first partition tab corner top 403. The first partition tab corner top 403 may be located just under the top 107.

The first partition 400 terminates at a second side in a fourth partition corner 404. The fourth partition corner 404 rotatably connects the first partition 400 to the fourth partition 420, described below. The fourth partition corner 404 is formed by folding the sheet 101 such that that the first partition 400 is configured at a substantial angle to fourth partition 420, described below. The fourth partition corner 404 may be the fourth partition crease 1104 of FIG. 8. The fourth partition corner 404 is configured to run vertically. In a preferred embodiment, the fourth partition corner is substantially located along a vertical axis at the horizontal center of the package 100.

The fourth partition corner 404 terminates at a bottom end in a fourth partition corner bottom 406. The fourth partition corner bottom 406 may be located anywhere between the top 107 and the bottom 108.

The fourth partition corner 404 terminates at a top end in a fourth partition corner top 407. The fourth partition corner top 407 may be located just under the top 107.

The first partition 400 terminates at a top side in a first partition top edge 408. In a preferred embodiment, the first partition top edge 408 is an edge the sheet 101. The first partition top edge 408 may be the first partition top edge 1108 of FIG. 8. The first partition top edge 408 may run just under the top 107. The first partition top edge 408 terminates at a first end in the first partition tab corner top 403. The first partition top edge 408 terminates at a second end in the fourth partition corner top 407.

The first partition 400 terminates at a bottom side in a first partition bottom edge 409. In a preferred embodiment, the first partition bottom edge 409 is an edge the sheet 101. The first partition bottom edge 409 may be the first partition bottom edge 1109 of FIG. 8. The first partition bottom edge 409 may not be one straight line in that the first partition bottom edge may include one or more segments any of which may be curved.

The first partition bottom edge 409 terminates at a first end in the first partition tab corner bottom 402. The first partition bottom edge 409 terminates at a second end in the fourth partition corner bottom 406.

The package 100 further includes a first partition connecting tab 410. The first partition connecting tab 410 secures the first partition 400 to the side shell interior surface 214 of FIG. 3. The first partition connecting tab 410 is formed by a panel of the sheet 101. The first partition connecting tab 410 may be the first partition connecting tab 1110 of FIG. 8.

The first partition connecting tab 410 is secured to the side shell interior surface 214 of FIG. 3 by a first partition securing medium 412 (not shown), such a glue, tape, or string. In a preferred embodiment, the first partition securing medium 412 is glue.

The first partition connecting tab 410 includes a first partition connecting tab exterior surface 414 (not shown). The first partition connecting tab exterior surface 414 is surface of the first partition connecting tab 410 that faces the exterior environment 104. In a preferred embodiment, one or more of the first partition connecting tab exterior surface 414 and the side shell interior surface 214, in whole or in part, receives the first partition securing medium 412 to secure the first partition connecting tab 410 to the side shell interior surface 214.

The first partition connecting tab 410 terminates on a first side in the first partition tab corner 402.

The first partition connecting tab 410 further terminates in a first partition connecting tab edge 416. The first partition connecting tab edge 416 is an edge of the sheet 101. The first partition connecting tab edge 416 may be the first partition connecting tab edge 1116 of FIG. 8. The first partition connecting tab edge 416 terminates at top end in the first partition tab corner top 403. The first partition connecting tab edge 416 terminates in a bottom end in the first partition tab corner bottom 402.

Referring back to FIG. 6, the package further includes a fourth partition 420. The fourth partition 420 divides the inside space 106. The fourth partition 420 provides a structure that intercedes between articles placed in the package 100. The fourth partition 420 may also reinforce the structure of the package 100.

The fourth partition 420 is formed by a panel of the sheet 101. The fourth partition 420 may be formed from the fourth partition 1120 of FIG. 8, described below. The fourth partition 420 is configured to be substantially vertical. The fourth partition 420 is further configured to be substantially perpendicular to the fourth side wall 270. The fourth partition 420 is configured to be substantially perpendicular to the bottom 108.

The fourth partition 420 terminates at a first side in a fourth partition first edge 422. In a preferred embodiment, the fourth partition first edge 422 is an edge of the sheet 101. The fourth partition first edge 422 may be the fourth partition first edge 1122 of FIG. 8

The fourth partition first edge 422 terminates at a bottom end in the fourth partition corner bottom 406.

The fourth partition first edge 422 terminates at a top end in the fourth partition top edge end 426. The fourth partition top edge end 426 is located just under the top 107. The fourth partition top edge end 426 may be located anywhere between the fourth side wall 270 and the horizontal center of the package.

The fourth partition 420 terminates at a second side in the fourth partition corner 404.

The fourth partition 420 terminates at a top side in a fourth partition top edge 428. In a preferred embodiment, the fourth partition top edge 428 is a seam formed by a intersection of the handle bottom edge 302 with the fourth partition 420. The fourth partition top edge 428 runs just under the top 107.

The fourth partition top edge 428 terminates at a first end in the fourth partition top edge end 426. The fourth partition top edge 428 terminates at a second end in the fourth partition corner top 407.

In a preferred embodiment, the package further includes a fourth partition handle tab 430 (not shown). The fourth partition handle tab 430 is an extension of the fourth partition 420 that extends above the top 107. The fourth partition handle tab 430 may be the fourth partition handle tab 1130 of FIG. 8. The fourth partition handle tab 430 provides a structure for securing the fourth partition 420 to the handle 300.

In a preferred embodiment, the fourth partition handle tab 430 intercedes the handle first panel 312 and the handle second panel 316. This intercession creates a layering of the handle 300, described above.

The fourth partition handle tab 430 terminates at a bottom end in the fourth partition top edge 428.

The fourth partition handle tab 430 terminates at a top edge in the handle top edge 304. The fourth partition handle tab 430 is connected to the handle 300 by the handle top edge 304. The connection between the fourth partition handle tab 430 and the handle 300 is formed by folding the sheet 101. This folding may occur at a crease located at the handle top edge 304. The crease may be the crease 1174 of FIG. 8.

The fourth partition handle tab 430 terminates at a first side in a fourth partition handle tab first edge 432. The fourth partition handle tab first edge 432 is an edge of the sheet 101.

Figure 8:
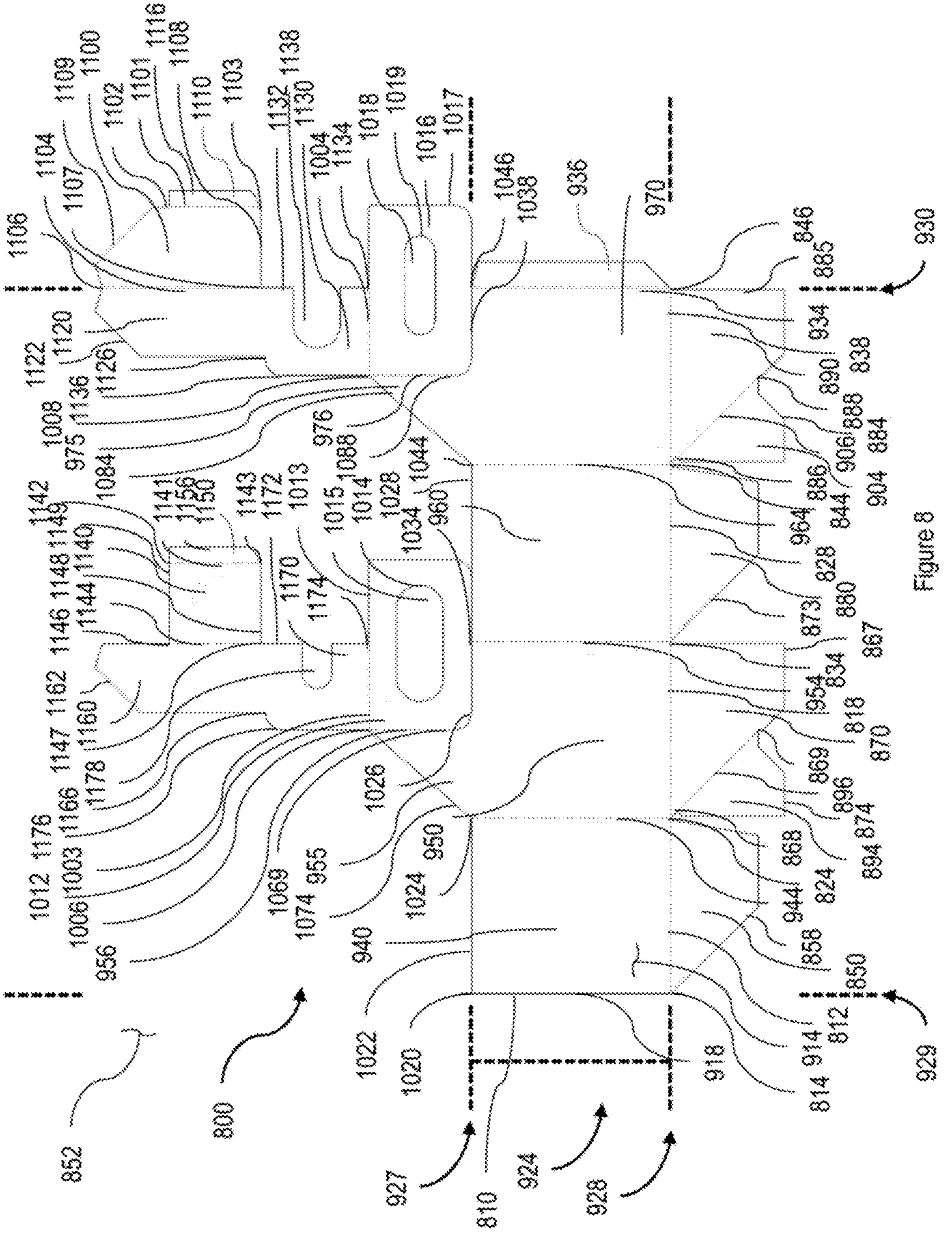
FIG. 8 is a top view schematic diagram of a sheet, according to an embodiment.

The fourth partition handle tab first edge 432 may be the fourth partition handle tab first edge 1132 of FIG. 8.

The fourth partition handle tab first edge 432 terminates at a first end in the fourth partition corner top 407.

The fourth partition handle tab first edge 432 terminates at a second end in a fourth partition handle tab first edge end 434. The fourth partition handle tab first edge end 434 is the located at the handle top edge 304.

The fourth partition handle tab 430 terminates at a second side in a fourth partition handle tab second edge 436. The fourth partition handle tab second edge 436 is and edge of the sheet 101. The fourth partition handle tab second edge 436 may be the fourth partition handle tab second edge 1136 of FIG. 8. The fourth partition handle tab second edge 436 may be configured such that the fourth partition handle tab second edge 436 is shaped substantially as the handle first corner 256. In a preferred embodiment, the fourth partition handle tab second edge 436 is located just inside the handle first corner 256.

The fourth partition handle tab second edge 436 terminates at a bottom end in the fourth partition top edge end 426. The fourth partition handle tab second edge 436 terminates at a top end in the handle first top corner 306.

The fourth partition handle tab 430 may include a fourth partition handle tab cutout 438. The fourth partition handle tab cutout 438 aligns with the handle first cutout 314. The fourth partition handle tab cutout 438 is a portion of the fourth partition handle tab 430 that is configured such that a slot is formed in the fourth partition handle tab 430. The fourth partition handle tab cutout 438 is configured such that a hand or object may be placed through the handle 300.

In an embodiment, the fourth partition handle tab cutout 438 may be formed by removing material entirely from the fourth partition handle tab 430. In a further embodiment, the fourth partition handle tab cutout 438 is formed by cutting a portion of the circumference of the slot and folding the fourth partition handle tab 430 material.

Referring back to FIG. 7, the package 100 further includes a third partition 440. The third partition 440 divides the inside space 106. The third partition 440 provides a structure that intercedes between articles placed in the package 100. The third partition 440 may also reinforce the structure of the package 100.

The third partition 440 is formed by a panel of the sheet 101. The third partition 440 may be formed by the third partition panel 1140 of FIG. 8. The third partition 440 is configured to be substantially vertical. The third partition 440 is further configured to be substantially perpendicular to the third side wall 260. The third partition 440 is configured to be substantially perpendicular to the bottom 108.

The third partition 440 terminates at a first side in a third partition tab corner 441. In a preferred embodiment, the third partition tab corner 441 rotatably connects the third partition 440 to the third partition connecting tab 450, described below. The third partition tab corner 441 is formed by folding a crease in the sheet 101 such that the third partition 440 is configured at a substantial angle to third partition connecting tab 450, described below. The third partition tab corner 441 may be third partition tab crease 1141 of FIG. 8. The third partition tab corner 441 is configured to run vertically along the side shell interior surface 214 of FIG. 3.

The third partition tab corner 441 terminates at a bottom end in a third partition tab corner bottom 442. The third partition tab corner bottom 442 may be located anywhere between the top 107 and the bottom 108.

The third partition tab corner 441 terminates at a top end in a third partition tab corner top 443. The third partition tab corner top 443 may be located just under the top 107.

The third partition 440 terminates at a second side in a second partition corner 444. The second partition corner 444 rotatably connects the third partition 440 to the second partition 460, described below. The second partition corner 444 is formed by folding a crease in the sheet 101 such that the fourth partition 420 is configured at a substantial angle to second partition 460, described below. The second partition corner 444 may be the second partition crease 1144 of FIG. 8. The second partition corner 444 is configured to run vertically. In a preferred embodiment, the second partition corner 444 is substantially located along a vertical axis at the horizontal center of the package 100.

The second partition corner 444 terminates at a bottom end in a second partition corner bottom 446. The second partition corner bottom 446 may be located anywhere between the top 107 and the bottom 108.

The second partition corner 444 terminates at a top end in a second partition corner top 447. The second partition corner top 447 may be located just under the top 107.

The third partition 440 terminates at a top side in a third partition top edge 448. In a preferred embodiment, the third partition top edge 448 is an edge the sheet 101. The third partition top edge 448 may be the third partition top edge 1148 of FIG. 8. The third partition top edge 448 may run just under the top 107. The third partition top edge 448 terminates at a first end in the third partition tab corner top 443. The third partition top edge 448 terminates at a second end in the third partition corner top 447.

The third partition 440 terminates at a bottom side in a third partition bottom edge 449. In a preferred embodiment, the third partition bottom edge 449 is an edge the sheet 101. The third partition bottom edge 449 may be the third partition bottom edge 1149 of FIG. 8. The third partition bottom edge 449 may not be one straight line in that the third partition bottom edge 449 may include one or more segments any of which may be curved.

The third partition bottom edge 449 terminates at a first end in the third partition tab corner bottom 442. The third partition bottom edge 449 terminates at a second end in the third partition corner bottom 446.

The package 100 further includes a third partition connecting tab 450. The third partition connecting tab 450 secures the third partition 440 to the side shell interior surface 214 of FIG. 3. The third partition connecting tab 450 is formed by a panel of the sheet 101. The third partition connecting tab 450 may be third partition connecting tab 1150 of FIG. 8.

The third partition connecting tab 450 is secured to the side shell interior surface 214 of FIG. 3 by a third partition securing medium 452 (not shown), such a glue, tape, or string. In a preferred embodiment, the third partition securing medium 452 is glue.

The third partition connecting tab 450 includes a third partition connecting tab exterior surface 454 (not shown). The third partition connecting tab exterior surface 454 is surface of the third partition connecting tab 450 that faces the exterior environment 104. In a preferred embodiment, one or more of the third partition connecting tab exterior surface 454 and the side shell interior surface 214 of FIG. 3, in whole or in part, receives the third partition securing medium 452 to secure the third partition connecting tab 450 to the side shell interior surface 214 of FIG. 3.

The third partition connecting tab 450 terminates on a first side in the third partition tab corner 452.

The third partition connecting tab 450 further terminates in a third partition connecting tab edge 456. The third partition connecting tab edge 456 is an edge of the sheet 101. The third partition connecting tab edge 456 may be the third partition connecting tab edge 1156 of FIG. 8. The third partition connecting tab edge 456 terminates at top end in the third partition tab corner top 443. The third partition connecting tab edge 456 terminates at a bottom end in the third partition tab corner bottom 442.

Referring back to FIG. 6, the package further includes a second partition 460. The second partition 460 divides the inside space 106. The second partition 460 provides a structure that intercedes between articles placed in the package 100. The second partition 460 may also reinforce the structure of the package 100.

The second partition 460 is formed by a panel of the sheet 101. The second partition 460 may be the second partition 1160 of FIG. 8, described below. The second partition 460 is configured to be substantially vertical. The second partition 460 is further configured to be substantially perpendicular to the second side wall 250. The second partition 460 is configured to be substantially perpendicular to the bottom 108.

The second partition 460 terminates at a first side in a second partition first edge 462. In a preferred embodiment, the second partition first edge 462 is an edge of the sheet 101. The second partition first edge 462 may be the second partition first edge 1162 edge 1162 of FIG. 8.

The second partition first edge 462 terminates at a bottom end in the second partition corner bottom 446.

The second partition first edge 462 terminates at a top end in the second partition top edge end 466. The second partition top edge end 466 is located just under the top 107. The second partition top edge end 466 may be located anywhere between the second side wall 250 and the horizontal center of the package.

The second partition 460 terminates at a second side in the second partition corner 444.

The second partition 460 terminates at a top side in a second partition top edge 468. In a preferred embodiment, the second partition top edge 468 is a seam formed by a intersection of the handle bottom edge 302 with the second partition 460. The second partition top edge 468 runs just under the top 107.

The second partition top edge 468 terminates at a first end in the second partition top edge end 446. The second partition top edge 468 terminates at a second end in the second partition corner top 447.

In a preferred embodiment, the package further includes a second partition handle tab 470 (not shown). The second partition handle tab 470 is an extension of the second partition 470 that extends above the top 107. The second partition handle tab 470 may be the second partition handle tab 1170 of FIG. 8. The second partition handle tab 470 provides a structure for securing the second partition 460 to the handle 300.

In a preferred embodiment, the second partition handle tab 470 intercedes the handle first panel 312 and the handle second panel 316. This intercession creates a layering of the handle 300, described above.

The second partition handle tab 470 terminates at a bottom end in the second partition top edge 468.

The second partition handle tab 470 terminates at a top edge in the handle top edge 304. The second partition handle tab 470 is connected to the handle 300 by the handle top edge 304. The connection between the second partition handle tab 470 and the handle 300 is formed by folding the sheet 101. This folding may occur at a crease located at the handle top edge 304. The handle top edge 304 may be the fourth partition handle tab crease 1004 of FIG. 8.

The second partition handle tab 470 terminates at a first side in a second partition handle tab first edge 472. The second partition handle tab first edge 472 (not shown) is an edge of the sheet 101. The second partition handle tab first edge 472 may be the second partition handle tab first edge 1172 of FIG. 8. The second partition handle tab first edge 472 terminates at a bottom end in the second partition corner top 447. The second partition handle tab first edge 472 terminates at a top end in a second partition handle tab first edge end 474. The second handle tab first edge end 474 end is the located at the handle top edge 304.

The second partition handle tab 470 terminates at a second side in a second partition handle tab second edge 476. The second partition handle tab second edge 476 is and edge of the sheet 101. The second partition handle tab second edge 476 may be the second partition handle tab second edge 1176 of FIG. 8. The second partition handle tab second edge 476 may be configured such that the second partition handle tab second edge 476 is shaped substantially as the handle second corner 276. In a preferred embodiment, the second partition handle tab second edge 476 is located just inside the second handle corner 276. The second partition handle tab second edge 476 terminates at a bottom end in the second partition top edge end 466. The second partition handle tab second edge 476 terminates at a top end in the handle first top corner 306.

The second partition handle tab 470 may include a second partition handle tab cutout 478. The second partition handle tab cutout 478 aligns with the handle first cutout 314. The second partition handle tab cutout 478 is a portion of the second partition handle tab 470 that is configured such that a slot is formed in the second partition handle tab 470. The second partition handle tab cutout 478 is configured such that a hand or object may be placed through the handle 300.

In an embodiment, the second partition handle tab cutout 478 may be formed by removing material entirely from the second partition handle tab 470. In a further embodiment, the second partition handle tab cutout 478 is formed by cutting a portion of the circumference of the slot and folding the second partition handle tab 470 material.

Referring back to FIG. 7, the inside space 106 further includes four compartments 480. The compartments 480 each are for receiving an article such as a bottle or a can.

The compartments 480 include first compartment 482. The first compartment 482 is the portion of the inside space 106 substantially contained within the outer shell 102, the top 107, the first partition 400, and the second partition 460.

The compartments 480 include second compartment 484. The second compartment 484 is the portion of the inside space 106 substantially contained within the outer shell 102, the top 107, the second partition 460, and the third partition 440.

The compartments 480 include Third compartment 486. The third compartment 486 is the portion of the inside space 106 substantially contained within the outer shell 102, the top 107, the third partition 440, and the fourth partition 420.

The compartments 480 include fourth compartment 488. The fourth compartment 488 is the portion of the inside space 106 substantially contained within the outer shell 102, the top 107, the fourth partition 420, and the first partition 400.

While this embodiment of the package 100 includes four side walls, it is contemplated that the package 100 may include any number of side walls.

Referring now to FIG. 8, shown therein is a top view schematic diagram of a sheet 800 according to an embodiment. This sheet 800 may be the sheet 101 of FIG. 1. The sheet 800 is configured for forming the package 100 of FIG. 1. The sheet 800 is a single piece. The sheet 800 is flat. The sheet 800 is composed of a foldable material such that when folded it maintains a structural connection along the fold. The sheet 800 is composed of material, such as cardboard or sheet metal, that, when fold and secured, retains its shape under its own weight. In a preferred embodiment, the sheet 800 is composed of a material capable of supporting articles when the sheet 800 is folded and secured in a package, such as the package 100 of FIG. 1. In a preferred embodiment, the sheet 800 is composed of carboard.

The sheet includes connected panels. Each panel forms a distinct structural element of the package 100. The panels may terminate in edge segments or creases, described below.

The sheet 800 includes an outside edge 810. The sheet 800 terminates in the outside edge 800. Part of the outside edge 800 may abut other parts of the outside edge 800. The outside edge 810 is continuous such that forms a complete border of the sheet 800.

The outside edge 810 includes a series of connected edge segments. Each segment defines, partially or fully, the termination of a panel.

The edge segments terminate in at a first end and a second end in an edge corner. An edge corner connects edge segments. At each edge corner the connected edge segments are configured at a substantial angle to each other such that they form a corner. Each edge corner may be rounded. Each edge segment is the entire segment of the outside edge between the edge corners even though the edge segment may curve or include additional corners indicating further segmentation.

The sheet 800 further includes creases. Each crease defines, partially or fully, the termination of a panel. Each crease rotatably connects two panels. Each crease facilitates folding the sheet 800 to for a package, such as the package 100 of FIG. 1. Each crease may be scored to facilitate folding.

Each crease may terminate at an edge corner. Each crease may terminate where the crease intersects with the outside edge.

The sheet 800 further includes a sheet interior surface 914. The sheet interior surface 914 is the surface of the sheet 800 that faces up when the sheet 800 is placed on a resting surface 852. The sheet interior surface 914 may form, among other things, the side shell interior surface 214 of FIG. 4. In a preferred embodiment, the sheet interior surface 914 is a rough surface, such as an unfinished surface. The rough nature may promote reception of the securing medium.

The sheet 800 further includes a sheet exterior surface 931 (not shown). The sheet exterior surface 931 is the surface of the sheet 800 that faces down when the sheet 800 is placed on a resting surface 852. The sheet exterior surface 931 may form, among other things, an side shell exterior surface 231 of FIG. 4. In a preferred embodiment, the exterior surface 931 receives artwork relating to the intended articles or use of the package 100 of FIG. 1.

The sheet 800 may further include cutouts. Each cutout may be full in that the cutout material is fully severed from the sheet 800. Each cutout may be partial in that the cutout material remains connected to the sheet 800 by a crease.

The sheet includes a side shell main area 924. The side shell main area 824 may form the side shell main area 224 of FIG. 4. The side shell main area 924 terminates in a top line 927. The top line 927 is an imaginary line in-line with portion of the outside edge 810 that would define the top 107 of FIG. 1. The side shell main area 924 further terminates in a bottom line 928. The bottom line 928 is an imaginary line in-line with the creases for would define the bottom 108 of FIG. 1. The side shell main area 924 terminates on a first side in first side line 929. The first side line 929 is an imaginary line in-line with the side wall segment 918, described below. The side shell main area 924 terminates on a second side in a second side line 930. The second side line 930 is an imaginary line in-line with the first side crease 934, described below.

The side shell main area 924 is functionally seamless except for first side crease 934, the second side crease 944, the third side crease 954, and the fourth side crease 964, described below and the creases and edge segments at which the side sell main area terminates. These excluded side wall creases are for forming the side wall corners of the package 100 of FIG. 1 such as the side wall corners 234, 244, 254, and 264 of FIGS. 4 and 5.

The sheet 800 further includes a bottom first panel 850. The bottom first panel 850 is a panel for forming a bottom panel such as the bottom first panel 150 of FIG. 2.

The bottom first panel 850 terminates in at bottom edge in a bottom first panel segment 858. The bottom first panel segment 858 is an edge segment. The bottom first panel segment 858 terminates at a first end in a side wall edge bottom corner 814. The bottom first panel segment 858 terminates at a second end in a second bottom corner 824.

The bottom first panel 850 terminates at a top edge in a bottom first crease 812. The bottom first crease 812 is a crease, such as the crease that forms the bottom first edge leg 112 of FIG. 2. The bottom first crease 812 connects the bottom first panel 850 to the first side wall panel 940, described below. The bottom first crease 812 terminates at a first end in the side wall edge bottom corner 814. The bottom first crease 812 terminates at a second end in the bottom second corner 824.

The sheet 800 further includes a bottom second panel 870. The bottom second panel 870 is a panel for forming a bottom panel such as the bottom second panel 170 of FIG. 2.

The bottom second panel 870 terminates in at bottom edge in a bottom second panel segment 867. The bottom second panel segment 867 is an edge segment. The bottom second panel segment 867 terminates at a first end in the bottom second corner 824. The bottom second panel segment 867 terminates at a second end in the third bottom corner 834. In a preferred embodiment, second panel segment 867 may include a first auto-bottom segment 874 for described below.

The bottom second panel 870 terminates at a top edge in a bottom second crease 818. The bottom second crease 818 is a crease, such as the crease that forms the bottom second edge leg 118 of FIG. 2. The bottom second crease 818 connects the bottom second panel 870 to the second side wall panel 950, described below. The bottom second crease 818 terminates at a first end in the bottom second corner 824. The bottom second crease 818 terminates at a second end in the bottom third corner 834.

In a preferred embodiment, the bottom second panel 870 includes a first auto-bottom panel 894. The first auto-bottom panel 894 is a panel for forming an auto-bottom panel such as the first auto-bottom panel 194 of FIG. 2.

The first auto-bottom panel 894 terminates in a first auto-bottom panel segment 874. The first auto-bottom panel segment 874 is an edge segment that is a subsegment of the second panel segment 867. The first auto-bottom panel segment 874 terminates at a first end in a first auto-bottom crease first end 868. The first auto-bottom panel segment 874 terminates at a second end in a first auto-bottom crease second end 869.

The second bottom panel 870 further includes a first auto-bottom crease 896. The first auto bottom crease 896 rotatably connects the first auto-bottom panel 894 to the rest of the second bottom panel 870. The first auto-bottom panel 894 further terminates in the first auto-bottom crease 896. The first auto-bottom crease 896 terminates at a first end in the first auto-bottom crease first end 868. The first auto-bottom crease 896 terminates at a second end in the first auto-bottom crease second end 869.

The sheet 800 further includes a bottom third panel 880. The bottom third panel 880 is a panel for forming a bottom panel such as the bottom third panel 180 of FIG. 2.

The bottom third panel 880 terminates in at bottom edge in a bottom third panel segment 873. The bottom third panel segment 873 is an edge segment. The bottom third panel segment 873 terminates at a first end in the bottom third corner 834. The bottom third panel segment 873 terminates at a second end in a bottom fourth corner 844.

The bottom third panel 880 terminates at a top edge in a bottom third crease 828. The bottom third crease 828 is a crease, such as the crease that forms the bottom third edge leg 128 of FIG. 2. The bottom third crease 828 connects the bottom third panel 880 to the third side wall panel 960, described below. The bottom third crease 828 terminates at a first end in the bottom third corner 834. The bottom third crease 828 terminates at a second end in the bottom second corner 844.

The sheet 800 further includes a bottom fourth panel 890. The bottom fourth panel 890 is a panel for forming a bottom panel such as the bottom fourth panel 190 of FIG. 2.

The bottom fourth panel 890 terminates in at bottom edge in a bottom fourth panel segment 885. The bottom fourth panel segment 885 is an edge segment. The bottom fourth panel segment 890 terminates at a first end in the bottom fourth corner 844. The bottom fourth panel segment 890 terminates at a second end in a bottom first corner 846. In a preferred embodiment, fourth panel segment 885 may include a first auto-bottom segment 884 for described below.

The bottom fourth panel 890 terminates at a top edge in a bottom fourth crease 838. The bottom fourth crease 838 is a crease, such as the crease that forms the bottom fourth edge leg 138 of FIG. 2. The bottom fourth crease 838 connects the bottom fourth panel 890 to the fourth side wall panel 970, described below. The bottom fourth crease 838 terminates at a first end in the bottom fourth corner 844. The bottom fourth crease 838 terminates at a second end in the bottom first corner 846.

In a preferred embodiment, the bottom fourth panel 890 includes a second auto-bottom panel 904. The second auto-bottom panel 904 is a panel for forming an auto-bottom panel such as the second auto-bottom panel 204 of FIG. 2.

The second auto-bottom panel 904 terminates in a second auto-bottom panel segment 884. The second auto-bottom panel segment 884 is an edge segment that is a subsegment of the fourth panel segment 885. The second auto-bottom panel segment 884 terminates at a first end in a second auto-bottom crease first end 886. The second auto-bottom panel segment 884 terminates at a second end in a second auto-bottom crease second end 888.

The fourth bottom panel 890 further includes a second auto-bottom crease 906. The second auto bottom crease 906 rotatably connects the second auto-bottom panel 904 to the rest of the fourth bottom panel 890. The second auto-bottom panel 904 further terminates in the second auto-bottom crease 906. The second auto-bottom crease 906 terminates at a first end in the second auto-bottom crease first end 886. The second auto-bottom crease 906 terminates at a second end in the second auto-bottom crease second end 888.

The sheet 800 includes a first side panel 940. The first side panel 940 is a panel for forming a side wall such as the first side wall 240 of FIG. 4. The first side panel 940 is functionally seamless.

The first side panel 940 terminates at a first side in the side wall segment 918. The side wall segment 918 is an edge of the outside edge 810. The side wall segment 918 terminates at a top end in a side wall top corner 1024. The side wall segment 918 terminates at a bottom end in the side wall edge bottom corner 814.

The first side wall panel 940 terminates at a bottom side in a first bottom crease 812.

The first side wall panel 940 terminates in at a top edge in a side wall first top segment 1022. The side wall first top segment 1022 is an edge segment of the outside edge 810. The side wall first top segment 1022 terminates at a first end in the side wall top corner 1024. The side wall first top segment 1022 terminates in at a second end in a second side crease top corner 1024.

The first side wall panel 940 terminates at a second side in a second side crease 944. The second side crease 944 is parallel to the side wall segment 918. The second side crease 944 terminates in a second side crease top corner 1024. The second side crease 944 terminates in a bottom end in the bottom second corner 824.

The sheet 800 includes a second side panel 950. The second side panel 950 is a panel for forming a side wall such as the second side wall 250 of FIG. 4. The second side panel 950 is functionally seamless.

The second side panel 950 terminates at a first side in the second side crease 944. The second side panel 950 terminates at a bottom side in a second bottom crease 818.

The second side panel 950 terminates at a second side in a third side crease 954. The third side crease 954 is parallel to the side wall segment 918. The third side crease 954 terminates in a third side crease top corner 1034. The third side crease 954 terminates in a bottom end in the bottom third corner 834.

In a preferred embodiment, the sheet 800 includes a handle first tab 955. The first handle tab 955 extends the second side panel 950 above the top line 927.

The handle first tab 955 terminates on one side in a handle first crease 956. The handle first crease 956 is a crease that rotatably connects the handle first tab 955 to a handle first panel 1012 described below. The handle first crease 956 terminates at a bottom end in the handle first crease bottom corner 1069. The handle first crease 956 terminates a top end in a first handle top corner 1006.

The handle first tab 955 terminates at a top side in a handle first tab segment 1074. The handle first tab segment 1074 is an edge segment of the of the outside edge 810. The handle first tab segment terminates at a bottom end in the second side crease top end 1024. The handle first tab segment terminates at a top corner in the first handle top corner 1006.

The second side panel 950 terminates at a top edge in a side wall second top 1026. The side wall second top 1026 is and edge segment of the outside edge. The side wall second top 1026 at the handle first crease bottom corner 1069. The side wall second top 1026 terminates in a second side crease top corner 1034.

The sheet 800 includes a third side panel 960. The third side panel 960 is a panel for forming a side wall such as the third side wall 260 of FIG. 5. The third side panel 960 is functionally seamless.

The third side panel 960 terminates at a first side in the third side crease 954. The third side wall panel 960 terminates at a bottom side in the third bottom crease 828.

The third side wall panel 960 terminates in at a top edge in a side wall third top segment 1028. The side wall third top segment 1028 is an edge segment of the outside edge 810. The side wall third top segment 1028 terminates at a first end in the second side crease top corner 1034. The side wall third top segment 1028 terminates at a second end a third side crease top corner 1044.

The third side wall panel 960 terminates at a second side in a fourth side crease 964. The fourth side crease 964 is parallel to the side wall segment 918. The fourth side crease 964 terminates in a fourth side crease top corner 1044. The fourth side crease 964 terminates in a bottom end in the bottom third corner 844.

The sheet 800 includes a fourth side panel 970. The fourth side panel 970 is a panel for forming a side wall such as the fourth side wall 970 of FIG. 5. The fourth side panel 970 is functionally seamless.

The fourth side panel 970 terminates at a first side in the fourth side crease 964. The third side panel 970 terminates at a bottom side in the fourth bottom crease 838.

The fourth side panel 970 terminates at a second side in a first side crease 934. The first side crease 934 is parallel to the side wall segment 918. The first side crease 934 terminates in a first side crease top corner 1046. The first side crease 934 terminates in a bottom end in the bottom first corner 846.

In a preferred embodiment, the sheet 800 includes a handle second tab 975. The second handle tab 975 extends the fourth side panel 970 above the top line 927.

The handle second tab 975 terminates on one side in a handle second crease 976. The handle second crease 976 is a crease that rotatably connects the handle second tab 975 to a handle second panel 1016, described below. The handle second crease 976 terminates at a bottom end in the handle second crease bottom corner 1088. The handle second crease 976 terminates a top end in a second handle top corner 1008.

The handle second tab 975 terminates at a top side in a handle second tab segment 1084. The handle second tab segment 1084 is an edge segment of the of the outside edge 810. The handle second tab segment 1084 terminates at a bottom end in the fourth side crease top end 1044. The handle second tab segment 1084 terminates at a top corner in the second handle top corner 1008.

The fourth side panel 970 terminates at a top edge in a side wall fourth top 1038. The side wall fourth top 1038 is and edge segment of the outside edge 810. The side wall fourth top 1038 at the handle second crease bottom corner 1088. The side wall fourth top 1038 terminates in a first side crease top corner 1046.

The sheet 800 includes a side shell connecting tab 936. The side shell connecting tab 936 is a panel for connecting the first side panel 940 to the fourth side panel 970. The side shell connecting tab 936 terminates on a first side in the first side crease 934.

The side shell connecting tab 936 terminates on a second side in a side shell second edge 922. The side shell second edge 922 is a segment of the outside edge 810. The side shell second edge 922 terminates at a first end in the bottom first corner 846. The side shell second edge 922 terminates at a second end in the first side crease top corner 1046.

The sheet 800 further includes a handle first panel 1012. The handle first panel 1012 is a panel for forming a handle such as the handle first panel 312 of FIG. 7.

The handle first panel 1012 terminates on a first side in the handle first crease 956.

The handle first panel 1012 terminates at second side in a handle first panel segment 1013. The handle first panel segment 1013 is an edge segment of the outside edge 810. The handle first panel segment 1013 terminates a first end in the first crease bottom corner 1069. The handle first panel segment 1013 terminates in a second end in a second partition handle tab crease end 1174.

The handle first panel 1012 terminates at a top end in a second partition handle tab crease 1003. The second partition handle tab crease 1003 is a crease that rotatably connects the handle first panel 1012 to a second partition handle tab 1170, described below. The second partition handle tab crease 1003 terminates at a first end in the first handle top corner 1006. The second partition handle tab crease 1003 terminates at a second end in the second partition handle tab crease end 1174.

In a preferred embodiment, the handle first panel 1012 further includes a handle first cutout 1014. The handle first cutout 1014, is a cutout for forming a slot. The handle first cutout 1014 may be a complete void in that the material of the sheet 800 is fully removed to form a handle first cutout edge 1015. In another aspect, a portion of the handle first cutout edge 1015 is left to form a crease that rotatably connects the material of the handle first cutout 1014 to the rest of the handle first panel 1012.

In a preferred embodiment, the sheet 800 further includes a second partition handle tab 1170. The second partition handle tab 1170 is an extension of the second partition 1160 described below. The second partition handle tab 1170 terminates at a bottom side in the second partition handle tab crease 1003.

The second partition handle tab 1170 terminates at a first side in a second partition handle tab first edge 1172. The second partition handle tab first edge 1172 is an edge segment of the sheet 800. The second partition handle tab first edge 1172 terminates at a top end in the second partition corner top 1147. The second partition handle tab first edge 1172 terminates at a bottom end in a second partition handle tab first edge end 1174.

The second partition handle tab 1170 terminates at a second side in a second partition handle tab second edge 1176. The second partition handle tab second edge 1176 is an edge segment of the sheet 800. The second partition handle tab second edge 1176 terminates at a bottom end in the first handle top corner 1006. The second partition handle tab second edge 1176 terminates at a top end in the second partition top edge end 1166.

In a preferred embodiment, the second partition handle tab 1170 includes a second partition handle tab cutout 1178. The second partition handle tab cutout 1178 is a portion of the second partition handle tab 1170 that is configured such that a slot is formed in the second partition handle tab 1170. The second partition handle tab cutout 1178 is configured such that a hand or object may be placed through the handle 300 of FIG. 6.

In an embodiment, the second partition handle tab cutout 1178 may be formed by removing material entirely from the second partition handle tab 1170. In a further embodiment, the second partition handle tab cutout 1178 is formed by cutting a portion of the circumference of the slot and folding the second partition handle tab 1170 material.

The sheet 800 further includes a second partition panel 1160. The second partition 1160 is a panel of the sheet 800.

The second partition 1160 terminates at a first side in a second partition first edge 1162. In a preferred embodiment, the second partition first edge 1162 is an edge segment of the outside edge 810. The second partition first edge 1162 terminates at a first end in a second partition corner bottom 1146. The second partition first edge 1162 terminates at a bottom end in the second partition top edge end 1166.

The second partition 1160 terminates at a second side in a second partition corner 1144, described below.

The second partition 1160 terminates at a top side in a second partition top 1168. The second partition top 1168 is an imaginary boundary between the second partition 1160 and the second partition handle tab 1170. The second partition top 1168 terminates at a first end in the second partition top end 1166. The second partition top 1168 terminates at a second end in the second partition corner top 1147.

The sheet 800 further includes a third partition 1140. The third partition 1140 is a panel of the sheet 800.

The third partition 1140 terminates at a first side in a third partition tab corner 1141. In a preferred embodiment, the third partition tab corner 1141 rotatably connects the third partition 1140 to the third partition connecting tab 1150, described below. The third partition tab corner 1141 terminates at a top end in a third partition tab corner bottom 1142. The third partition tab corner 1141 terminates at a bottom end in a third partition tab corner top 1143.

The third partition 1140 terminates at a second side in the second partition crease 1144. The second partition crease 1144 rotatably connects the third partition 1140 to the second partition 1160, described below.

The second partition crease 1144 terminates at a top end in a second partition crease bottom 1146. The second partition crease 1144 terminates at a bottom end in a second partition crease top 1147. The third partition 1140 terminates at a bottom side in a third partition top edge 1148. In a preferred embodiment, the third partition top edge 1148 is an edge segment the outside edge 810. The third partition top edge 1148 terminates at a first end in a third partition tab crease top 1143. The third partition top edge 1148 terminates at a second end in the second partition crease top 1147.

The third partition 1140 terminates at a top side in a third partition bottom edge 1149. In a preferred embodiment, the third partition bottom edge 1149 is an edge segment of the outer edge 810. The third partition bottom edge 1149 terminates at a first end in the third partition tab crease bottom 1142. The third partition bottom edge 1149 terminates at a second end in the second partition crease bottom 1146.

The sheet 800 further includes a third partition connecting tab 1150. The third partition connecting tab 1150 is a tab for connecting the third partition 1140 to the third side wall panel 960. The third partition connecting tab 1150 terminates on a first side in the third partition tab crease 1141. The third partition connecting tab 1150 further terminates in a third partition connecting tab edge 1156. The third partition connecting tab edge 1156 is an edge segment of the outer edge 810. The third partition connecting tab edge 1156 terminates at top bottom in the third partition tab crease top 1143. The third partition connecting tab edge 1156 terminates at a top end in the third partition tab crease bottom 1142.

The sheet 800 further includes a handle second panel 1016. The handle second panel 1016 is a panel for forming a handle such as the handle first panel 316 of FIG. 7.

The handle second panel 1016 terminates on a first side in the handle second crease 976.

The handle second panel 1016 terminates at second side in a handle second panel segment 1017. The handle second panel segment 1017 is an edge segment of the outside edge 810. The handle second panel segment 1017 terminates a first end in the second crease bottom corner 1088. The handle second panel segment 1017 terminates in a second end in a fourth partition handle tab crease end 1134.

The handle second panel 1016 terminates at a top end in a fourth partition handle tab crease 1004. The fourth partition handle tab crease 1016 is a crease that rotatably connects the handle second panel 1016 to a fourth partition handle tab 1130, described below. The fourth partition handle tab crease 1004 terminates at a first end in the second handle top corner 1008. The fourth partition handle tab crease 1004 terminates at a second end in the fourth partition handle tab crease end 1134.

In a preferred embodiment, the handle second panel 1016 further includes a handle second cutout 1018. The handle second cutout 1018, is a cutout for forming a slot. The handle second cutout 1018 may be a complete void in that the material of the sheet 800 is fully removed to form a handle first cutout edge 1019. In another aspect, a portion of the handle second cutout edge 1019 is left to form a crease that rotatably connects the material of the handle second cutout 1018 to the rest of the handle second panel 1016.

In a preferred embodiment, the sheet 800 further includes a fourth partition handle tab 1130. The fourth partition handle tab 1130 is an extension of the fourth partition panel 1120 described below. The fourth partition handle tab 1130 terminates at a bottom side in the fourth partition handle tab crease 1004.

The fourth partition handle tab 1130 terminates at a first side in a fourth partition handle tab first edge 1132. The fourth partition handle tab first edge 1132 is an edge segment of the sheet 800. The fourth partition handle tab first edge 1132 terminates at a top end in the fourth partition corner top 1107. The fourth partition handle tab first edge 1132 terminates at a bottom end in the fourth partition handle tab crease end 1134.

The fourth partition handle tab 1130 terminates at a second side in a fourth partition handle tab second edge 1136. The fourth partition handle tab second edge 1136 is an edge segment of the sheet 800. The fourth partition handle tab second edge 1136 terminates at a bottom end in the second handle top corner 1008. The fourth partition handle tab second edge 1136 terminates at a top end in the fourth partition top edge end 1126.

In a preferred embodiment, the fourth partition handle tab 1130 includes a fourth partition handle tab cutout 1138. The fourth partition handle tab cutout 1138 is a portion of the fourth partition handle tab 1130 that is configured such that a slot is formed in the fourth partition handle tab 1130. The fourth partition handle tab cutout 1138 is configured such that a hand or object may be placed through the handle 300 of FIG. 6.

In an embodiment, the fourth partition handle tab cutout 1138 may be formed by removing material entirely from the fourth partition handle tab 1130. In a further embodiment, the fourth partition handle tab cutout 1138 is formed by cutting a portion of the circumference of the slot and folding the fourth partition handle tab 1130 material.

The sheet 800 further includes a fourth partition 1120. The fourth partition 1120 is a panel of the sheet 800.

The fourth partition 1120 terminates at a first side in a fourth partition first edge 1122. In a preferred embodiment, the fourth partition first edge 1122 is an edge segment of the outside edge 810. The fourth partition first edge 1122 terminates at a first end in a fourth partition corner bottom 1106. The fourth partition first edge 1122 terminates at a bottom end in the fourth partition top edge end 1126.

The fourth partition 1120 terminates at a second side in a fourth partition crease 1104, described below.

The fourth partition 1120 terminates at a top side in a fourth partition top 1128. The fourth partition top 1128 is an imaginary boundary between the fourth partition 1120 and the fourth partition handle tab 1130. The fourth partition top 1128 terminates at a first end in the fourth partition top end 1126. The fourth partition top 1128 terminates at a second end in the fourth partition corner top 1107.

The sheet 800 further includes a first partition 1100. The first partition 1100 is a panel of the sheet 800.

The first partition 1100 terminates at a first side in a first partition tab crease 1101. In a preferred embodiment, the first partition tab crease 1101 rotatably connects the first partition 1100 to a first partition connecting tab 1110, described below. The first partition tab crease 1101 terminates at a top end in a first partition tab corner bottom 1102. The first partition tab crease 1101 terminates at a bottom end in a first partition tab corner top 1103.

The first partition 1100 terminates at a second side in the fourth partition crease 1104. The fourth partition crease 1104 rotatably connects the first partition 1100 to the fourth partition 1120, described below. The fourth partition crease 1104 terminates at a top end in a fourth partition crease bottom 1106. The fourth partition crease 1104 terminates at a bottom end in a fourth partition crease top 1107.

The first partition 1100 terminates at a bottom side in a first partition top edge 1108. In a preferred embodiment, the first partition top edge 1108 is an edge segment the outside edge 810. The first partition top edge 1108 terminates at a first end in a first partition tab crease top 1103. The first partition top edge 1108 terminates at a second end in the first partition crease top 1107.

The first partition 1100 terminates at a top side in a fourth partition bottom edge 1109. In a preferred embodiment, the first partition bottom edge 1109 is an edge segment of the outer edge 810. The first partition bottom edge 1109 terminates at a first end in the first partition tab crease bottom 1102. The first partition bottom edge 1109 terminates at a second end in the fourth partition crease bottom 1106.

The sheet 800 further includes a first partition connecting tab 1110. The first partition connecting tab 1110 is a tab for connecting the first partition 1140 to the first side wall panel 940. The first partition connecting tab 1110 terminates on a first side in the first partition tab crease 1101. The first partition connecting tab 1110 further terminates in a first partition connecting tab edge 1116. The first partition connecting tab edge 1116 is an edge segment of the outer edge 810. The first partition connecting tab edge 1116 terminates at bottom end in the first partition tab crease top 1103. The first partition connecting tab edge 1116 terminates at a top end in the first partition tab crease bottom 1102.

Figure 9:
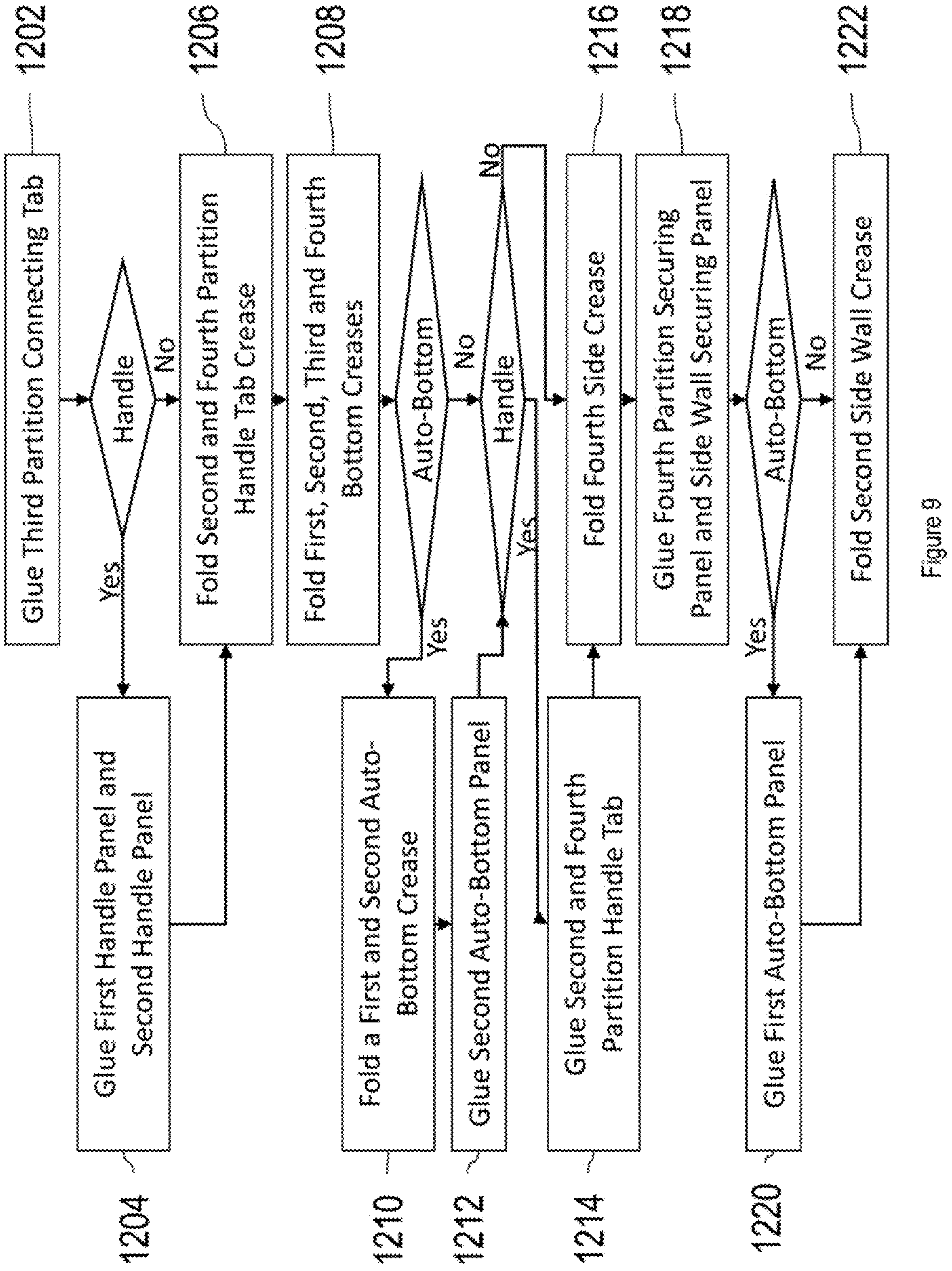
FIG. 9 is a flow diagram of a method for constructing a package, according to an embodiment.

Referring now to FIG. 9 shown therein is a flow diagram of a method for constructing a package. The package system may be the package 100 of FIGS. 1 thru 7. The sheet from which the package is made may be the sheet 800 of FIG. 8. In a preferred embodiment, a sheet from which the package is constructed lies on substantially flat surface while the sheet is passed through a series of kicks, flippers, vertical fold mechanisms and glue heads to construct the package in a flattened configuration. The flattened configuration is for transport and storage until it is used in an open configuration.

In a further preferred embodiment, the sheet travels through the construction operations enumerated above and further describe below on a resting surface 852 without the sheet 800 of FIG. 8 being rotated. The sheet 800 of FIG. 8 is configured to permit construction of the package without rotating the sheet. This allows the package to be constructed on machinery that does not have rotation capability. It also reduces construction time and reduces construction failure and defect risk by simplifying the construction of the package system.

In a further preferred embodiment, the securing medium is glue.

Unless otherwise indicated, the steps below may be performed in any order and/or simultaneously. Applying a securing medium includes applying the securing medium to all or any part of the receiving surface or panel.

At 1202 a third partition securing medium is applied to at least one third partition connecting tab. The third partition connecting tab may be the third partition connecting tab 1150 of FIG. 8.

At 1204, if the package includes a handle, a handle securing medium may be applied to an inner surface of a handle first panel, a handle second panel, a second partition handle tab, and a fourth partition handle tab.

Figure 10:
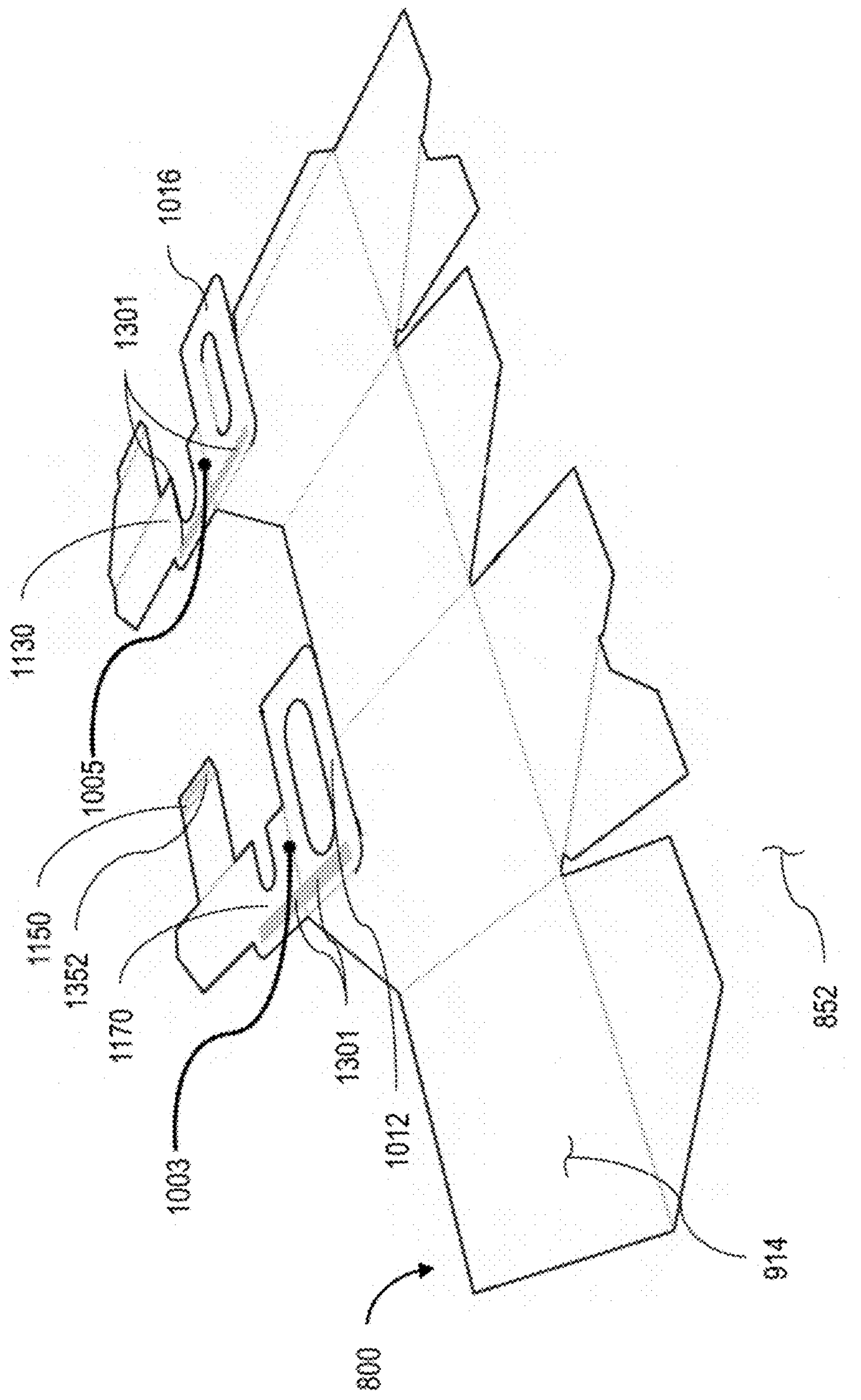
FIG. 10 is a perspective view schematic diagram of the sheet of FIG. 8 partially configured per the method of FIG. 9.

Referring now to FIG. 10, shown therein is a perspective schematic diagram view of the sheet 800 of FIG. 8 configured per steps 1202 and 1204 of FIG. 9. A handle securing medium 1301 is on the interior surface 914 of the handle first panel 1012, a handle second panel 1016, a second partition handle tab 1170, and a fourth partition handle tab 1130. A third partition securing medium 1352 is on the interior surface 914 of the third partition connecting tab 1150.

Referring back to FIG. 9, at 1206, the sheet is folded about the second partition handle tab crease and the fourth partition handle tab crease. The portion of the sheet 800 that includes the handle first panel and the handle second panel remains on the resting surface during the folding.

Referring back to FIG. 10, the folding 1206 brings the interior surface 914 of the sheet 800 on both sides of the creases together. The folding secures the third partition connecting tab 1150 to an interior surface 914 of a third side wall panel 960 by the third partition securing medium 1352. If the handle securing medium 1301 is applied, folding the sheet about the second partition handle tab crease 1003 also secures the second partition handle tab 1170 to the handle first panel 1012. If the handle securing medium 1301 is applied, folding the sheet about the fourth partition handle tab crease 1004 also secures the fourth partition handle tab 1130 to the handle second panel 1016.

Figure 11:
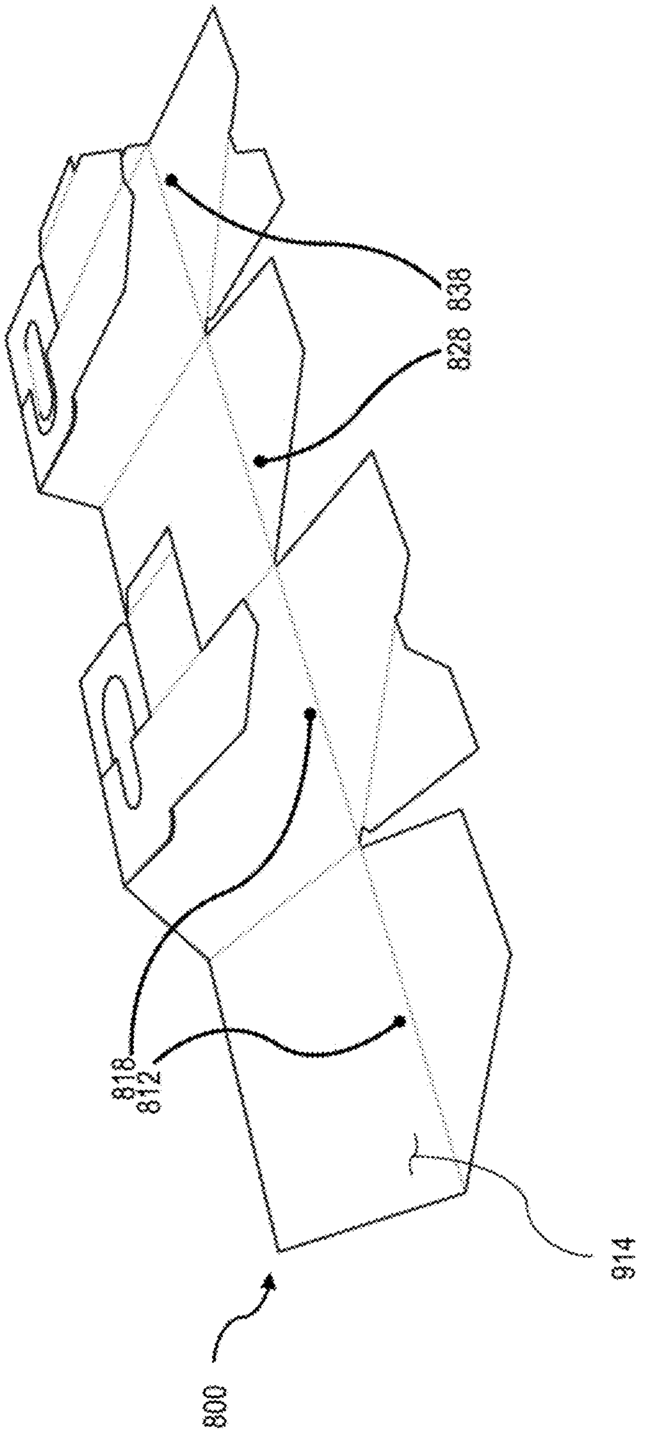
FIG. 11 is a perspective view schematic diagram of the sheet of FIG. 8 further partially configured per the method of FIG. 9.

Referring now to FIG. 11, shown therein is a perspective view schematic diagram of the sheet 800 of FIG. 8 configured per step 1206 of FIG. 9.

Referring back to FIG. 9, at 1208 sheet is folded about a bottom first crease, a bottom second crease, a bottom third crease, and a bottom fourth crease. The portion of the sheet that includes the side wall panels remains on the resting surface during the folding.

Referring back to FIG. 11, the folding 1208 the sheet about the a bottom first crease 812, a bottom second crease 818, a bottom third crease 828, and a bottom fourth crease 838 brings the interior surface 914 of the sheet 800 on both sides of the creases together.

Figure 12:
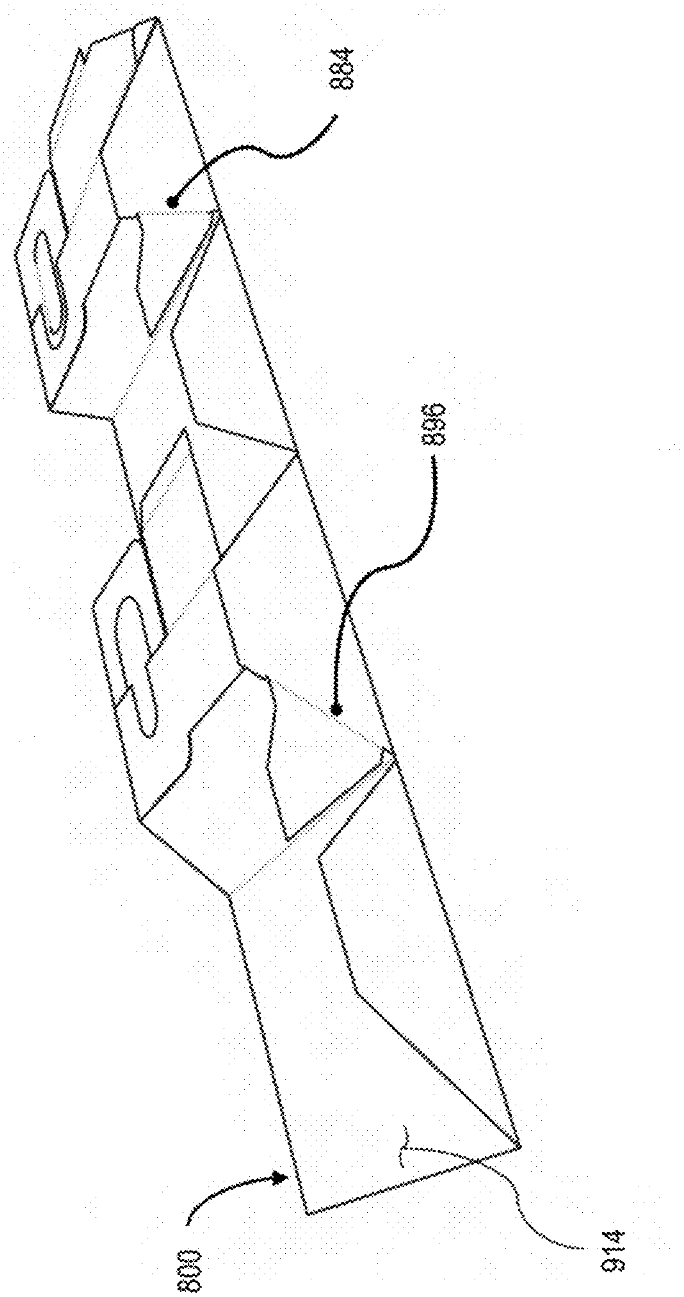
FIG. 12 is a perspective view schematic diagram of the sheet of FIG. 8 further partially configured per the method of FIG. 9.

Referring now to FIG. 12, shown therein is a perspective schematic diagram view of the sheet 800 of FIG. 8 configured per step 1208 of FIG. 9.

Referring back to FIG. 9, at 1210 if the package includes an auto bottom, the sheet is folded about the first auto-bottom crease and the second auto-bottom crease. The portion of the sheet that includes the first bottom panel and second bottom panel remain flat during the folding.

Referring back to FIG. 12, the folding 1214 the sheet 800 about the first auto-bottom crease 896 and the second auto-bottom crease 884, brings the exterior surface 931 of the sheet 800 on both sides of the creases together. A second auto-bottom securing medium 1310 is on the exterior surface 931 of the second auto-bottom panel 904.

Referring back to FIG. 9, at 1212 if the package includes an auto-bottom an auto-bottom securing medium is applied to an interior surface of the second auto-bottom panel.

At 1214 if the package includes a handle, the handle securing medium is applied to an exterior surface of the second partition handle tab and the fourth partition handle tab.

Figure 13:
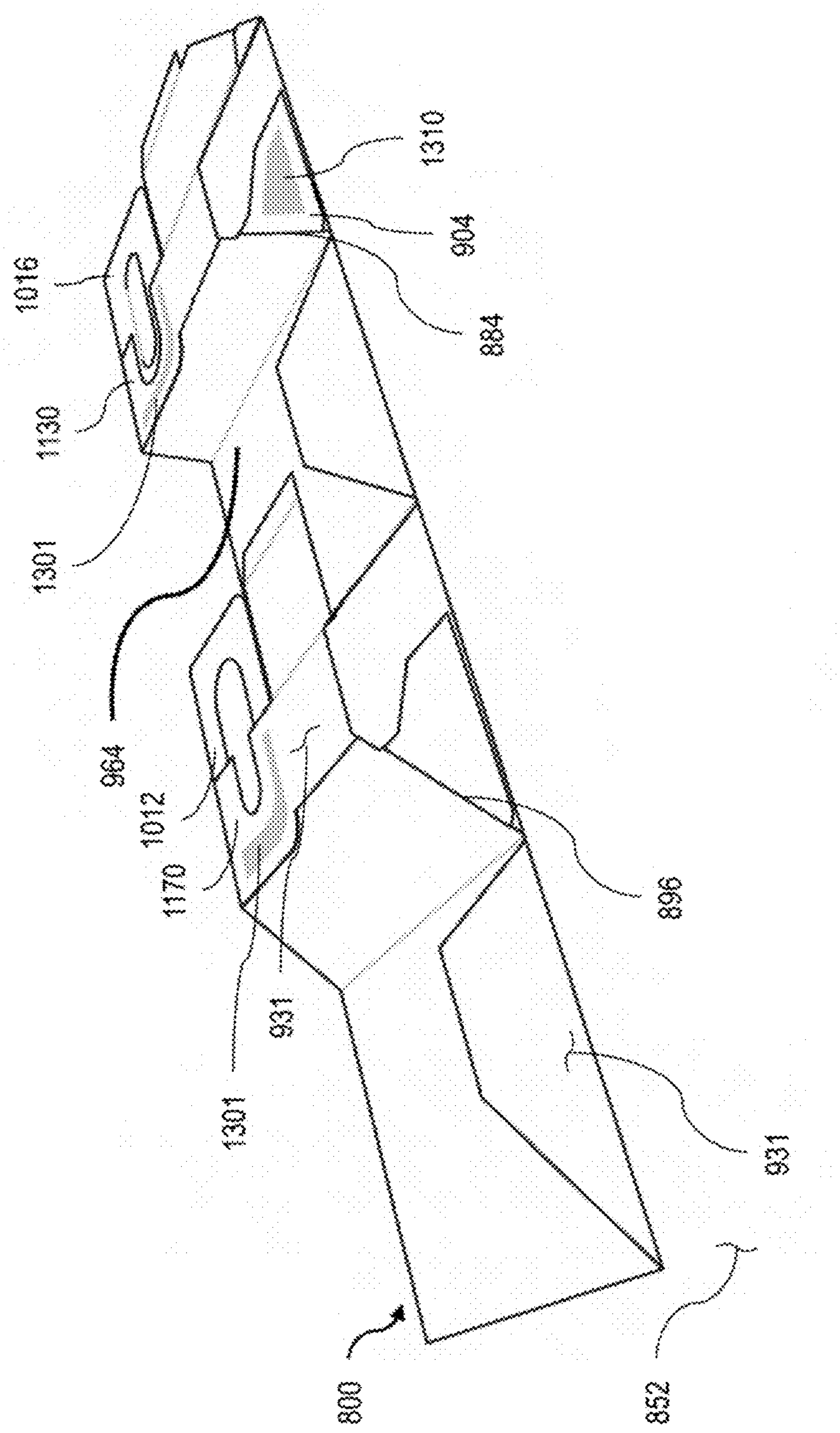
FIG. 13 is a perspective view schematic diagram of the sheet of FIG. 8 further partially configured per the method of FIG. 9.

Referring now to FIG. 13, shown therein is a perspective view schematic diagram of the sheet 800 of FIG. 8 configured per steps 1210, 1212, and 1214 of FIG. 9. The handle securing medium 1301 is on the exterior surface 931 of a second partition handle tab 1170 and a fourth partition handle tab 1130.

Referring back to FIG. 9, at 1216 the sheet is folded about the fourth side crease. The portion of the sheet that includes the third side wall panel remains flat during the folding.

Referring back to FIG. 13, folding the sheet 800 about the fourth side crease 964 brings the surfaces of the sheet 800 that are facing away from the resting surface 852 together. The folding secures the first handle tab 1170 to the handle second panel 1016 via the handle securing medium 1301. The folding also secures the second handle tab 1130 to the handle first panel 1012 via the handle securing medium 1301. The folding also secures the second auto-bottom panel 904 to the third bottom panel 828.

Referring back to FIG. 9, at 1218 a side shell securing medium is applied to a side shell connecting tab. A first partition securing medium is also applied to an interior surface of at least one first partition connecting tab.

At 1220, if the package includes an auto-bottom, a first auto-bottom securing medium, is applied to an interior surface of the first auto-bottom panel.

Figure 14:
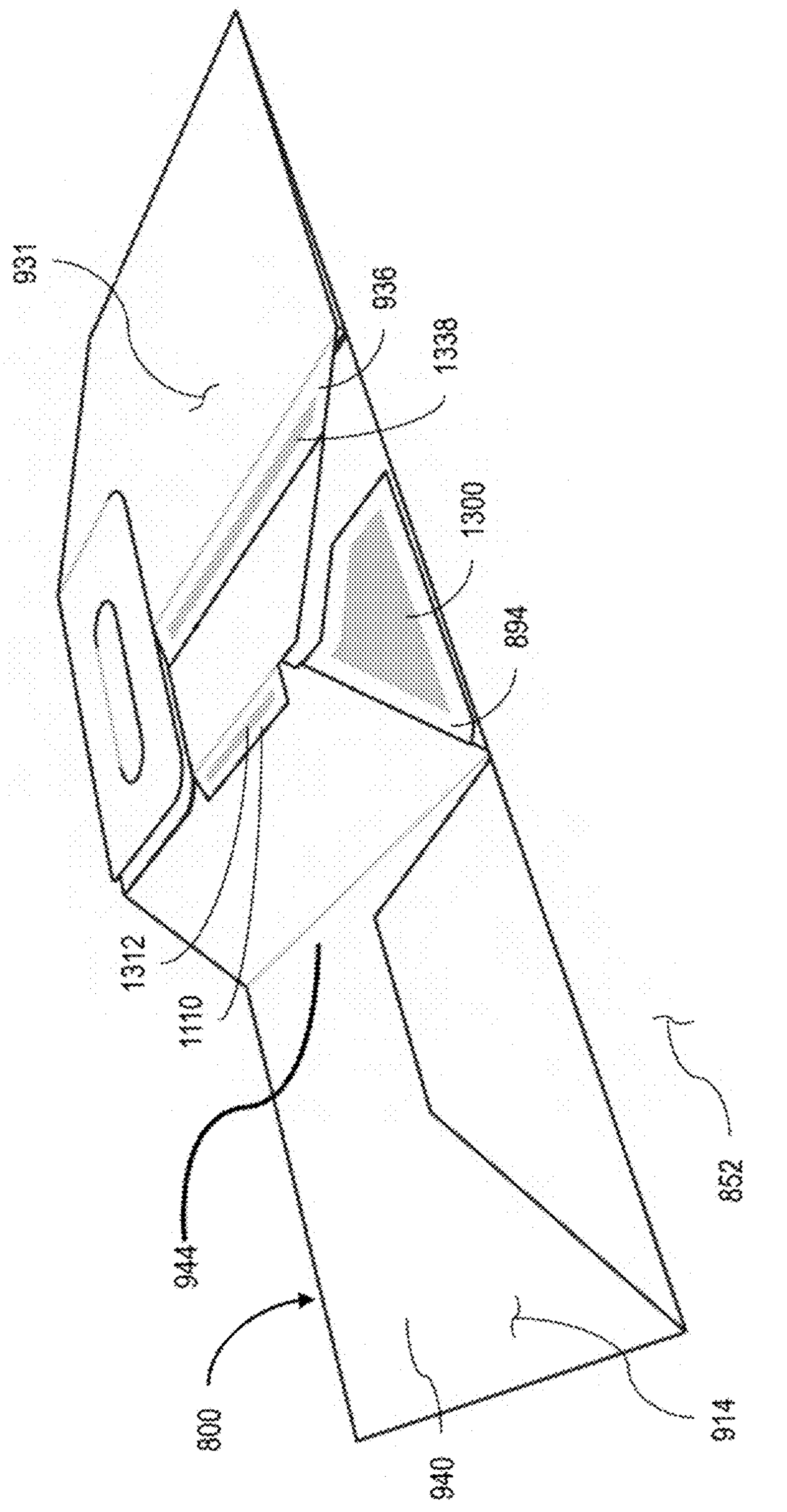
FIG. 14 is a perspective view schematic diagram of the sheet of FIG. 8 further partially configured per the method of FIG. 9.

Referring now to FIGS. 14, shown therein is a perspective view schematic diagram of the sheet 800 of FIG. 8 configured per steps 1216, 1218, and 1220 of FIG. 9. A side shell securing medium 1338 is on the exterior surface 931 of the side shell connecting tab 936. A first partition securing medium 1312 is on the interior surface 914 of the first partition connecting tab 1110. An auto-bottom first securing medium 1300 is on the an interior surface 914 of the first auto-bottom panel 894.

Referring back to FIG. 9, at 1222 the sheet is folded about a second side crease. The portion of the package that contains the second side panel remains flat during the folding.

Referring back to FIG. 14, folding the sheet 800 about the second side crease 944 brings the surfaces of the sheet 800 that are facing away from the resting surface 852 together. The folding 1222 secures the first partition connecting tab 1110 to the first side panel 940. The folding 1222 also secures the side shell connecting tab 936 to the first side panel 940. The folding also secures the first auto-bottom panel 894 to the bottom first panel 850.

Referring now to FIG. 15, shown therein is a perspective view schematic diagram of the sheet 800 of FIG. 8 configured per step 1222 of FIG. 9. In this configuration, the sheet 800 has been constructed into a package such as the package 100 of FIG. 1 in a flat configuration 1500. The flat configuration 1500 may be configured into the open configuration package 100 of FIG. 1 by pushing the second side crease 944 and the fourth side crease 964 towards each other.

Figure 16:
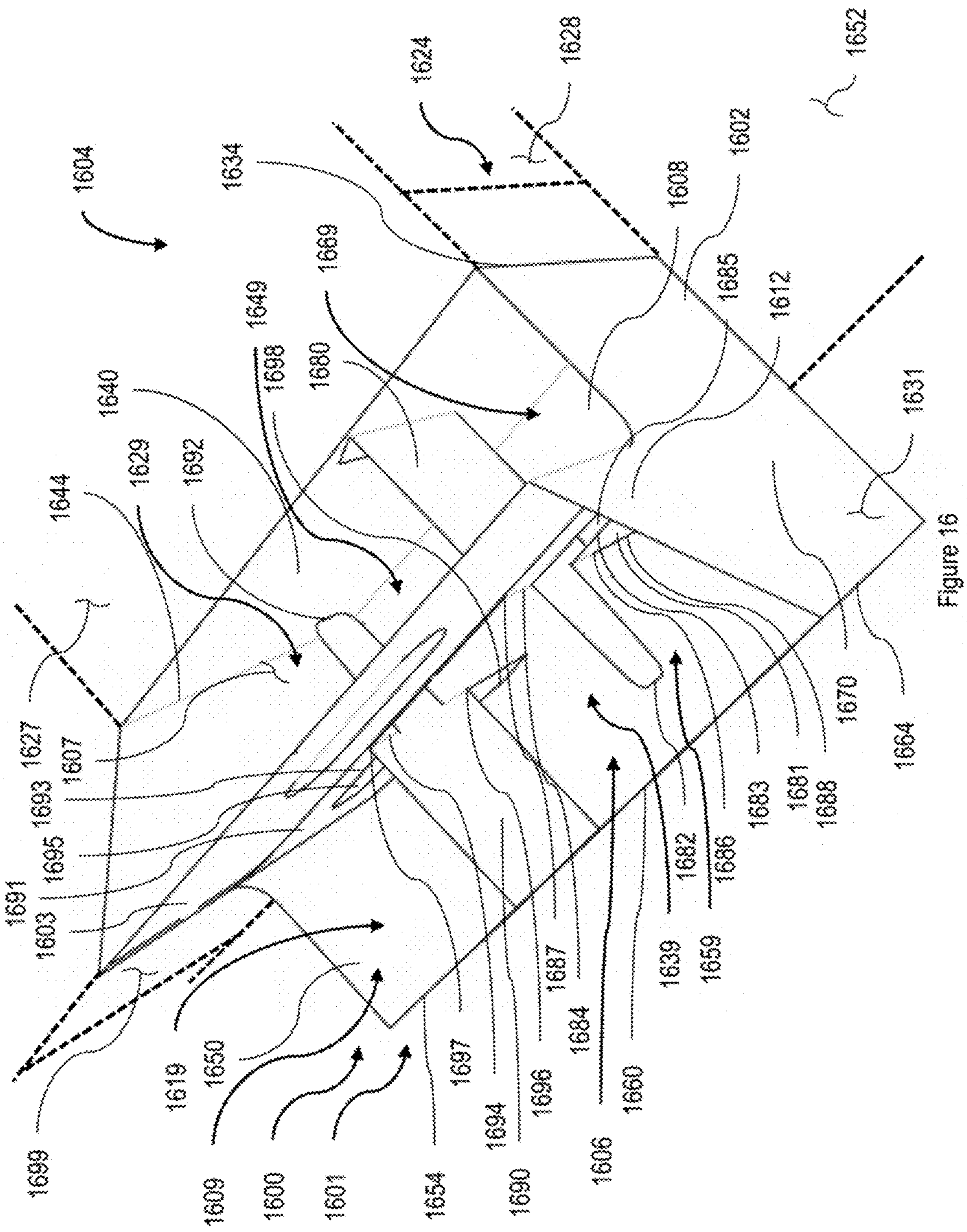
FIG. 16 a perspective view schematic diagram of a package according to a further embodiment.

Referring now to FIG. 16 shown therein is a perspective view schematic diagram of a package 1600 according to a further embodiment. The package 1600 structure is constructed from of a sheet 1601. The sheet 1601 may be the sheet 1700 of FIG. 17, described below. The package 1600 is constructed from the sheet 1601 by folding and securing the sheet 1601 in a flat configuration and opening the flat configuration into the open configuration of package 1600. Unless specified otherwise below, the package 1600 is configured similarly to the package 100 of FIGS. 1-7.

The package 1600 includes an inside space 1606. The inside space 1606 is the space substantially surrounded by the package 1600 not occupied by other parts of the package 1600 or articles place or stored in the package 1600.

The inside space 1606 includes a top 1607. The top 1607 may be open to the outside environment 1604 such that the package 1600 may receive articles placed in the inside space 1606. The top 1607 is a substantially planar. In a preferred embodiment, the top 1607 is parallel to a resting surface 1652 when the package is placed on the resting surface.

The package includes an outer shell 1602. The outer shell 1602 separates the outside environment 1604 from the inside space 1606.

This outer shell 1602 includes a side shell exterior surface 1631, described below. The side shell exterior surface 1631 is functionally seamless except where the side wall turns to form a substantial corner.

The package 1600 includes a bottom 1608 for supporting articles placed in the package 1600. The bottom 1608 provides a horizontal floor structure for the package 1600. The bottom 1608 is a substantially planer structure. The bottom 1608 may be rectangular.

The outer shell 1602 further includes a side shell 1612. The side shell 1612 provides a substantially vertical outer wall for the package 1600. The side shell 1612 includes a side shell main area 1624. The side shell main area 1624 is a portion of the side shell 1612 bounded by a top plane 1627. The top plane 1627 is an imaginary plane in-line with the top 1607 of FIG. 1. The side shell main area 1624 is further bounded by a bottom plane 1628. The bottom plane 1628 is an imaginary plane in-line with the bottom 1608.

The side shell main area 1624 further includes a side shell exterior surface 1631. The side shell exterior surface 1631 is the surface of the side shell main area 1624 exposed to the exterior environment 1604.

The side shell exterior surface 1631 is functionally seamless except where the side wall turns to form a substantial corner, such as the side corners 1634, 1644, 1654, and 1664.

In a preferred embodiment, the package 1600 includes a handle 1603. The handle 1603 provides a structure to be grasped when a person is carrying the package. The handle 1603 may also facilitate storage or display. The handle 1603 may further provide a structure for hanging the package.

The handle 1603 is a substantially planer structure. The handle 1603 may be layered. The layering may provide the handle 1603 with a thickness. The layers of the handle 1603 may be secured together by a handle securing medium 1605 (not shown), such as glue, tape, or string.

The package 1600 further includes a first partition 1680. The first partition 1680 divides the inside space 1606. The first partition 1680 provides a structure that intercedes between articles placed in the package 1600. The first partition 1680 may also reinforce the structure of the package 1600.

The first partition 1680 is formed by a panel of the sheet 1601. The first partition may be the first partition 1780 of FIG. 17, described below. The first partition 1680 is configured to be substantially vertical. The first partition 1680 is further configured to be substantially perpendicular to a first side wall 1640. The first partition 1680 is configured to be substantially perpendicular to the bottom 1608.

The first partition 1680 terminates at a second side in a fourth partition corner 1684. The fourth partition corner 1684 rotatably connects the first partition 1680 to the fourth partition 1681, described below. The fourth partition corner 1684 is formed by folding the sheet 1601 such that that the first partition 1680 is configured at a substantial angle to fourth partition 1681, described below. The fourth partition corner 1684 may be the fourth partition crease 1784 of FIG. 17.

The fourth partition corner 1684 is configured to run vertically. In a preferred embodiment, the fourth partition corner is substantially located along a vertical plane at the longitudinal center 1699 of the package 1600. The fourth partition corner 1684 is separated from the second partition corner 1694 described below along the longitudinal center 1699. In a preferred embodiment, the extent of the separation of the separation of the fourth partition corner 1684 and the second partition corner 1694 is a third of the longitudinal size of the package 1600. This separation distance provides compartments with equal longitudinal distances.

The fourth partition corner 1684 terminates at a bottom end in a fourth partition corner bottom 1686. The fourth partition corner 1684 terminates at a top end in a fourth partition corner top 1687.

The first partition 1680 further terminates at a second side in a first partition edge 1682. The first partition edge 1682 protrudes from the fourth partition corner 1684 away from the first side wall 1640. This protrusion of the first partition edge 1682 extends the first partition 1680 such that it is located on both sides of the longitudinal center 1699. This extension for the first partition 1680 bifurcates the fourth partition corner 1684.

The package 1600 further includes a fourth partition 1681. The fourth partition 1681 divides the inside space 1606. The fourth partition 1681 provides a structure that intercedes between articles placed in the package 1600. The fourth partition 1681 may also reinforce the structure of the package 1600.

The fourth partition 1681 is formed by a panel of the sheet 1601. The fourth partition 1681 may be formed from the fourth partition 1781 of FIG. 17, described below. The fourth partition 1681 is configured to be substantially vertical. The fourth partition 1681 is further configured to be substantially perpendicular to the fourth side wall 1670. The fourth partition 1681 is configured to be substantially perpendicular to the bottom 1608.

The fourth partition 1681 terminates at a second side in the fourth partition corner 1684. The fourth partition 1681 further terminate at a second side in a fourth partition edge 1683. The fourth partition edge 1683 protrudes from the fourth partition corner 1684 toward the fourth side wall 1670. This protrusion of the fourth partition edge 1683 forms a fourth partition cutout 1685. The fourth partition 1681 may extend to both sides of the first partition 1680. This extension may a result of a protrusion of the fourth partition bottom edge 1688 towards a second side wall 1650.

The package 1600 further includes a third partition 1690. The third partition 1690 divides the inside space 1606. The third partition 1690 provides a structure that intercedes between articles placed in the package 1600. The third partition 1690 may also reinforce the structure of the package 1600.

The third partition 1690 is formed by a panel of the sheet 1601. The first partition may be the first partition 1790 of FIG. 17, described below. The third partition 1690 is configured to be substantially vertical. The third partition 1690 is further configured to be substantially perpendicular to a third side wall 1660. The third partition 1690 is configured to be substantially perpendicular to the bottom 1608.

The third partition 1690 terminates at a second side in a second partition corner 1694. The second partition corner 1694 rotatably connects the third partition 1690 to the second partition 1691, described below. The second partition corner 1694 is formed by folding the sheet 1601 such that that the third partition 1690 is configured at a substantial angle to second partition 1691, described below. The second partition corner 1694 may be the second partition crease 1794 of FIG. 17.

The second partition corner 1694 is configured to run vertically. In a preferred embodiment, the fourth partition corner is substantially located along a vertical plane at the longitudinal center 1699 of the package 1600. The second partition corner 1694 is separated from the fourth partition corner 1684 along the longitudinal center 1699. In a preferred embodiment, the extent of the separation of the separation of the second partition corner 1694 and the fourth partition corner 1684 is a third of the longitudinal size of the package 1600. This separation distance provides compartments with equal longitudinal distances.

The second partition corner 1694 terminates at a bottom end in a second partition corner bottom 1696. The second partition corner 1694 terminates at a top end in a second partition corner top 1697.

The third partition 1690 further terminates at a second side in a third partition edge 1692. The third partition edge 1692 protrudes from the second partition corner 1694 away from the third side wall 1660. This protrusion of the third partition edge 1692 extends the third partition 1690 such that it is located on both sides of the longitudinal center 1699. This extension of the third partition 1690 bifurcates the second partition corner 1694.

The package 1600 further includes a second partition 1691. The second partition 1691 divides the inside space 1606. The second partition 1691 provides a structure that intercedes between articles placed in the package 1600. The second partition 1691 may also reinforce the structure of the package 1600.

The second partition 1691 is formed by a panel of the sheet 1601. The second partition 1691 may be formed from the second partition 1791 of FIG. 17, described below. The second partition 1691 is configured to be substantially vertical. The second partition 1691 is further configured to be substantially perpendicular to the second side wall 1650. The second partition 1691 is configured to be substantially perpendicular to the bottom 1608.

The second partition 1691 terminates at a second side in the second partition corner 1694. The second partition 1691 further terminate at a second side in a second partition edge 1693. The second partition edge 1691 protrudes from the second partition corner 1694 toward the second side wall 1650. This protrusion of the second partition edge 1693 forms a second partition cutout 1695. The second partition 1691 may extend to both sides of the third partition 1690. This extension may be a result of a protrusion of the second partition bottom edge 1698 toward a fourth side wall 1670.

The inside space 106 further includes six compartments 1609. The compartments 1609 each are for receiving an article such as a bottle or a can.

The compartments 1609 include a first compartment 1619. The first compartment 1619 is the portion of the inside space 1606 substantially contained within top 1607, the bottom 1608, the second side wall 1650, the third side wall 1660, the third partition 1690, and the second partition 1691.

The compartments 1609 include a second compartment 1629. The second compartment 1619 is the portion of the inside space 1606 substantially contained within top 1607, the bottom 1608, the second side wall 1650, the first side wall 1640, the third partition 1690, and the second partition 1691.

The compartments 1609 include a third compartment 1639. The third compartment 1639 is the portion of the inside space 1606 substantially contained within top 1607, the bottom 1608, the third side wall 1660, the third partition 1690, the longitudinal center 1699 and the first partition 1680.

The compartments 1609 include a fourth compartment 1649. The fourth compartment 1649 is the portion of the inside space 1606 substantially contained within top 1607, the bottom 1608, the first side wall 1640, the third partition 1690, the longitudinal center 1699 and the first partition 1680.

The compartments 1609 include a fifth compartment 1659. The fifth compartment 1659 is the portion of the inside space 1606 substantially contained within top 1607, the bottom 1608, the third side wall 1660, the fourth side wall 1670, the first partition 1680, and the fourth partition 1681.

The compartments 1609 include a sixth compartment 1669. The sixth compartment 1669 is the portion of the inside space 1606 substantially contained within top 1607, the bottom 1608, the first side wall 1640, the fourth side wall 1670, the first partition 1680, and the fourth partition 1681.

Figure 17:
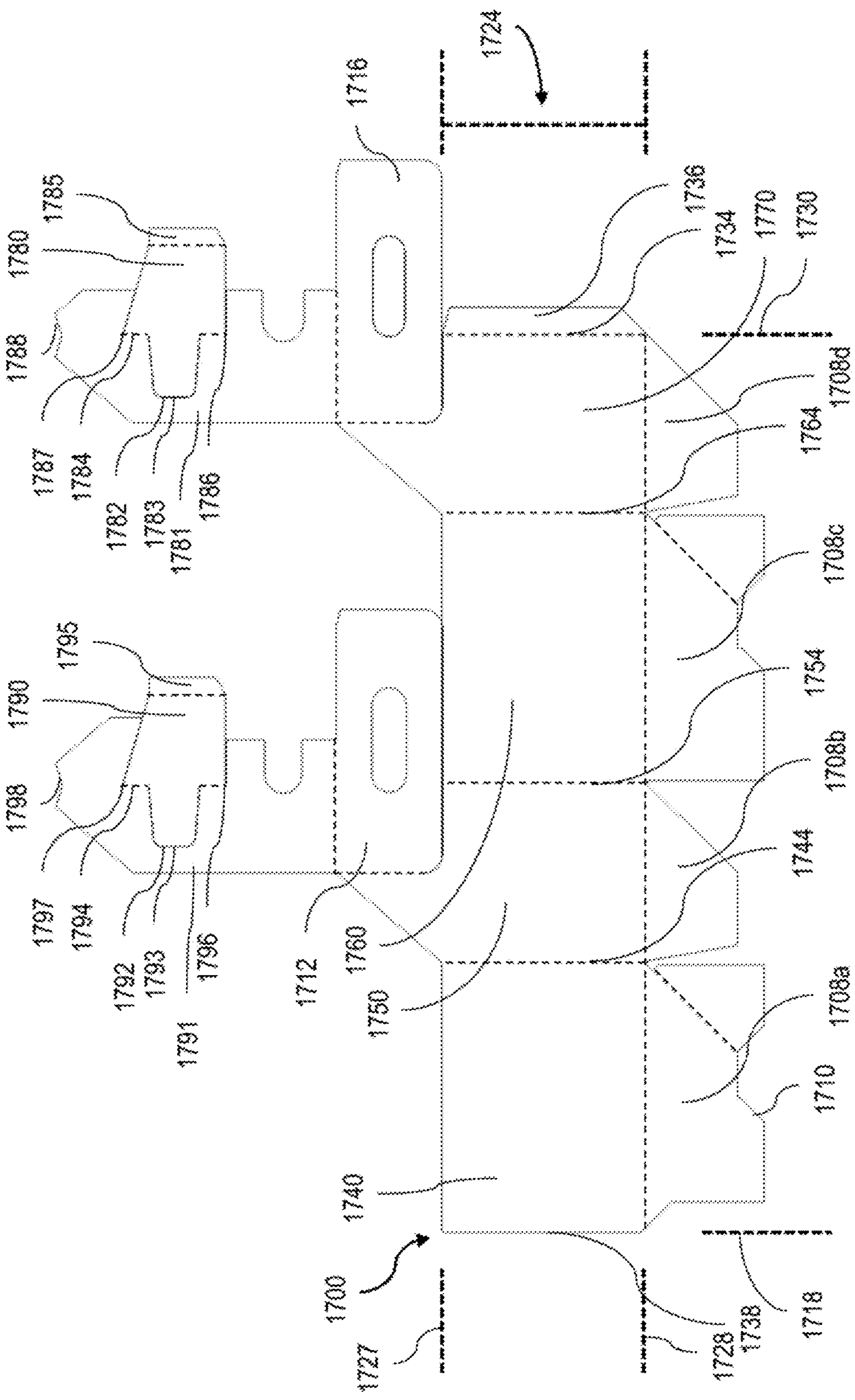
FIG. 17 is a top view schematic diagram of a sheet, according to a further embodiment.

Referring now to FIG. 17, shown therein is a therein is a top view schematic diagram of a sheet 1700 according to an embodiment. The sheet 1700 is configured for forming the package 1600 of FIG. 16. The sheet 1700 is a single piece. The sheet 1700 is flat. The sheet includes connected panels, creases, internal edges, and an outside edge 1710. The outside edge 1710 includes a series of connected edge segments.

The sheet includes a side shell main area 1724. The side shell main area 1724 may form the side shell main area 1624 of FIG. 16. The side shell main area 1724 terminates in a top line 1727. The top line 1727 is an imaginary line in-line with portion of the outside edge 1710 that would define the top 1607 of FIG. 16. The side shell main area 1724 further terminates in a bottom line 1728. The bottom line 1728 is an imaginary line in-line with the creases for would define the bottom 1608 of FIG. 16. The side shell main area 1724 terminates on a first side in a first side line 1718. The first side line 1718 is an imaginary line in-line with a side wall segment 1738, described below. The side shell main area 1724 terminates on a second side in a second side line 1730. The second side line 1730 is an imaginary line in-line with the first side crease 1734, described below.

The side shell main area 1724 is functionally seamless except for first side crease 1734, the second side crease 1744, the third side crease 1754, and the fourth side crease 1764 and the creases and edge segments at which the side sell main area terminates. These excluded side wall creases are for forming the side wall corners of the package 1600 of FIG. 16 such as the side wall corners 1634, 1644, 1654, and 1664 of FIG. 16.

The sheet 1700 further includes a first bottom panel 1708*a*, a second bottom panel 1708*b*, a third bottom panel 1708*c*, and a third bottom panel 1708*d*, collectively referred to as bottom panels 1708. The bottom panels are for forming a bottom of a package such as the bottom 1608 of FIG. 16. The bottom panels 1708 are configured similarly to the bottom panels 850, 870, 880, and 890 of FIG. 8, respectively.

The sheet 1700 further includes a first side panel 1740. The first side panel 1740 is a panel for forming a side wall such as the first side wall 1640 of FIG. 16. The first side panel 1740 is functionally seamless. The first side panel 1740 is configured similarly to the first side panel 940 of FIG. 8.

The sheet 1700 further includes a second side panel 1750. The second side panel 1750 is a panel for forming a side wall such as the second side wall 1650 of FIG. 16. The second side panel 1750 is functionally seamless. The second side panel 1750 is configured similarly to the second side panel 950 of FIG. 8.

The sheet 1700 further includes a third side panel 1760. The third side panel 1760 is a panel for forming a side wall such as the third side wall 1660 of FIG. 16. The third side panel 1760 is functionally seamless. The third side panel 1760 is configured similarly to the third side panel 960 of FIG. 8.

The sheet 1700 further includes a fourth side panel 1770. The fourth side panel 1770 is a panel for forming a side wall such as the fourth side wall 1760 of FIG. 16. The fourth side panel 1770 is functionally seamless. The fourth side panel 1770 is configured similarly to the fourth side panel 970 of FIG. 8.

The sheet 1700 further includes a side shell connecting tab 1736. The side shell connecting tab 1736 is a panel for connecting the first side panel 1740 to the second side panel 1770. The side shell connecting tab 1736 is configured similarly to the side shell connecting tab 936 of FIG. 8.

The sheet 1700 further includes a first handle panel 1712. The first handle panel 1712 is for forming a handle. The first handle panel 1712 is configured similarly to the first handle panel 1012 of FIG. 8.

The sheet 1700 further includes a second handle panel 1716. The second handle panel 1716 is for forming a handle. The second handle panel 1716 is configured similarly to the second handle panel 1016 of FIG. 8.

The sheet further includes a first partition connecting tab 1785. The first partition connecting tab 1785 is for connecting the first partition 1780 to the first side panel 1740. The first partition connecting tab 1785 is configured similarly to the first partition connecting tab 1110 of FIG. 8.

The sheet 1700 further includes a first partition 1780. The first partition 1780 terminates at a second side in a fourth partition crease 1784. The fourth partition crease 1784 rotatably connects the first partition 1780 to the fourth partition 1781, described below.

The fourth partition crease 1784 terminates at a bottom end in a fourth partition crease bottom 1786. The fourth partition crease 1784 terminates at a top end in a fourth partition crease top 1787.

The first partition 1780 further terminates at a second side in a first partition edge 1782. The first partition edge 1782 is an edge internal to the sheet 1700 such that it does not intersect with or form part of the outside edge 1710. The first partition edge 1782 protrudes from the fourth partition crease 1784 toward the fourth partition 1781. This protrusion of the first partition edge 1782 extends the first partition 1780 such that it is located on both sides of the fourth partition crease 1784. This extension for the first partition 1780 bifurcates the fourth partition crease 1784.

In a preferred embodiment, the first partition edge 1782 abuts the fourth partition edge 1783. The first partition edge 1782 may be formed by cutting the sheet 1700. The first partition edge 1782 may be formed by the same cut as the fourth partition edge 1783, described below.

The first partition 1780 is otherwise configured similarly to the first partition 1100 of FIG. 8.

The sheet 1700 further includes a fourth partition 1781. The fourth partition 1781 terminates at a second side in the fourth partition crease 1784.

The fourth partition 1781 further terminates at a second side in a fourth partition edge 1783. The fourth partition edge 1783 is an edge internal to the sheet 1700 such that it does not intersect with or form part of the outside edge 1710. The fourth partition edge 1783 protrudes from the fourth partition crease 1784 toward the first side wall 1740. This protrusion of the fourth partition edge 1783 reduces the area occupied by the fourth partition 1781.

The fourth partition 1781 extends to both sides of the fourth partition crease 1780. This extension may be a result of a protrusion of the fourth partition bottom edge 1788 toward the side shell connecting tab 1736.

The fourth partition 1781 is otherwise configured similarly to the fourth partition 1120 of FIG. 8.

The sheet further includes a third partition connecting tab 1795. The third partition connecting tab 1795 is for connecting the third partition 1790 to the third side panel 1760. The first partition connecting tab is configured similarly to the first partition connecting tab 1110 of FIG. 8.

The sheet 1700 further includes a third partition 1790. The third partition 1790 terminates at a second side in a second partition crease 1794. The second partition crease 1794 rotatably connects the third partition 1790 to the second partition 1791, described below.

The second partition crease 1794 terminates at a bottom end in a second partition crease bottom 1796. The second partition crease 1794 terminates at a top end in a second partition crease top 1797.

The third partition 1790 further terminates at a second side in a third partition edge 1792. The third partition edge 1792 is an edge internal to the sheet 1700 such that it does not intersect with or form part of the outside edge 1710. The third partition edge 1792 protrudes from the second partition crease 1794 toward the second partition 1791. This protrusion of the third partition edge 1792 extends the third partition 1790 such that it is located on both sides of the second partition crease 1794. This extension for the third partition 1790 bifurcates the second partition crease 1794.

In a preferred embodiment, the third partition edge 1792 abuts the second partition edge 1793, described below. The third partition edge 1792 may be formed by cutting the sheet 1700. The third partition edge 1792 may be formed by the same cut as the second partition edge 1793, described below.

The third partition 1790 is otherwise configured similarly to the third partition 1140 of FIG. 8.

The sheet 1700 further includes a second partition 1791. The second partition 1791 terminates at a second side in the second partition crease 1794.

The second partition 1791 further terminates at a second side in a second partition edge 1793. The second partition edge 1782 is an edge internal to the sheet 1700 such that it does not intersect with or form part of the outside edge 1710. The second partition edge 1693 protrudes from the second partition crease 1794 toward the first side wall 1740. This protrusion of the second partition edge 1793 reduces the area occupied by the second partition 1791.

The second partition 1991 extends to both sides of the second partition crease 1794. This extension may be a result of a protrusion of the second partition bottom edge 1798 toward the side shell connecting tab 1736.

The second partition 1791 is otherwise configured similarly to the second partition 1160 of FIG. 8.

Figure 18:
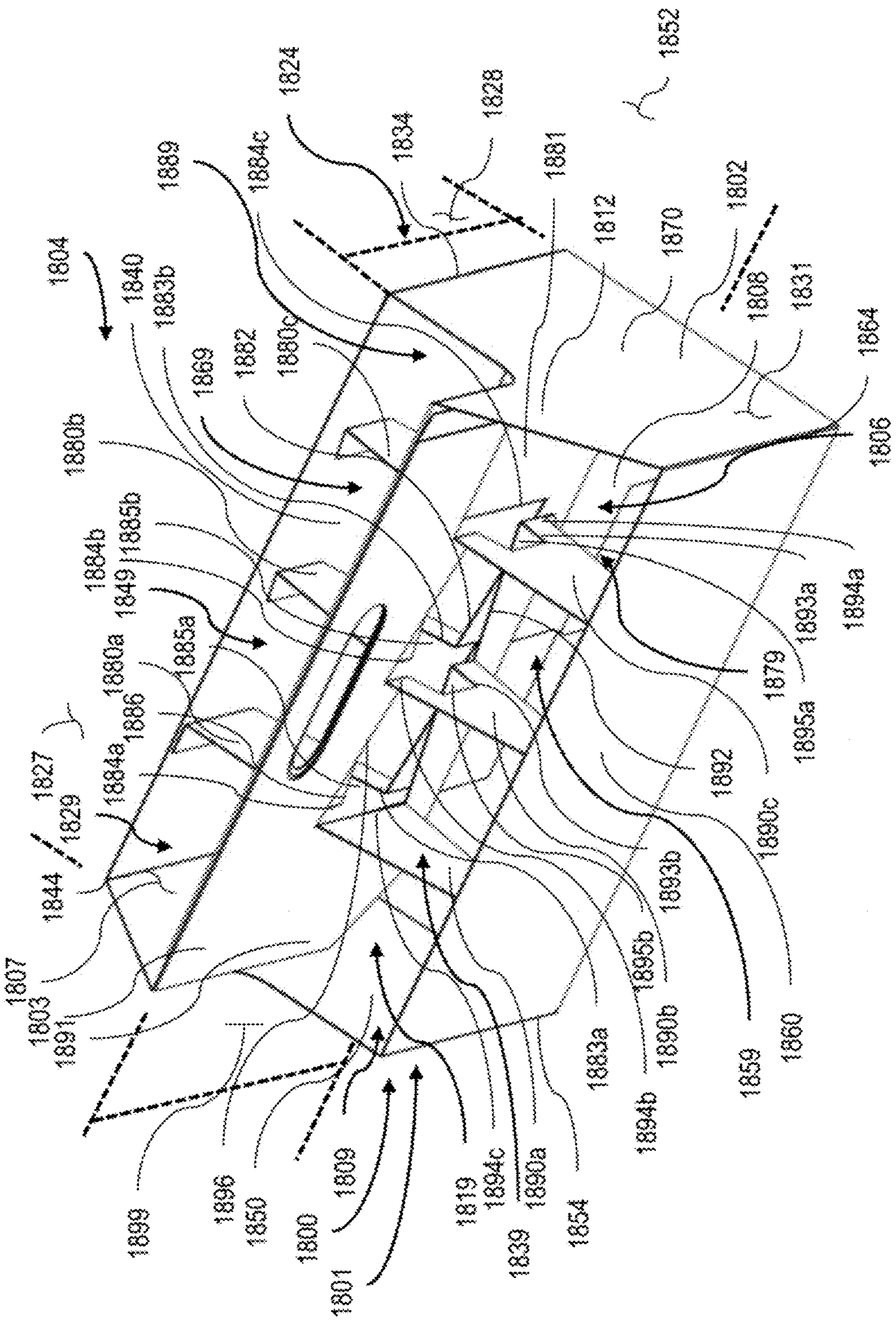
FIG. 18 a perspective view schematic diagram of a package according to a further embodiment.

Referring now to FIG. 18 shown therein is a perspective view schematic diagram of a package 1800 according to a further embodiment. The package 1800 structure is constructed from of a sheet 1801. The sheet 1801 may be the sheet 1900 of FIG. 19, described below. The package 1800 is constructed from the sheet 1801 by folding and securing the sheet 1801 in a flat configuration and opening the flat configuration into the open configuration of package 1800. Unless specified otherwise below, the package 1800 is configured similarly to the package 100 of FIGS. 1-7.

The package 1800 includes an inside space 1806. The inside space 1806 is the space substantially surrounded by the package 1800 not occupied by other parts of the package 1800 or articles place or stored in the package 1800.

The inside space 1806 includes a top 1807. The top 1807 may be open to the outside environment 1804 such that the package 1800 may receive articles placed in the inside space 1806. The top 1807 is a substantially planar. In a preferred embodiment, the top 1807 is parallel to a resting surface 1852 when the package is placed on the resting surface.

The package includes an outer shell 1802. The outer shell 1802 separates the outside environment 1804 from the inside space 1806.

This outer shell 1802 includes a side shell exterior surface 1831, described below. The side shell exterior surface 1831 is functionally seamless except where the side wall turns to form a substantial corner.

The package 1800 includes a bottom 1808 for supporting articles placed in the package 1800. The bottom 1808 provides a horizontal floor structure for the package 1800. The bottom 1808 is a substantially planer structure. The bottom 1808 may be rectangular.

The outer shell 1802 further includes a side shell 1812. The side shell 1812 provides a substantially vertical outer wall for the package 1800. The side shell 1812 includes a side shell main area 1824. The side shell main area 1824 is a portion of the side shell 1812 bounded by a top plane 1827. The top plane 1827 is an imaginary plane in-line with the top 1807 of FIG. 1. The side shell main area 1824 is further bounded by a bottom plane 1828. The bottom plane 1828 is an imaginary plane in-line with the bottom 1808.

The side shell main area 1824 further includes a side shell exterior surface 1831. The side shell exterior surface 1831 is the surface of the side shell main area 1824 exposed to the exterior environment 1804.

The side shell exterior surface 1831 is functionally seamless except where the side wall turns to form a substantial corner, such as the side corners 1834, 1844, 1854, and 1864.

In a preferred embodiment, the package 1800 includes a handle 1803. The handle 1803 provides a structure to be grasped when a person is carrying the package. The handle 1803 may also facilitate storage or display. The handle 1803 may further provide a structure for hanging the package.

The handle 1803 is a substantially planer structure. The handle 1803 may be layered. The layering may provide the handle 1803 with a thickness. The layers of the handle 1803 may be secured together by a handle securing medium 1805 (not shown), such as glue, tape, or string.

The package 1800 further includes a primary first partition 1880*a*. The primary first partition 1880*a* divides the inside space 1806. The primary first partition 1880*a* provides a structure that intercedes between articles placed in the package 1800. The primary first partition 1880*a* may also reinforce the structure of the package 1800.

The primary first partition 1880*a* is formed by a panel of the sheet 1801. The primary first partition 1880*a* may be formed from the primary first partition 1980*a* of FIG. 19, described below. The primary first partition 1880*a* is configured to be substantially vertical. The primary first partition 1880*a* is further configured to be substantially perpendicular to the first side wall 1840. The primary first partition 1880*a* is configured to be substantially perpendicular to the bottom 1808.

The primary first partition 1880*a* terminates at a second side in a primary fourth partition corner 1884*a*. The primary fourth partition corner 1884*a* rotatably connects the primary first partition 1880*a* to a fourth partition 1881, described below. The primary fourth partition corner 1884*a* is formed by folding the sheet 1801 such that that the primary first partition 1880*a* is configured at a substantial angle to the fourth partition 1881, described below. The primary fourth partition corner 1884*a* may be the primary fourth partition crease 1984*a* of FIG. 19.

The primary fourth partition corner 1884*a* is configured to run vertically. In a preferred embodiment, the primary fourth partition corner 1884*a* is substantially located along a vertical plane at the longitudinal center 1899 of the package 1800. In a further preferred embodiment, the primary fourth partition corner 1884*a* is collocated with the tertiary second partition corner 1894*c* described below. In a further preferred embodiment, the primary fourth partition corner 1884*a* is located quarter of the longitudinal size of the package 1800 away from the fourth side wall 1870 along the longitudinal center 1899. This location partially provides compartments with equal longitudinal distances.

The primary first partition 1880*a* further terminates at a second side in a primary first partition edge 1883*a*. The primary first partition edge 1883*a* protrudes from the primary fourth partition corner 1884*a* toward the first side wall 1840. This protrusion of the primary first partition edge 1883*a* forms a primary first partition cutout 1885*a*. The primary first partition cutout 1885*a* bifurcates the primary fourth partition corner 1884*a*

The package 1800 further includes a secondary first partition 1880*b*. The secondary first partition 1880*b* divides the inside space 1806. The secondary first partition 1880*b* provides a structure that intercedes between articles placed in the package 1800. The secondary first partition 1880*b* may also reinforce the structure of the package 1800.

The secondary first partition 1880*b* is formed by a panel of the sheet 1801. The secondary first partition 1880*b* may be formed from the secondary second partition 1980*b* of FIG. 19, described below. The secondary first partition 1880*b* is configured to be substantially vertical. The secondary first partition 1880*b* is further configured to be substantially perpendicular to the first side wall 1840. The secondary first partition 1880*b* is configured to be substantially perpendicular to the bottom 1808.

The secondary first partition 1880*b* terminates at a second side in a secondary fourth partition corner 1884*b*. The secondary fourth partition corner 1884*b* rotatably connects the secondary first partition 1880*b* to a fourth partition 1881, described below. The secondary fourth partition corner 1884*b* is formed by folding the sheet 1801 such that that the secondary first partition 1880*b* is configured at a substantial angle to the fourth partition 1881, described below. The secondary fourth partition corner 1884*b* may be the secondary fourth partition crease 1984*b* of FIG. 19.

The secondary fourth partition corner 1884*b* is configured to run vertically. The secondary fourth partition corner 1884*b* is bifurcated. In a preferred embodiment, the secondary fourth partition corner 1884*b* is substantially located along a vertical plane at the longitudinal center 1899 of the package 1800. In a further preferred embodiment, the secondary fourth partition corner 1884*b* is collocated with the secondary second partition corner 1894*b* described below. In a further preferred embodiment, the secondary fourth partition corner 1884*b* is located in the middle of the longitudinal size of the package 1800 along the longitudinal center 1899. This location partially provides compartments with equal longitudinal distances.

The secondary first partition 1880*b* further terminate at a second side in a secondary first partition edge 1883*b*. The secondary first partition edge 1883*b* protrudes from the secondary fourth partition corner 1884*b* toward the first side wall 1840. This protrusion of the secondary first partition edge 1883*b* forms a secondary first partition cutout 1885*b*. The secondary first partition cutout 1885*b* bifurcates the primary fourth partition corner 1884*a*.

The package 1800 further includes a tertiary first partition 1880*c*. The tertiary first partition 1880*c* divides the inside space 1806. The tertiary first partition 1880*c* provides a structure that intercedes between articles placed in the package 1800. The tertiary first partition 1880*c* may also reinforce the structure of the package 1800.

The tertiary first partition 1880*c* is formed by a panel of the sheet 1801. The tertiary first partition 1880*c* may be formed from the tertiary first partition 1980*c* of FIG. 19, described below. The tertiary first partition 1880*c* is configured to be substantially vertical. The tertiary first partition 1880*c* is further configured to be substantially perpendicular to the first side wall 1840. The tertiary first partition 1880*c* is configured to be substantially perpendicular to the bottom 1808.

The tertiary first partition 1880*c* terminates at a second side in a tertiary fourth partition corner 1884*c*. The tertiary fourth partition corner 1884*c* rotatably connects the tertiary first partition 1880*c* to a fourth partition 1881, described below. The tertiary fourth partition corner 1884*c* is formed by folding the sheet 1801 such that that the tertiary first partition 1880*c* is configured at a substantial angle to the fourth partition 1881, described below. The tertiary fourth partition corner 1884*c* may be the tertiary fourth partition crease 1984*c* of FIG. 19.

The tertiary fourth partition corner 1884*c* is configured to run vertically. In a preferred embodiment, the tertiary fourth partition corner 1884*c* is substantially located along a vertical plane at the longitudinal center 1899 of the package 1800. In a further preferred embodiment, the tertiary fourth partition corner 1884*c* is collocated with the primary second partition corner 1894*a* described below. In a further preferred embodiment, the tertiary fourth partition corner 1884*c* is located quarter of the longitudinal size of the package 1800 away from the third side wall 1860 along the longitudinal center 1899. This location partially provides compartments with equal longitudinal distances.

The package 1800 further includes a fourth partition 1881. The fourth partition 1881 divides the inside space 1806. The fourth partition 1881 provides a structure that intercedes between articles placed in the package 1800. The fourth partition 1881 may also reinforce the structure of the package 1800.

The fourth partition 1881 is formed by a panel of the sheet 1801. The first partition may be the fourth partition 1981 of FIG. 19, described below. The fourth partition 1881 is configured to be substantially vertical. The fourth partition 1881 is further configured to be substantially perpendicular to a fourth side wall 1870. The fourth partition 1881 is configured to be substantially perpendicular to the bottom 1808.

The fourth partition 1881 terminates at a second side in the primary fourth partition corner 1884*a*.

The fourth partition 1881 further terminates in a fourth partition cutout border 1882. The fourth partition cutout border 1882 bifurcates the primary fourth partition corner 1884*a*. The fourth partition cutout border 1882 includes the secondary fourth partition corner 1884*b*. The fourth partition cutout border 1882 further includes the tertiary fourth partition corner 1884*c*. The fourth partition cutout border 1882 further includes a fourth partition cutout edge 1886. The fourth partition cutout edge 1886 is a non-continuous edge that connects the primary fourth partition corner 1884*a*, the secondary fourth partition corner 1884*b*, and the tertiary fourth partition corner 1884*c*.

The package 1800 further includes a primary third partition 1890*a*. The primary third partition 1890*a* divides the inside space 1806. The primary third partition 1890*a* provides a structure that intercedes between articles placed in the package 1800. The primary third partition 1890*a* may also reinforce the structure of the package 1800.

The primary third partition 1890*a* is formed by a panel of the sheet 1801. The primary third partition 1890*a* may be formed from the primary third partition 1990*a* of FIG. 19, described below. The primary third partition 1890*a* is configured to be substantially vertical. The primary third partition 1890*a* is further configured to be substantially perpendicular to the third side wall 1860. The primary third partition 1890*a* is configured to be substantially perpendicular to the bottom 1808.

The primary third partition 1890*a* terminates at a second side in a primary second partition corner 1894*a*. The primary second partition corner 1894*a* rotatably connects the primary third partition 1890*a* to a second partition 1891, described below. The primary second partition corner 1894*a* is formed by folding the sheet 1801 such that that the primary third partition 1890*a* is configured at a substantial angle to the second partition 1891, described below. The primary second partition corner 1894*a* may be the primary second partition crease 1994*a* of FIG. 19.

The primary second partition corner 1894*a* is configured to run vertically. In a preferred embodiment, the primary second partition corner 1894*a* is substantially located along a vertical plane at the longitudinal center 1899 of the package 1800. In a further preferred embodiment, the primary second partition corner 1894*a* is collocated with the tertiary second partition corner 1894*c* described below. In a further preferred embodiment, the primary second partition corner 1894*a* is located quarter of the longitudinal size of the package 1800 away from the second side wall 1850 along the longitudinal center 1899. This location partially provides compartments with equal longitudinal distances.

The primary third partition 1890*a* further terminates at a second side in a primary third partition edge 1893*a*. The primary third partition edge 1893*a* protrudes from the primary second partition corner 1894*a* toward the third side wall 1860. This protrusion of the primary third partition edge 1893*a* forms a primary third partition cutout 1895*a*. The primary third partition cutout 1895*a* bifurcates the primary second partition corner 1894*a*

The package 1800 further includes a secondary third partition 1890*b*. The secondary third partition 1890*b* divides the inside space 1806. The secondary third partition 1890*b* provides a structure that intercedes between articles placed in the package 1800. The secondary third partition 1890*b* may also reinforce the structure of the package 1800.

The secondary third partition 1890*b* is formed by a panel of the sheet 1801. The secondary third partition 1890*b* may be formed from the secondary second partition 1980*b* of FIG. 19, described below. The secondary third partition 1890*b* is configured to be substantially vertical. The secondary third partition 1890*b* is further configured to be substantially perpendicular to the third side wall 1860. The secondary third partition 1890*b* is configured to be substantially perpendicular to the bottom 1808.

The secondary third partition 1890*b* terminates at a second side in a secondary second partition corner 1894*b*. The secondary second partition corner 1894*b* rotatably connects the secondary third partition 1890*b* to a second partition 1891, described below. The secondary second partition corner 1894*b* is formed by folding the sheet 1801 such that that the secondary third partition 1890*b* is configured at a substantial angle to the second partition 1891, described below. The secondary second partition corner 1894*b* may be the secondary second partition crease 1994*b* of FIG. 19.

The secondary second partition corner 1894*b* is configured to run vertically. The secondary second partition corner 1894*b* is bifurcated. In a preferred embodiment, the secondary second partition corner 1894*b* is substantially located along a vertical plane at the longitudinal center 1899 of the package 1800. In a further preferred embodiment, the secondary second partition corner 1894*b* is collocated with the secondary second partition corner 1894*b* described below. In a further preferred embodiment, the secondary second partition corner 1894*b* is located in the middle of the longitudinal size of the package 1800 along the longitudinal center 1899. This location partially provides compartments with equal longitudinal distances.

The secondary third partition 1890*b* further terminate at a second side in a secondary third partition edge 1893*b*. The secondary third partition edge 1893*b* protrudes from the secondary second partition corner 1894*b* toward the third side wall 1860. This protrusion of the secondary third partition edge 1893*b* forms a secondary third partition cutout 1895*b*. The secondary third partition cutout 1895*b* bifurcates the primary second partition corner 1894*a*.

The package 1800 further includes a tertiary third partition 1890*c*. The tertiary third partition 1890*c* divides the inside space 1806. The tertiary third partition 1890*c* provides a structure that intercedes between articles placed in the package 1800. The tertiary third partition 1890*c* may also reinforce the structure of the package 1800.

The tertiary third partition 1890*c* is formed by a panel of the sheet 1801. The tertiary third partition 1890*c* may be formed from the tertiary third partition 1990*c* of FIG. 19, described below. The tertiary third partition 1890*c* is configured to be substantially vertical. The tertiary third partition 1890*c* is further configured to be substantially perpendicular to the third side wall 1860. The tertiary third partition 1890*c* is configured to be substantially perpendicular to the bottom 1808.

The tertiary third partition 1890*c* terminates at a second side in a tertiary second partition corner 1894*c*. The tertiary second partition corner 1894*c* rotatably connects the tertiary third partition 1890c to a second partition 1891, described below. The tertiary second partition corner 1894c is formed by folding the sheet 1801 such that that the tertiary third partition 1890c is configured at a substantial angle to the second partition 1891, described below. The tertiary second partition corner 1894c may be the tertiary second partition crease 1994c of FIG. 19.

The tertiary second partition corner 1894c is configured to run vertically. In a preferred embodiment, the tertiary second partition corner 1894c is substantially located along a vertical plane at the longitudinal center 1899 of the package 1800. In a further preferred embodiment, the tertiary second partition corner 1894c is collocated with the primary second partition corner 1894a described below. In a further preferred embodiment, the tertiary second partition corner 1894c is located quarter of the longitudinal size of the package 1800 away from the third side wall 1860 along the longitudinal center 1899. This location partially provides compartments with equal longitudinal distances.

The package 1800 further includes a second partition 1891. The second partition 1891 divides the inside space 1806. The second partition 1891 provides a structure that intercedes between articles placed in the package 1800. The second partition 1891 may also reinforce the structure of the package 1800.

The second partition 1891 is formed by a panel of the sheet 1801. The first partition may be the first partition 1991 of FIG. 19, described below. The second partition 1891 is configured to be substantially vertical. The second partition 1891 is further configured to be substantially perpendicular to a fourth side wall 1870. The second partition 1891 is configured to be substantially perpendicular to the bottom 1808.

The second partition 1891 terminates at a second side in the primary second partition corner 1894a.

The second partition 1891 further terminates in a second partition cutout border 1892. The second partition cutout border 1892 bifurcates the primary second partition corner 1894a. The second partition cutout border 1892 includes the secondary second partition corner 1894b. The second partition cutout border 1892 further includes the tertiary second partition corner 1894c. The second partition cutout border 1892 further includes a second partition cutout edge 1896. The second partition cutout edge 1896 is a non-continuous edge that connects the primary second partition corner 1894a, the secondary second partition corner 1894b, and the tertiary second partition corner 1894c.

The inside space 106 further includes eight compartments 1809. The compartments 1809 each are for receiving an article such as a bottle or a can.

The compartments 1809 include a first compartment 1819. The first compartment 1819 is the portion of the inside space 1806 substantially contained within top 1807, the bottom 1808, the second side wall 1850, the third side wall 1860, the tertiary third partition 1890a, and the second partition 1891.

The compartments 1809 include a second compartment 1829. The second compartment 1819 is the portion of the inside space 1806 substantially contained within top 1807, the bottom 1808, the second side wall 1850, the first side wall 1840, the primary first partition 1880a, and the second partition 1891.

The compartments 1809 include a third compartment 1839. The third compartment 1839 is the portion of the inside space 1806 substantially contained within top 1807, the bottom 1808, the tertiary third partition 1890c, the third side wall 1860, the secondary third partition 1890b, and the second partition 1891.

The compartments 1809 include a fourth compartment 1849. The fourth compartment 1849 is the portion of the inside space 1806 substantially contained within top 1807, the bottom 1808, the primary first partition 1880a, the fourth partition 1881, the secondary first partition 1880b, and the first side wall 1840.

The compartments 1809 include a fifth compartment 1859. The fifth compartment 1859 is the portion of the inside space 1806 substantially contained within top 1807, the bottom 1808, the secondary third partition 1890b, the third side wall 1860, the primary third partition 1890a, and the second partition 1891.

The compartments 1809 include a sixth compartment 1869. The sixth compartment 1869 is the portion of the inside space 1806 substantially contained within top 1807, the bottom 1808, the secondary first partition 1880b, the fourth partition 1881, the tertiary first partition 1880c, and the first side wall 1840.

The compartments 1809 include a seventh compartment 1879. The seventh compartment 1879 is the portion of the inside space 1806 substantially contained within top 1807, the bottom 1808, the primary third partition 1890a, the third side wall 1860, the fourth side wall 1870, and the fourth partition 1881.

The compartments 1809 include an eighth compartment 1889. The eighth compartment 1889 is the portion of the inside space 1806 substantially contained within top 1807, the bottom 1808, the tertiary first partition 1880c, the fourth partition 1881, the fourth side wall 1870, and the first side wall 1840.

Figure 19:
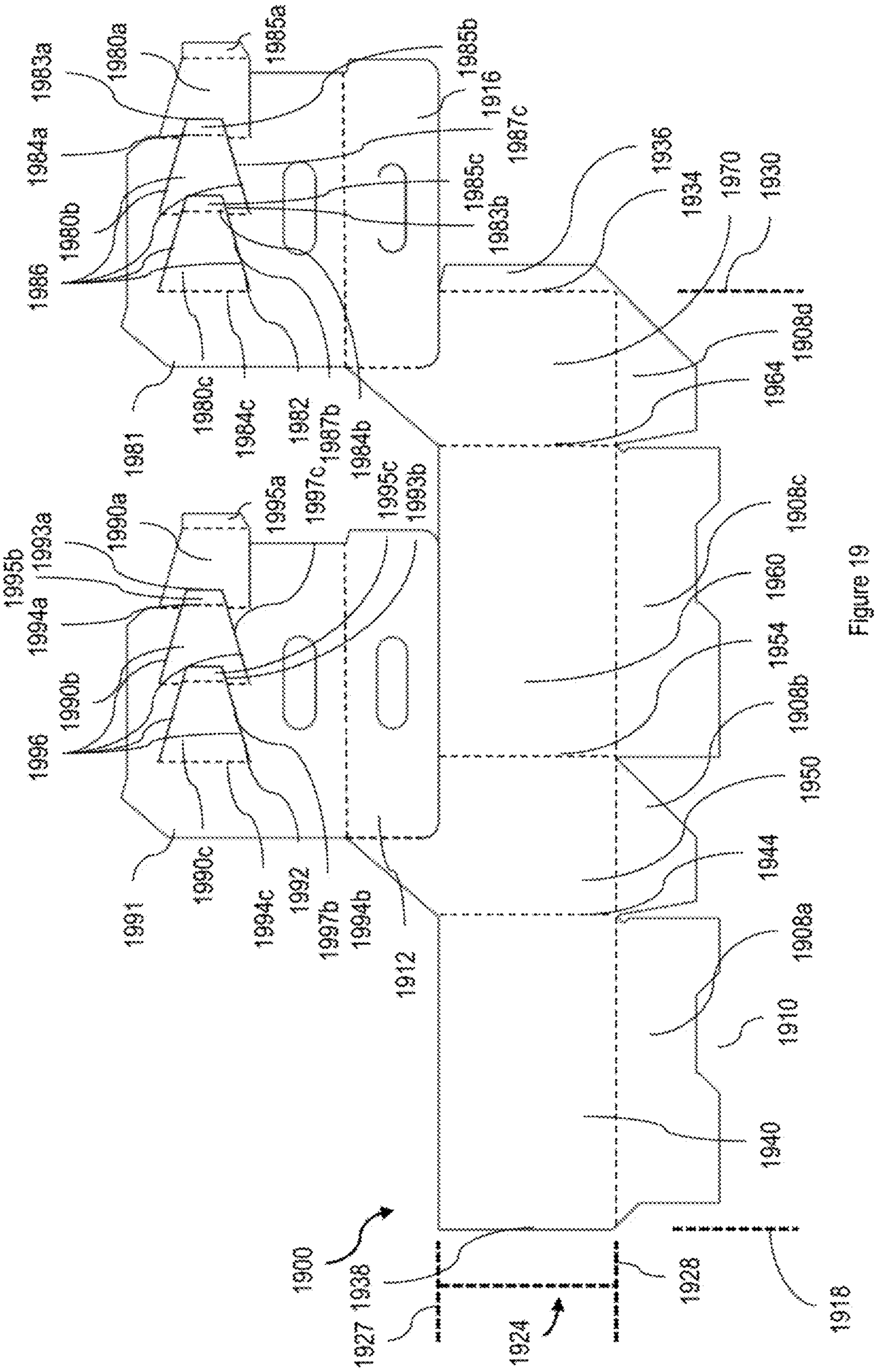
FIG. 19 is a top view schematic diagram of a sheet, according to a further embodiment.

Referring now to FIG. 19, shown therein is a therein is a top view schematic diagram of a sheet 1900 according to an embodiment. The sheet 1900 is configured for forming the package 1800 of FIG. 18. The sheet 1900 is a single piece. The sheet 1900 is flat. The sheet includes connected panels, creases, internal edges, and an outside edge 1910. The outside edge 1910 includes a series of connected edge segments.

The sheet includes a side shell main area 1924. The side shell main area 1924 may form the side shell main area 1824 of FIG. 18. The side shell main area 1924 terminates in a top line 1927. The top line 1927 is an imaginary line in-line with portion of the outside edge 1910 that would define the top 1807 of FIG. 18. The side shell main area 1924 further terminates in a bottom line 1928. The bottom line 1928 is an imaginary line in-line with the creases for would define the bottom 1808 of FIG. 18. The side shell main area 1924 terminates on a first side in a first side line 1918. The first side line 1918 is an imaginary line in-line with a side wall segment 1938, described below. The side shell main area 1924 terminates on a second side in a second side line 1930. The second side line 1930 is an imaginary line in-line with the first side crease 1934, described below.

The side shell main area 1924 is functionally seamless except for first side crease 1934, the second side crease 1944, the third side crease 1954, and the fourth side crease 1964 and the creases and edge segments at which the side sell main area terminates. These excluded side wall creases are for forming the side wall corners of the package 1800 of FIG. 18 such as the side wall corners 1834, 1844, 1854, and 1864 of FIG. 18.

The sheet 1900 further includes a first bottom panel 1908a, a second bottom panel 1908b, a third bottom panel 1908c, and a third bottom panel 1908d, collectively referred to as bottom panels 1908. The bottom panels are for forming a bottom of a package such as the bottom 1808 of FIG. 18. The bottom panels 1908 are configured similarly to the bottom panels 850, 870, 880, and 890 of FIG. 8, respectively.

The sheet 1900 further includes a first side panel 1940. The first side panel 1940 is a panel for forming a side wall such as the first side wall 1840 of FIG. 18. The first side panel 1940 is functionally seamless. The first side panel 1940 is configured similarly to the first side panel 940 of FIG. 8.

The sheet 1900 further includes a second side panel 1950. The second side panel 1950 is a panel for forming a side wall such as the second side wall 1850 of FIG. 18. The second side panel 1950 is functionally seamless. The second side panel 1950 is configured similarly to the second side panel 950 of FIG. 8.

The sheet 1900 further includes a third side panel 1960. The third side panel 1960 is a panel for forming a side wall such as the third side wall 1860 of FIG. 18. The third side panel 1960 is functionally seamless. The third side panel 1960 is configured similarly to the third side panel 960 of FIG. 8.

The sheet 1900 further includes a fourth side panel 1970. The fourth side panel 1970 is a panel for forming a side wall such as the fourth side wall 1960 of FIG. 18. The fourth side panel 1970 is functionally seamless. The fourth side panel 1970 is configured similarly to the fourth side panel 970 of FIG. 8.

The sheet 1900 further includes a side shell connecting tab 1936. The side shell connecting tab 1936 is a panel for connecting the first side panel 1940 to the second side panel 1970. The side shell connecting tab 1936 is configured similarly to the side shell connecting tab 936 of FIG. 8.

The sheet 1900 further includes a first handle panel 1912. The first handle panel 1912 is for forming a handle. The first handle panel 1912 is configured similarly to the first handle panel 1012 of FIG. 8.

The sheet 1900 further includes a second handle panel 1916. The second handle panel 1916 is for forming a handle. The second handle panel 1916 is configured similarly to the second handle panel 1016 of FIG. 8.

The sheet further includes a primary first partition connecting tab 1985*a*, a secondary first partition connecting tab 1985*b*, and a tertiary first partition connecting tab 1985*c*. The primary first partition connecting tab 1985*a*, the secondary first partition connecting tab 1985*b*, and the tertiary first partition connecting tab 1985*c* are for connecting the primary first partition 1980*a*, the secondary first partition 1980*b*, and the tertiary first partition 1985*c* respectively to the first side panel 1940. The primary first partition connecting tab 1985*a*, the secondary first partition connecting tab 1985*b*, and the tertiary first partition connecting tab 1985*c* are configured similarly to the first partition connecting tab 1110 of FIG. 8.

The sheet 1900 further includes a primary first partition 1980*a*. The primary first partition 1980*a* terminates at a second side in a primary fourth partition crease 1984*a*. The primary fourth partition crease 1984*a* rotatably connects the primary first partition 1980*a* to a fourth partition 1981, described below.

The primary first partition 1980*a* further terminates at a second side in a primary first partition edge 1983*a*. The primary first partition edge 1983*a* is an edge interior to the sheet 1900. The primary first partition edge 1983*a* protrudes from the primary fourth partition crease 1984*a* into the primary first partition 1980*a*. This protrusion of the primary first partition edge 1983*a* bifurcates the primary fourth partition crease 1984*a*. The primary first partition edge 1983*a* abuts a secondary first partition exterior edge 1987*b*, described below.

The sheet 1900 further includes a secondary first partition 1980*b*. The secondary first partition 1980*b* terminates at a first side in a secondary first partition exterior edge 1987*b*. The secondary first partition exterior edge 1987*b* is an edge interior to the sheet 1900. The secondary first partition exterior edge 1987*b* protrudes from the secondary fourth partition crease 1984*b* towards the primary first partition 1980*a*. This protrusion of the secondary first partition exterior edge 1987*b* bifurcates the primary fourth partition crease 1984*a*.

The secondary first partition 1980*b* terminates at a second side in a secondary fourth partition crease 1984*b*. The secondary fourth partition crease 1984*b* rotatably connects the secondary first partition 1980*b* to a fourth partition 1981, described below.

The secondary first partition 1980*b* further terminate at a second side in a secondary first partition edge 1983*b*. The secondary first partition edge 1983*b* is an edge interior to the sheet 1900. The secondary first partition edge 1983*b* protrudes from the secondary fourth partition crease 1984*b* into the secondary first partition 1990*b*. This protrusion of the secondary first partition edge 1983*b* bifurcates the secondary fourth partition crease 1984*b*. The secondary first partition edge 1983*b* abuts a tertiary first partition exterior edge 1987*c*, described below.

The sheet 1900 further includes a tertiary first partition 1980*c*. The tertiary first partition 1980*c* terminates at a first side in a tertiary first partition exterior edge 1987*c*. The tertiary first partition edge is an edge interior to the sheet 1900. The tertiary first partition exterior edge 1987*c* protrudes from the tertiary fourth partition crease 1984*c* towards the secondary first partition 1990*b*. This protrusion of the tertiary first partition exterior edge 1987*c* bifurcates the secondary fourth partition crease 1984*b*. The tertiary first partition exterior edge 1987*c* abuts the secondary first partition edge 1983*b*.

The tertiary first partition 1980*c* terminates at a second side in a tertiary fourth partition crease 1984*c*. The tertiary fourth partition crease 1984*c* rotatably connects the tertiary first partition 1980*c* to a fourth partition 1981, described below.

The primary first partition 1980*a*, secondary first partition 1980*b*, and tertiary first partition 1980*c* are otherwise similarly configured to the first partition 1100 of FIG. 8.

The sheet 1900 further includes a fourth partition 1981. The fourth partition 1981 terminates at a second side in the primary fourth partition crease 1984*a*.

The fourth partition 1981 further terminates in a fourth partition cutout border 1982. The fourth partition cutout border 1982 bifurcates the primary fourth partition crease 1984*a*. The fourth partition cutout border 1982 includes the secondary fourth partition crease 1984*b*. The fourth partition cutout border 1982 further includes the tertiary fourth partition crease 1984*c*.

The fourth partition cutout border 1982 further includes a fourth partition cutout edge 1986. The fourth partition cutout edge is an edge internal to sheet 1900. The fourth partition cutout edge 1986 is non-continuous in that portions of the fourth partition cutout edge are interceded by edges such as the secondary fourth partition crease 1984*b*, and the tertiary fourth partition crease 1984*c*. The fourth partition cutout edge 1986 connects the primary fourth partition crease 1984*a*, the secondary fourth partition crease 1984*b*, and the tertiary fourth partition crease 1984*c*. The fourth partition cutout edge 1986 is an edge internal to the sheet. The fourth partition cutout edge 1986 abuts secondary first partition exterior edge 1987*b*. The fourth partition cutout edge 1986 further abuts tertiary first partition exterior edge 1987*c*.

The fourth partition 1981 is otherwise similarly configured to the fourth partition 1120 of FIG. 8.

The sheet further includes a primary third partition connecting tab 1995*a*, a secondary third partition connecting tab 1995*b*, and a tertiary third partition connecting tab 1995*c*. The primary third partition connecting tab 1995*a*, the secondary third partition connecting tab 1995*b*, and the tertiary third partition connecting tab 1995*c* are for connecting the primary third partition 1990*a*, the secondary third partition 1990*b*, and the tertiary first partition 1985*c* respectively to the third side panel 1960. The primary third partition connecting tab 1995*a*, the secondary third partition connecting tab 1995*b*, and the tertiary third partition connecting tab 1995*c* are configured similarly to the first partition connecting tab 1110 of FIG. 8.

The sheet 1900 further includes a primary third partition 1990*a*. The primary third partition 1990*a* terminates at a second side in a primary fourth partition crease 1984*a*. The primary second partition crease 1994*a* rotatably connects the primary third partition 1990*a* to a second partition 1991, described below.

The primary third partition 1990*a* further terminates at a second side in a primary third partition edge 1993*a*. The primary third partition edge 1993*a* is an edge interior to the sheet 1900. The primary third partition edge 1993*a* protrudes from the primary second partition crease 1994*a* into the primary third partition 1990*a*. This protrusion of the primary third partition edge 1993*a* bifurcates the primary second partition crease 1994*a*. The primary third partition edge 1993*a* abuts a secondary first partition exterior edge 1987*b*, described below.

The sheet 1900 further includes a secondary third partition 1990*b*. The secondary third partition 1990*b* terminates at a first side in a secondary third partition exterior edge 1997*b*. The secondary third partition exterior edge 1997*b* is an edge interior to the sheet 1900. The secondary third partition exterior edge 1997*b* protrudes from the secondary second partition crease 1994*b* towards the primary third partition 1990*a*. This protrusion of the secondary third partition exterior edge 1997*b* bifurcates the primary second partition crease 1994*a*.

The secondary third partition 1990*b* terminates at a second side in a secondary second partition crease 1994*b*. The secondary second partition crease 1994*b* rotatably connects the secondary third partition 1990*b* to a second partition 1991, described below.

The secondary third partition 1990*b* further terminate at a second side in a secondary third partition edge 1993*b*. The secondary third partition edge 1993*b* is an edge interior to the sheet 1900. The secondary third partition edge 1993*b* protrudes from the secondary second partition crease 1994*b* into the secondary first partition 1990*b*. This protrusion of the secondary third partition edge 1993*b* bifurcates the secondary second partition crease 1994*b*. The secondary third partition edge 1993*b* abuts a tertiary third partition exterior edge 1997*c*, described below.

The sheet 1900 further includes a tertiary third partition 1990*c*. The tertiary third partition 1990*c* terminates at a first side in a tertiary third partition exterior edge 1997*c*. The tertiary first partition edge is an edge interior to the sheet 1900. The tertiary third partition exterior edge 1997*c* protrudes from the tertiary second partition crease 1994*c* towards the secondary first partition 1990*b*. This protrusion of the tertiary third partition exterior edge 1997*c* bifurcates the secondary second partition crease 1994*b*. The tertiary third partition exterior edge 1997*c* abuts the secondary third partition edge 1993*b*.

The tertiary third partition 1990*c* terminates at a second side in a tertiary second partition crease 1994*c*. The tertiary second partition crease 1994*c* rotatably connects the tertiary third partition 1990*c* to a second partition 1991, described below.

The primary third partition 1990*a*, secondary third partition 1990*b*, and tertiary third partition 1990*c* are otherwise similarly configured to the first partition 1100 of FIG. 8.

The sheet 1900 further includes a second partition 1991. The second partition 1991 terminates at a second side in the primary second partition crease 1994*a*.

The second partition 1991 further terminates in a second partition cutout border 1992. The second partition cutout border 1992 bifurcates the primary second partition crease 1994*a*. The second partition cutout border 1992 includes the secondary second partition crease 1994*b*. The second partition cutout border 1992 further includes the tertiary second partition crease 1994*c*.

The second partition cutout border 1992 further includes a second partition cutout edge 1996. The fourth partition cutout edge is an edge internal to sheet 1900. The second partition cutout edge 1996 is non-continuous in that portions of the fourth partition cutout edge are interceded by edges such as the secondary second partition crease 1994*b*, and the tertiary second partition crease 1994*c*. The second partition cutout edge 1996 connects the primary second partition crease 1994*a*, the secondary second partition crease 1994*b*, and the tertiary second partition crease 1994*c*. The second partition cutout edge 1996 is an edge internal to the sheet. The second partition cutout edge 1996 abuts secondary third partition exterior edge 1997*b*. The second partition cutout edge 1996 further abuts tertiary third partition exterior edge 1997*c*.

The second partition 1991 is otherwise similarly configured to the fourth partition 1120 of FIG. 8.

Figure 20:
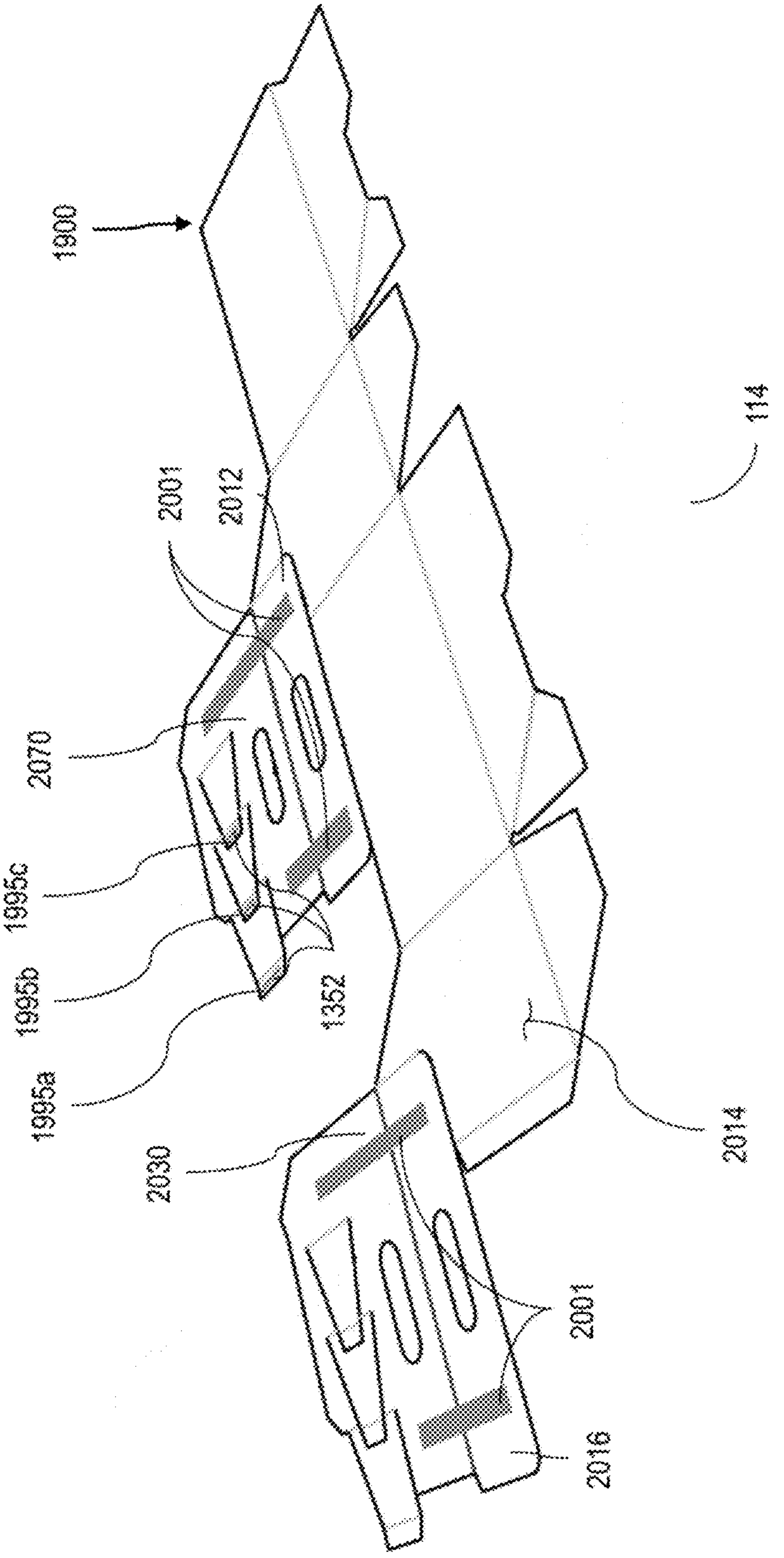
FIG. 20 is a perspective view schematic diagram of the sheet of FIG. 19 partially configured per the method of FIG. 9.

Referring now to FIG. 20, shown therein is a perspective schematic diagram view of the sheet 1900 of FIG. 19 configured per steps 1202 and 1204 of FIG. 9. A handle securing medium 2001 is on an interior surface 2014 of the handle first panel 2012, a handle second panel 2016, a second partition handle tab 2070, and a fourth partition handle tab 2030. A third partition securing medium 2052 is on the interior surface 2014 of the primary third partition connecting tab 1995*a*, the secondary third partition connecting tab 1995*b*, and the tertiary third partition connecting tab 1995*c*.

Figure 21:
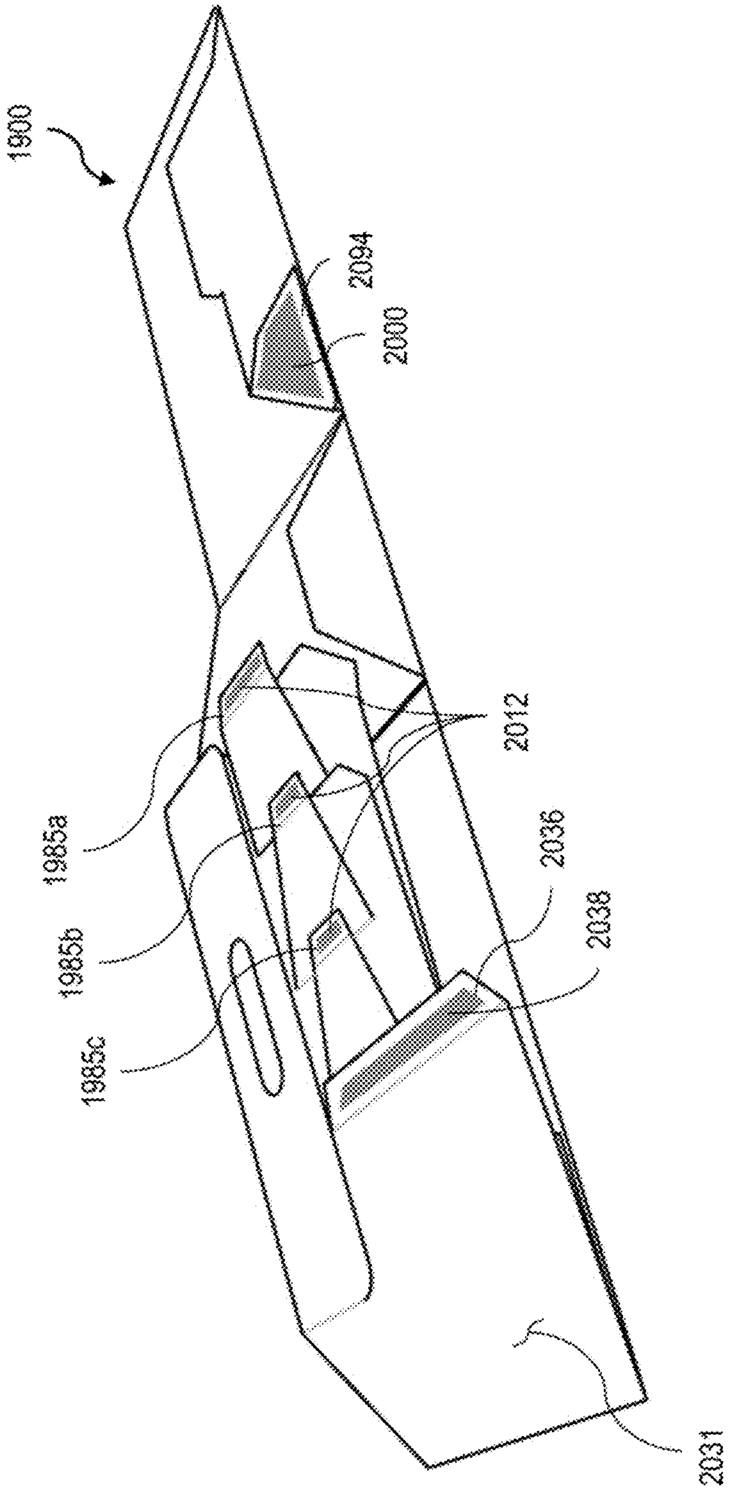
FIG. 21 is a perspective view schematic diagram of the sheet of FIG. 19 further partially configured per the method of FIG. 9.

Referring now to FIGS. 21, shown therein is a perspective view schematic diagram of the sheet 1900 of FIG. 19 configured per steps 1216, 1218, and 1220 of FIG. 9. A side shell securing medium 2038 is on the exterior surface 2031 of a side shell connecting tab 2036. A first partition securing medium 2012 is on the interior surface 2014 of the primary first partition connecting tab 1985*a*, the secondary first partition connecting tab 1985*b*, and tertiary first partition connecting tab 1985*c*. An auto-bottom first securing medium 2000 is on the an interior surface 2014 of the first auto-bottom panel 2094.

Figure 22:
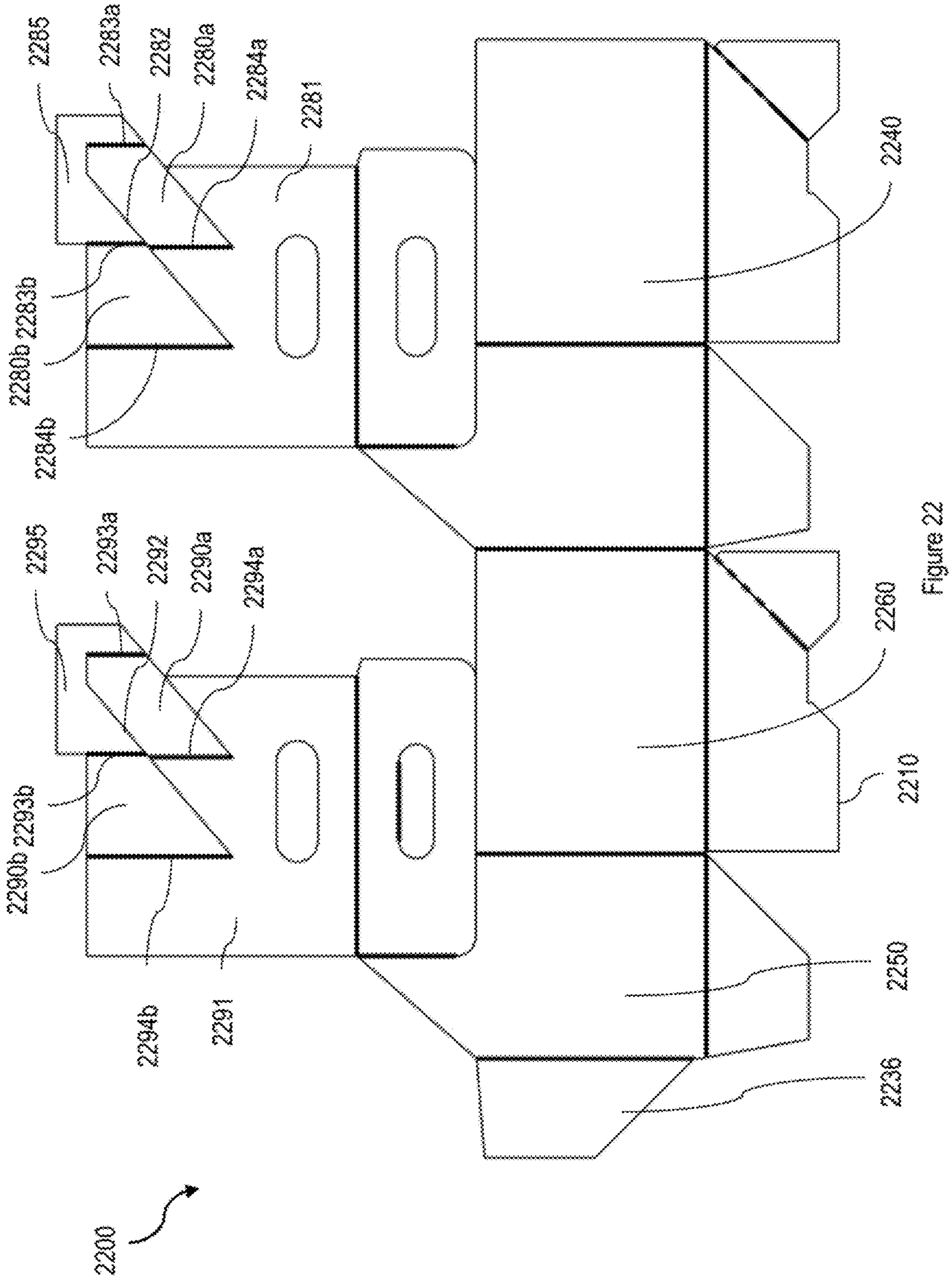
FIG. 22 is a top view schematic diagram of a sheet, according to a further embodiment.

Referring now to FIG. 22, shown therein is a top view schematic diagram of a sheet 2200 according to an embodiment. The sheet 2200 is configured for forming a package such as the package 1600 of FIG. 16. The sheet 2200 is a single piece. The sheet 2200 is flat. The sheet includes connected panels, creases, internal edges, and an outside edge 2210. The outside edge 2210 includes a series of connected edge segments.

The sheet 2200 includes a side shell connecting tab 2236. The side shell connecting tab 2236 is a panel for connecting the first side panel 2240 to the fourth side panel 2250. The side shell connecting tab 2236 is otherwise configured similarly to the side shell connecting tab 936 of FIG. 8.

The sheet 2200 further includes a primary first partition 2280*a*. The primary first partition 2280*a* terminates at a second side in a primary fourth partition crease 2284*a*. The primary fourth partition crease 2284*a* rotatably connects the primary first partition 2280*a* to a fourth partition 2281, described below. The primary fourth partition crease 2284*a* terminates at a first end at a fourth partition internal edge 2282 further described below. The primary fourth partition crease 2284*a* terminates at a second side at the outside edge 2210.

The primary first partition 2280*a* terminates at a bottom side in the outside edge 2210. At the primary first partition 2280*a* the outside edge 2210 may extend in and out of the interior area of the sheet 2200. This extension of the outside edge 2210 may be such that the primary first partition 2280*a* is long enough to extend to a first side panel 2240 when the package is in an open configuration.

The primary first partition 2280*a* terminates at a top side in the fourth partition internal edge 2282. The fourth partition internal edge 2282 may be substantially parallel and of similar length to the portion of the outside edge 2210 in which the primary first partition 2280 terminates. The fourth partition internal edge 2282 terminates at a first end at the primary first partition crease 2283*a*. The fourth partition internal edge 2282 terminates at a second end at a secondary fourth partition crease 2284*b* further described below. The fourth partition internal edge 2282 is internal to the sheet in that the fourth partition internal edge 2282 does not intersect with the outside edge 2210. The fourth partition internal edge 2282 may be formed by cutting the sheet. The cutting may be full or partial. Partial cutting may be referred to as nicking.

The primary first partition 2280*a* terminates at a first side in a primary first partition crease 2283*a*. The primary first partition crease 2283*a* rotatably connects the primary first partition 2280*a* to a first partition connecting tab 1985, further described below.

The sheet 2200 further includes a secondary first partition 2280*b*. The secondary first partition 2280*b* terminates at a second side in a secondary fourth partition crease 2284*b*. The secondary fourth partition crease 2284*b* rotatably connects the secondary first partition 2280*b* to the fourth partition 2281, described below. The secondary fourth partition crease 2284*b* terminates at a first end at the outside edge 2210 and at second end at the fourth partition internal edge 2282.

The secondary first partition 2280*b* terminates at a top side in the outside edge 2210. The secondary first partition 2280*b* terminates at a bottom side in the fourth partition internal edge 2282.

The secondary first partition 2280*b* terminates at a first side in a secondary first partition crease 2283*b*. The secondary first partition crease 2283*b* rotatably connects the secondary first partition 2280*b* to the first partition connecting tab 2285, further described below. The secondary first partition crease 2283*b* terminates at a first end at the outside edge 2210 and at a second end at the fourth partition internal edge 2282.

The primary first partition 2280*a*, and secondary first partition 2280*b* are otherwise similarly configured to the first partition 1100 of FIG. 8.

The sheet further includes a first partition connecting tab 2285. The first partition connecting tab 2285 is for connecting the primary first partition 2280*a* and the secondary first partition 2280*b* to the first side panel 2240. The first partition connecting tab 2285 terminates in a border including the outside edge 2210, the fourth partition internal edge 2282, the primary first partition crease 2283*a*, and the secondary first partition crease 2283*b*. The first partition connecting tab 2285 is otherwise configured similarly to the first partition connecting tab 1110 of FIG. 8.

The sheet 2200 further includes a fourth partition 2281. The fourth partition 2281 terminates at a border including the outside edge 2210, the fourth partition internal edge 2282, the primary fourth partition crease 2284*a*, and the secondary fourth partition crease 2284*b*. The fourth partition 2281 is otherwise similarly configured to the fourth partition 1120 of FIG. 8.

The sheet 2200 further includes a primary third partition 2290*a*. The primary third partition 2290*a* terminates at a second side in a primary second partition crease 2294*a*. The primary second partition crease 2294*a* rotatably connects the primary third partition 2290*a* to a second partition 2291, described below. The primary second partition crease 2294*a* terminates at a first end at a second partition internal edge 2292 further described below. The primary second partition crease 2294*a* terminates at a second side at the outside edge 2210.

The primary third partition 2290*a* terminates at a bottom side in the outside edge 2210. At the primary third partition 2290*a* the outside edge 2210 may extend in and out of the interior area of the sheet 2200. This extension of the outside edge 2210 may be such that the primary third partition 2290 is long enough to extend to the third side panel 2260 when the package is in an open configuration.

The primary third partition 2290*a* terminates at a top side in the second partition internal edge 2292. The second partition internal edge 2292 may be substantially parallel and of similar length to the portion of the outside edge 2210 in which the primary third partition 2290 terminates. The second partition internal edge 2292 terminates at a first end at the primary third partition crease 2293*a*. The second partition internal edge 2282 terminates at a second end at a secondary second partition crease 2294*b* further described below. The second partition internal edge 2292 is internal to the sheet in that the second partition internal edge 2292 does not intersect with the outside edge 2210. The second partition internal edge 2292 may be formed by cutting the sheet. The cutting may be full or partial. Partial cutting may be referred to as nicking.

The primary third partition 2290*a* terminates at a first side in a primary third partition crease 2293*a*. The primary third partition crease 2293*a* rotatably connects the primary third partition 2290*a* to a third partition connecting tab 2295, further described below.

The sheet 2200 further includes a secondary third partition 2290*b*. The secondary third partition 2290*b* terminates at a second side in a secondary second partition crease 2294*b*. The secondary second partition crease 2294*b* rotatably connects the secondary third partition 2290*b* to the second partition 2291, described below. The secondary second partition crease 2294*b* terminates at a first end at the outside edge 2210 and at second end at the second partition internal edge 2292.

The secondary third partition 2290*b* terminates at a top side in the outside edge 2210. The secondary third partition 2290*b* terminates at a bottom side in the second partition internal edge 2292.

The secondary third partition 2290*b* terminates at a first side in a secondary third partition crease 2293*b*. The secondary third partition crease 2293*b* rotatably connects the secondary third partition 2290*b* to the third partition connecting tab 2295, further described below. The secondary third partition crease 2293*b* terminates at a first end at the outside edge 2210 and at a second end at the second partition internal edge 2292.

The primary third partition 2290*a*, and secondary third partition 2290*b* are otherwise similarly configured to the first partition 1100 of FIG. 8.

The sheet further includes a third partition connecting tab 2295. The third partition connecting tab 2295 is for connecting the primary third partition 2290*a* and the secondary third partition 2290*b* to the third side panel 2260. The third partition connecting tab 2295 terminates in a border including the outside edge 2210, the second partition internal edge 2292, the primary third partition crease 2293*a*, and the secondary third partition crease 2293*b*. The third partition connecting tab 2295 is otherwise configured similarly to the third partition connecting tab 1110 of FIG. 8.

The sheet 2200 further includes a second partition 2291. The second partition 2291 terminates at a border including the outside edge 2210, the second partition internal edge 2292, the primary second partition crease 2294*a*, and the secondary second partition crease 2294*b*. The second partition 2291 is otherwise similarly configured to the fourth partition 1120 of FIG. 8.

The sheet 2200 is otherwise configured similarly to the sheet 1700 of FIG. 17.

Figure 23:
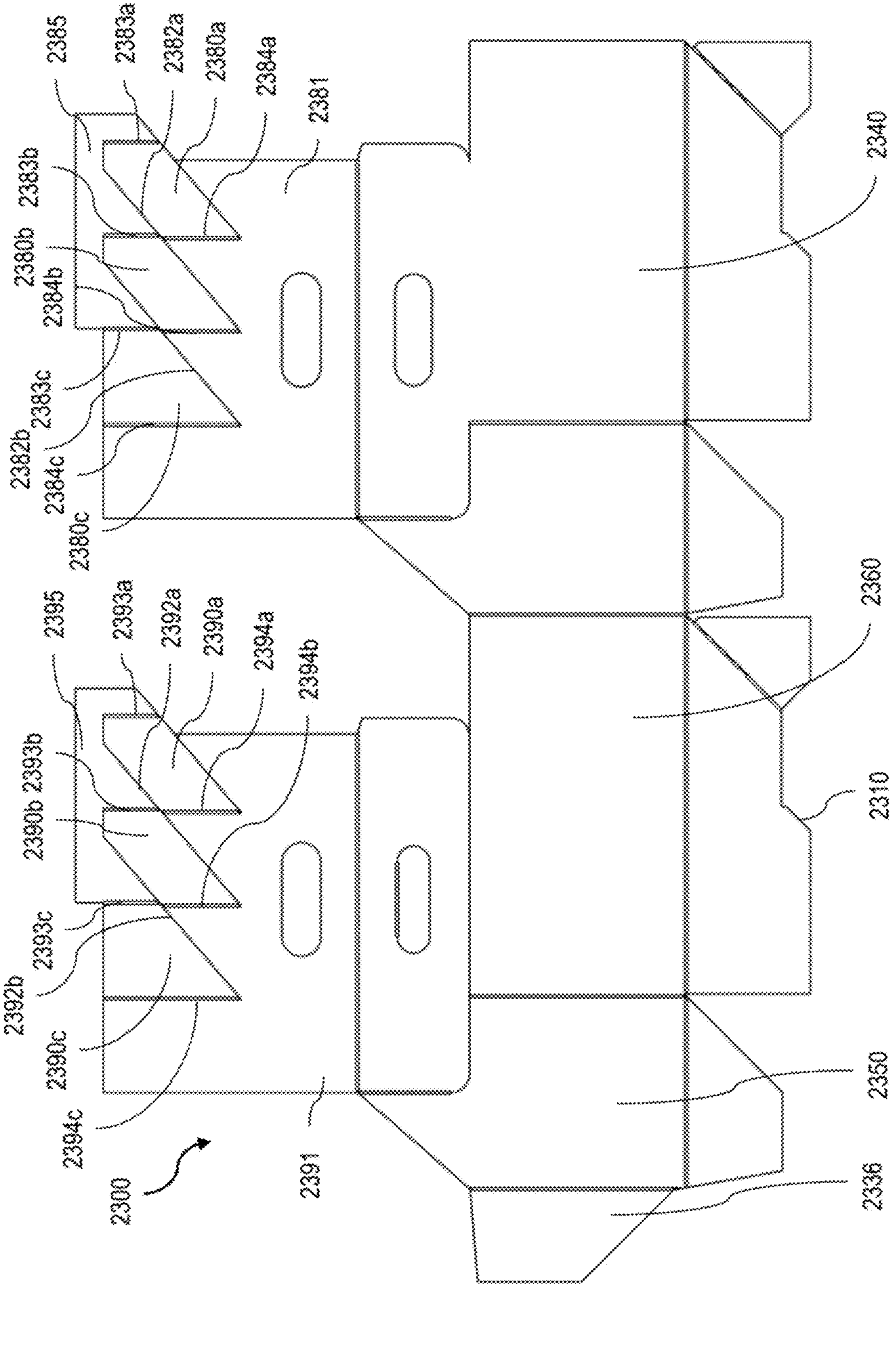
FIG. 23 is a top view schematic diagram of a sheet, according to a further embodiment.

Referring now to FIG. 23, shown therein is a therein is a top view schematic diagram of a sheet 2300 according to an embodiment. The sheet 2300 is configured for forming a package such as to the package 1800 of FIG. 18. The sheet 2300 is a single piece. The sheet 2300 is flat. The sheet includes connected panels, creases, internal edges, and an outside edge 2310. The outside edge 2310 includes a series of connected edge segments.

The sheet 2300 includes a side shell connecting tab 2336. The side shell connecting tab 2336 is a panel for connecting the first side panel 2340 to the fourth side panel 2350. The side shell connecting tab 2336 is otherwise configured similarly to the side shell connecting tab 936 of FIG. 8.

The sheet 2300 further includes a primary first partition 2380*a*. The primary first partition 2380*a* terminates at a second side in a primary fourth partition crease 2384*a*. The primary fourth partition crease 2384*a* rotatably connects the primary first partition 2380*a* to a fourth partition 2381, described below. The primary fourth partition crease 2384*a* terminates at a first end at a primary fourth partition internal edge 2382*a* further described below. The primary fourth partition crease 2384*a* terminates at a second side at the outside edge 2310. The primary fourth partition internal edge 2382*a* may be formed by cutting the sheet. The cutting may be full or partial. Partial cutting may be referred to as nicking.

The primary first partition 2380*a* terminates at a bottom side in the outside edge 2310. At the primary first partition 2380*a* the outside edge 2310 may extend in and out of the interior area of the sheet 2300. This extension of the outside edge 2310 may be such that the primary first partition 2380*a* is long enough to extend to a first side panel 2340 when the package is in an open configuration.

The primary first partition 2380*a* terminates at a top side in the primary fourth partition internal edge 2382*a*. The primary fourth partition internal edge 2382*a* may be substantially parallel and of similar length to the portion of the outside edge 2310 in which the primary first partition 2380*a* terminates. The primary fourth partition internal edge 2382*a* terminates at a first end at the primary first partition crease 2383*a*. The primary fourth partition internal edge 2382*a* terminates at a second end at a secondary fourth partition crease 2384*b* further described below. The primary fourth partition internal edge 2382*a* is internal to the sheet in that the primary fourth partition internal edge 2382*a* does not intersect with the outside edge 2310.

The primary first partition 2380*a* terminates at a first side in a primary first partition crease 2383*a*. The primary first partition crease 2383*a* rotatably connects the primary first partition 2380*a* to a first partition connecting tab 1985, further described below.

The sheet 2300 further includes a secondary first partition 2380*b*. The secondary first partition 2380*b* terminates at a second side in a secondary fourth partition crease 2384*b*. The secondary fourth partition crease 2384*b* rotatably connects the secondary first partition 2380*b* to the fourth partition 2381, described below. The secondary fourth partition crease 2384*b* terminates at a first end at a secondary fourth partition internal edge 2382*b*, further described below. The secondary fourth partition crease 2384*b* terminates at a second end at the primary fourth partition internal edge 2382*a*.

The secondary first partition 2380*b* terminates at a top side at the secondary fourth partition internal edge 2382*b*. The secondary fourth partition internal edge 2382*b* may be substantially parallel and of similar length to the primary fourth partition internal edge 2382*a*. The secondary fourth partition internal edge 2382*b* terminates at a first end at the secondary first partition crease 2383*b*. The secondary fourth partition internal edge 2382*b* terminates at a second end at a tertiary fourth partition crease 2384*c* further described below. The secondary fourth partition internal edge 2382*b* is internal to the sheet in that the secondary fourth partition internal edge 2382*b* does not intersect with the outside edge 2310. The secondary fourth partition internal edge 2382*b* may be formed by cutting the sheet. The cutting may be full or partial. Partial cutting may be referred to as nicking.

The secondary first partition 2380*b* terminates at a bottom side in the primary fourth partition internal edge 2382*a*.

The secondary first partition 2380*b* terminates at a first side in a secondary first partition crease 2383*b*. The secondary first partition crease 2383*b* rotatably connects the secondary first partition 2380*b* to the first partition connecting tab 2385, further described below. The secondary first partition crease 2383*b* terminates at a first end at the secondary fourth partition internal edge 2382*b* and at a second end at the primary fourth partition internal edge 2382*a*.

The sheet 2300 further includes a tertiary first partition 2380*c*. The tertiary first partition 2380*c* terminates at a second side in a tertiary fourth partition crease 2384*c*. The tertiary fourth partition crease 2384*c* rotatably connects the tertiary first partition 2380*c* to the fourth partition 2381, described below. The tertiary fourth partition crease 2384*c* terminates at a first end at the outside edge 2310 and at a second end at the secondary fourth partition internal edge 2382*b*.

The secondary first partition 2380*b* terminates at a top side at the outside edge 2310. The secondary first partition 2380*b* terminates at a bottom side in the secondary fourth partition internal edge 2382*b*.

The tertiary first partition 2380*c* terminates at a first side in a tertiary first partition crease 2383*c*. The tertiary first partition crease 2383*c* rotatably connects the tertiary first partition 2380*c* to the first partition connecting tab 2385, further described below. The tertiary first partition crease 2383*c* terminates at a first end at the outside edge 2310 and at a second end at the secondary fourth partition internal edge 2382*b*.

The primary first partition 2380*a*, and secondary first partition 2380*b*, and tertiary first partition 2380*c* are otherwise similarly configured to the first partition 1100 of FIG. 8.

The sheet further includes a first partition connecting tab 2385. The first partition connecting tab 2385 is for connecting the primary first partition 2380*a*, the secondary first partition 2380*b*, and the tertiary first partition to the first side panel 2340. The first partition connecting tab 2385 terminates in a border including the outside edge 2310, the primary fourth partition internal edge 2382*a*, the secondary fourth partition internal edge 2382*b*, the primary first partition crease 2383*a*, the secondary first partition crease 2383*b*, and the tertiary first partition crease 2383*b*. The first partition connecting tab 2385 is otherwise configured similarly to the first partition connecting tab 1110 of FIG. 8.

The sheet 2300 further includes a fourth partition 2381. The fourth partition 2381 terminates at a border including the outside edge 2310, the primary fourth partition internal edge 2382*a*, the secondary fourth partition internal edge 2382*b*, the primary fourth partition crease 2384*a*, the secondary fourth partition crease 2384*b*, and the tertiary fourth partition crease 2384*b*. The fourth partition 2381 is otherwise similarly configured to the fourth partition 1120 of FIG. 8.

The sheet 2300 further includes a primary third partition 2390*a*. The primary third partition 2390*a* terminates at a second side in a primary second partition crease 2394*a*. The primary second partition crease 2394*a* rotatably connects the primary third partition 2390*a* to a second partition 2391, described below. The primary second partition crease 2394*a* terminates at a first end at a primary second partition internal edge 2392*a* further described below. The primary second partition crease 2394*a* terminates at a second side at the outside edge 2310.

The primary third partition 2390*a* terminates at a bottom side in the outside edge 2310. At the primary third partition 2390*a* the outside edge 2310 may extend in and out of the interior area of the sheet 2300. This extension of the outside edge 2310 may be such that the primary third partition 2390 is long enough to extend to the third side panel 2360 when the package is in an open configuration.

The primary third partition 2390*a* terminates at a top side in the primary second partition internal edge 2392*a*. The primary second partition internal edge 2392*a* may be substantially parallel and of similar length to the portion of the outside edge 2310 in which the primary third partition 2390*a* terminates. The primary second partition internal edge 2392*a* terminates at a first end at the primary third partition crease 2393*a*. The primary second partition internal edge 2382*a* terminates at a second end at a secondary second partition crease 2394*b* further described below. The primary second partition internal edge 2392*a* is internal to the sheet in that the primary second partition internal edge 2392*a* does not intersect with the outside edge 2310. The primary second partition internal edge 2392*a* may be formed by cutting the sheet. The cutting may be full or partial. Partial cutting may be referred to as nicking.

The primary third partition 2390*a* terminates at a first side in a primary third partition crease 2393*a*. The primary third partition crease 2393*a* rotatably connects the primary third partition 2390*a* to a third partition connecting tab 2395, further described below.

The sheet 2300 further includes a secondary third partition 2390*b*. The secondary third partition 2390*b* terminates at a second side in a secondary second partition crease 2394*b*. The secondary second partition crease 2394*b* rotatably connects the secondary third partition 2390*b* to the second partition 2391, described below. The secondary second partition crease 2394*b* terminates at a first end at a secondary second partition internal edge 2382*b*, further described below. The secondary second partition crease 2394*b* terminates at second end at the primary second partition internal edge 2392*a*.

The secondary third partition 2390*b* terminates at a top side at the secondary second partition internal edge 2382*b*. The secondary second partition internal edge 2392*b* may be substantially parallel and of similar length to the primary second partition internal edge 2392*a*. The secondary second partition internal edge 2392*b* terminates at a first end at the secondary third partition crease 2393*b*. The secondary second partition internal edge 2392*b* terminates at a second end at a tertiary second partition crease 2394*c*, further described below. The secondary second partition internal edge 2392*b* is internal to the sheet in that the secondary second partition internal edge 2392*b* does not intersect with the outside edge 2310. The secondary second partition internal edge 2392*b* may be formed by cutting the sheet. The cutting may be full or partial. Partial cutting may be referred to as nicking.

The secondary third partition 2390*b* terminates at a bottom side in the primary second partition internal edge 2392*a*.

The secondary third partition 2390*b* terminates at a first side in a secondary third partition crease 2393*b*. The secondary third partition crease 2393*b* rotatably connects the secondary third partition 2390*b* to the third partition connecting tab 2395, further described below. The secondary third partition crease 2393*b* terminates at a first end at the secondary second partition internal edge 2392*b* and at a second end at the primary second partition internal edge 2392*a*.

The sheet 2300 further includes a tertiary third partition 2390*c*. The tertiary third partition 2390*c* terminates at a second side in the tertiary second partition crease 2394*c*. The tertiary second partition crease 2394*c* rotatably connects the tertiary third partition 2390*c* to the second partition 2391, described below. The tertiary second partition crease 2394*c* terminates at a first end at the outside edge 2310 and at second end at the secondary second partition internal edge 2392*b*.

The tertiary third partition 2390*c* terminates at a top side in the outside edge 2310. The tertiary third partition 2390*c* terminates at a bottom side in the secondary second partition internal edge 2392*b*.

The tertiary third partition 2390*c* terminates at a first side in a tertiary third partition crease 2393*c*. The tertiary third partition crease 2393*c* rotatably connects the tertiary third partition 2390*c* to the third partition connecting tab 2395, further described below. The tertiary third partition crease 2393*c* terminates at a first end at the outside edge 2310 and at a second end at the secondary second partition internal edge 2392*b*.

The primary third partition 2390*a*, secondary third partition 2390*b* and tertiary third partition 2390*c* are otherwise similarly configured to the first partition 1100 of FIG. 8.

The sheet further includes a third partition connecting tab 2395. The third partition connecting tab 2395 is for connecting the primary third partition 2390*a*, the secondary third partition 2390*b*, and the tertiary third partition 2390*c* to the third side panel 2360. The third partition connecting tab 2395 terminates in a border including the outside edge 2310, the primary second partition internal edge 2392*a*, the secondary second partition internal edge 2382*b*, the primary third partition crease 2393*a*, the secondary third partition crease 2393*b*, and the tertiary third partition crease 2393*c*. The third partition connecting tab 2395 is otherwise configured similarly to the third partition connecting tab 1110 of FIG. 8.

The sheet 2300 further includes a second partition 2391. The second partition 2391 terminates at a border including the outside edge 2310, the primary second partition internal edge 2392*a*, the secondary second partition internal edge 2382*b*, the primary second partition crease 2394*a*, the secondary second partition crease 2394*b* and the tertiary second partition crease 2394*c*. The second partition 2391 is otherwise similarly configured to the fourth partition 1120 of FIG. 8.

The sheet 2300 is otherwise configured similarly to the sheet 1900 of FIG. 19.

While the above description provides examples of one or more apparatus, methods, or systems, it will be appreciated that other apparatus, methods, or systems may be within the scope of the claims as interpreted by one of skill in the art.

The invention claimed is:

1. A package for containing and transporting articles wherein the package comprises:

a side shell for forming walls of the package, the side shell comprising:

a plurality of side walls, including a first side wall, a second side wall, a third side wall, and a fourth side wall, wherein together the plurality of side walls comprise a functionally seamless side wall outer surface wherein the side wall outer surface is folded only at a plurality of side wall creases configured to form corners, and wherein the first side wall and third side wall are opposing and the second side wall and fourth side wall are opposing; and wherein one of the side walls further comprises a side shell connecting tab that comprises material beyond the side wall area, wherein the side shell terminates at a first end in a side shell edge and at a second end in a side shell connecting tab crease;

a handle comprising a first handle panel and a second handle panel;

a plurality of partitions for forming a plurality of compartments by dividing an inside space of the package, the plurality of partitions including:

a least one first partition connectable to the first side wall;

a second partition, dividing the inside space adjacent the second wall;

at least one third partition connectable to the third side wall; and a fourth partition, dividing the inside space adjacent the fourth wall;

wherein the second partition is connected to the first handle panel at a second partition handle tab crease, and the at least one third partition is connected to the second partition at a second partition crease; and wherein the fourth partition is connected to the second handle panel at a fourth partition handle tab crease, and the at least one first partition is connected to the fourth partition at a second partition crease;

and wherein each of the at least one first partition is connected to the first side wall and each of the at least one third partition is connected to the third side wall by respective partition connecting tabs, wherein the partition connecting tabs are rotatably connected to the respective partition at a partition connecting tab crease; and a plurality of bottom panels, wherein the bottom panels are auto-bottom panels for forming an auto-bottom, and wherein each bottom panel is connected to a respective side wall of the plurality of side walls by a bottom panel crease.

2. The package of claim 1 further comprising at least one securing medium for securing the package in an open configuration.

3. The package of claim 2 wherein the plurality of securing mediums comprises one or more of glue, tape, and string.

4. The package of claim 1 wherein the at least one side shell connecting tab is rotatably connected to the side shell by the side shell connecting tab crease; and wherein the side shell connecting tab is secured to an interior surface of the side wall by at least one securing medium; and wherein the side shell connecting tab crease and the side wall edge are substantially collocated.

5. The package of claim 1 wherein the partition connecting tabs are secured to an interior surface of a side wall by at least one securing medium.

6. The package of claim 1 wherein the package is formed from a sheet wherein the sheet is composed of cardboard.

7. The package of claim 1 wherein the package further comprises an outside surface and wherein that outside surface comprises artwork.

8. A method for constructing a package from a sheet wherein the sheet comprises a side shell, a plurality of partitions, and a plurality of bottom panels, wherein the side shell includes four side walls and together the side walls form a functionally seamless side wall outer surface, wherein the bottom panels are auto-bottom panels for forming an auto-bottom, and wherein each bottom panel is connected to a respective side wall of the four side walls by a bottom panel crease, the method comprising:

folding at least one partition portion of the sheet including at least a second partition of the plurality of partitions along a second partition handle tab crease wherein the second partition handle tab crease is parallel to a top line of the side shell and wherein the folding brings at least a portion of a second partition interior surface in contact with a side shell interior surface and wherein the at least one partition portion of the sheet is not of a side wall area;

folding the plurality of bottom panels along the respective bottom panel crease;

folding a fourth side wall of the four side walls toward a first side wall of the four side walls;

securing the plurality of bottom panels to form the auto-bottom; and securing the fourth side wall to the first side wall; and wherein the sheet is maintained in substantially the same orientation while folding and securing the panels into a flat configuration and wherein opening the package forms a container with an inside space divided into a plurality of compartments.

9. The method of claim 8 further comprising opening the package from the flat configuration to an open configuration.

10. The method of claim 8 wherein the fourth side wall is secured to the first side wall by a side shell connecting tab of the side shell, wherein the side shell connecting tab is rotatably connected to a primary side wall by a side shell connecting tab crease and wherein the primary side wall is one of the first side wall and the fourth side wall; and wherein the method further includes applying a side shell securing medium to the side shell connecting tab after folding the primary side wall and before folding a secondary side wall wherein when the primary side wall is the first side wall the secondary side wall is the fourth side wall, and when the primary side wall is the fourth side wall the secondary side wall is the first side wall; and wherein the folding of the secondary side wall secures the first side wall to the fourth side wall at the side shell connecting tab by the side shell securing medium.

11. The method of claim 8 further comprising applying at least one partition securing medium to at least one partition connecting tab such that one or more of folding of the first side wall and the fourth side wall secures the at least one partition connecting tab to the interior surface of the side shell.

12. A sheet configured to form into the structural elements of a package for containing and transport articles, wherein the sheet is substantially flat and continuous, the sheet comprising:

a side shell area configured to form walls of the package, the side shell area comprising a plurality of side walls including a first side wall, a second side wall, a third side wall, and a fourth side wall:

wherein together the plurality of side walls comprise a functionally seamless side wall outer surface wherein the side wall outer surface is folded only at a plurality of side wall creases configured to form corners, and wherein the first side wall and third side wall are opposing and the second side wall and fourth side wall are opposing;

wherein one of the side walls further comprises a side shell connecting tab that comprises material beyond the side wall area, wherein the side shell terminates at a first end in a side shell edge and at a second end in a side shell connecting tab crease;

a handle comprising a first handle panel and a second handle panel;

a plurality of partitions for forming a plurality of compartments by dividing an inside space of the package, the plurality of partitions including:

a least one first partition connectable to the first side wall;

a second partition, dividing the inside space adjacent the second wall;

at least one third partition connectable to the third side wall; and a fourth partition, dividing the inside space adjacent the fourth wall;

wherein the second partition is connected to the first handle panel at a second partition handle tab crease, and the at least one third partition is connected to the second partition at a second partition crease; and wherein the fourth partition is connected to the second handle panel at a fourth partition handle tab crease, and the at least one first partition is connected to the fourth partition at a second partition crease;

and wherein each of the at least one first partition is connected to the first side wall and each of the at least one third partition is connected to the third side wall by respective partition connecting tabs, wherein the partition connecting tabs are rotatably connected to the respective partition at a partition connecting tab crease; and system a plurality of bottom panels, wherein the bottom panels are auto-bottom panels for forming an auto-bottom, and wherein each bottom panel is connected to a respective side wall of the plurality of side walls by a bottom panel crease.

13. The sheet of claim 12 wherein the at least one side shell connecting tab is rotatably connected to the side shell by the side shell connecting tab crease; and wherein the side shell connecting tab is configured to receive a securing medium for securing the side shell connecting tab to an interior surface of the side wall.

14. The sheet of claim 12 wherein the partition connecting tabs are configured to receive a securing medium for securing the partition connecting tab to an interior surface of a side wall by at least one securing medium.

15. The sheet of claim 12 wherein the package further comprises an outside surface and wherein that outside surface comprises artwork.

* * * * *